US010870715B2

(12) United States Patent
Tsurugi et al.

(10) Patent No.: US 10,870,715 B2
(45) Date of Patent: Dec. 22, 2020

(54) SOLID POLYALUMINOXANE COMPOSITION, OLEFIN POLYMERIZATION CATALYST, OLEFIN POLYMER PRODUCTION METHOD AND SOLID POLYALUMINOXANE COMPOSITION PRODUCTION METHOD

(71) Applicant: MITSUI CHEMICALS, INC., Tokyo (JP)

(72) Inventors: Kou Tsurugi, Sodegaura (JP); Shiori Hanada, Sodegaura (JP); Atsushi Shibahara, Chiba (JP); Kazumori Kawamura, Chiba (JP); Fumiaki Nishino, Ichihara (JP); Yasuyuki Harada, Ichihara (JP); Wataru Yamada, Chiba (JP); Akiko Matsumoto, Oberursel (DE); Isao Hara, Ninomiya-machi (JP); Tatsuya Nakamura, Ichihara (JP); Toshihiro Muroto, Ichihara (JP)

(73) Assignee: MITSUI CHEMICALS, INC., Tokyo (JP)

(*) Notice: Subject to any disclaimer, the term of this patent is extended or adjusted under 35 U.S.C. 154(b) by 0 days.

(21) Appl. No.: 16/171,192

(22) Filed: Oct. 25, 2018

(65) Prior Publication Data
US 2019/0062470 A1 Feb. 28, 2019

Related U.S. Application Data

(60) Continuation of application No. 15/588,358, filed on May 5, 2017, which is a division of application No. 14/766,396, filed as application No. PCT/JP2014/052856 on Feb. 7, 2014, now Pat. No. 9,676,879.

(30) Foreign Application Priority Data

Feb. 8, 2013 (JP) ................................. 2013-023266

(51) Int. Cl.
*C08G 79/10* (2006.01)
*C08F 4/02* (2006.01)
*C08F 4/6592* (2006.01)
*C08F 10/02* (2006.01)
*C08F 110/02* (2006.01)
*C08F 4/659* (2006.01)

(52) U.S. Cl.
CPC ............... *C08F 10/02* (2013.01); *C08F 4/02* (2013.01); *C08F 4/027* (2013.01); *C08F 4/65922* (2013.01); *C08F 110/02* (2013.01); *C08G 79/10* (2013.01); *C08F 4/6592* (2013.01); *C08F 4/65912* (2013.01)

(58) Field of Classification Search
CPC .......... C08G 79/10; C08F 4/02; C08F 4/6592
See application file for complete search history.

(56) References Cited

U.S. PATENT DOCUMENTS

| 4,952,540 A | 8/1990 | Kioka et al. |
| 4,960,878 A | 10/1990 | Crapo et al. |
| 5,017,714 A | 5/1991 | Welborn, Jr. |
| 5,041,584 A | 8/1991 | Crapo et al. |
| 5,120,867 A | 6/1992 | Welborn, Jr. |
| 5,145,819 A | 9/1992 | Winter et al. |
| 5,314,973 A | 5/1994 | Welborn, Jr. |
| 5,332,706 A | 7/1994 | Nowlin et al. |
| 5,371,260 A | 12/1994 | Sangokoya |
| 5,403,942 A | 4/1995 | Becker et al. |
| 5,420,220 A | 5/1995 | Cheruvu et al. |
| 5,436,212 A | 7/1995 | Geerts |
| 5,441,920 A | 8/1995 | Welborn, Jr. |
| 5,473,028 A | 12/1995 | Nowlin et al. |
| 5,480,848 A | 1/1996 | Geerts |
| 5,480,948 A | 1/1996 | Geerts |
| 5,496,781 A | 3/1996 | Geerts et al. |
| 5,565,395 A | 10/1996 | Sangokoya et al. |

(Continued)

FOREIGN PATENT DOCUMENTS

| CN | 1112120 A | 11/1995 |
| CN | 1112937 A | 12/1995 |

(Continued)

OTHER PUBLICATIONS

Japanese Office Action dated Feb. 19, 2019 in corresponding application No. 2018-021375.
US 5,883,203, Mar. 16, 1999, Cheruvu et al. (withdrawn)
Harney et al., "C-Methylation of Alcohols by Trimethylaluminium", Australian Journal of Chemistry vol. 27, Aug. 1974, pp. 1639-1653.
Kabalka et al., Tetrahedron Letters vol. 38, No. 32, Aug. 11, 1997, ISSN 0040-4039, pp. 5679-5682.
Kaji et al., "Develoment of New Modifiled Methylaluminoxanes" TOSOH Research & Technology Review No. 47, 2003, ISSN 1346-3039 pp. 55-60.
Makio et al., "Frontiers in Transition Metal Catalyzed Reactions", Chemical Reviews vol. 111, Mar. 2011, pp. 2363-2449.

(Continued)

*Primary Examiner* — Caixia Lu
(74) *Attorney, Agent, or Firm* — Foley & Lardner LLP

(57) ABSTRACT

An object of the invention is to provide a solid polyaluminoxane composition suitably used as a cocatalyst and a catalyst carrier in combination with an olefin oligomerization or polymerization catalyst, without the use of solid inorganic carriers such as silica. The solid polyaluminoxane composition of the invention includes a polyalkylaluminoxane and a trialkylaluminum, and has a solubility in n-hexane at 25° C. of less than 0.50 mol % as measured by a specific method (i), a solubility in toluene at 25° C. of less than 1.0 mol % as measured by a specific method (ii), and a 13 mol % or more molar fraction of alkyl groups derived from the trialkylaluminum moieties relative to the total number of moles of alkyl groups derived from the polyalkylaluminoxane moieties and the alkyl groups derived from the trialkylaluminum moieties as measured with respect to tetrahydrofuran-$d_8$ soluble components by a specific method (iii).

18 Claims, 9 Drawing Sheets

(56) References Cited

U.S. PATENT DOCUMENTS

| | | |
|---|---|---|
| 5,583,189 A | 12/1996 | Geerts et al. |
| 5,602,067 A | 2/1997 | Nowlin et al. |
| 5,606,087 A | 2/1997 | Roberg et al. |
| 5,608,019 A | 3/1997 | Cheruvu et al. |
| 5,663,394 A | 9/1997 | Roberg et al. |
| 5,670,589 A | 9/1997 | Geerts et al. |
| 5,728,855 A | 3/1998 | Smith et al. |
| 5,777,143 A | 7/1998 | Malpass et al. |
| 5,831,109 A | 11/1998 | Smith et al. |
| 6,197,902 B1 | 3/2001 | Dolle et al. |
| 6,197,985 B1 | 3/2001 | Kobata et al. |
| 6,225,425 B1 | 5/2001 | Dolle et al. |
| 6,309,997 B1 | 10/2001 | Fujita et al. |
| 6,414,096 B1 | 7/2002 | Dolle et al. |
| 6,479,423 B1 | 11/2002 | Dolle et al. |
| 6,939,928 B1 | 9/2005 | Kawai et al. |
| 8,329,931 B2 | 12/2012 | Itoh et al. |
| 9,340,630 B2 | 5/2016 | Kaji et al. |
| 2002/0055600 A1 | 5/2002 | Fujita et al. |
| 2002/0115557 A1 | 8/2002 | Fujita et al. |
| 2002/0137624 A1 | 9/2002 | Gauthier et al. |
| 2003/0004290 A1 | 1/2003 | Matsukawa et al. |
| 2003/0114623 A1 | 6/2003 | Mitani et al. |
| 2004/0010103 A1 | 1/2004 | Boussie et al. |
| 2005/0065302 A1 | 3/2005 | Mitani et al. |
| 2005/0124771 A1 | 6/2005 | Fujita et al. |
| 2005/0228155 A1 | 10/2005 | Kawai et al. |
| 2005/0239637 A1 | 10/2005 | Lindroos et al. |
| 2006/0161013 A1 | 7/2006 | Tohi et al. |
| 2006/0276607 A1 | 12/2006 | Ikenaga et al. |
| 2007/0197745 A1 | 8/2007 | Kaji et al. |
| 2008/0292896 A1 | 11/2008 | Ikenaga et al. |
| 2008/0306219 A1 | 12/2008 | Ikenaga et al. |
| 2008/0306234 A1 | 12/2008 | Ikenaga et al. |
| 2008/0312461 A1 | 12/2008 | Ikenaga et al. |
| 2009/0043050 A1 | 2/2009 | Ikenaga et al. |
| 2009/0118426 A1 | 5/2009 | Mitani et al. |
| 2011/0082325 A1 | 4/2011 | Suzuki et al. |
| 2011/0196103 A1 | 8/2011 | Kawahara et al. |
| 2011/0282017 A1 | 11/2011 | Kaji et al. |
| 2011/0295031 A1 | 12/2011 | Itoh et al. |
| 2013/0059990 A1 | 3/2013 | Kaji et al. |

FOREIGN PATENT DOCUMENTS

| | | |
|---|---|---|
| CN | 1131670 A | 12/1995 |
| CN | 1121922 A | 5/1996 |
| CN | 1523027 A | 8/2004 |
| CN | 1681829 A | 10/2005 |
| CN | 1865262 A | 11/2006 |
| CN | 102239187 A | 11/2011 |
| CN | 102329332 A | 1/2012 |
| EP | 0-420 436 A1 | 4/1991 |
| EP | 0-612 753 A1 | 8/1994 |
| JP | H02-131488 A | 5/1990 |
| JP | H03-9913 A | 1/1991 |
| JP | H03-021607 | 1/1991 |
| JP | H03-106907 A | 5/1991 |
| JP | H03-188092 A | 8/1991 |
| JP | H04-069394 A | 3/1992 |
| JP | H04-300887 A | 10/1992 |
| JP | H06-329680 A | 11/1994 |
| JP | H07-070144 A | 3/1995 |
| JP | H07-042301 B | 5/1995 |
| JP | H07-300486 A | 11/1995 |
| JP | H08-319309 A | 12/1996 |
| JP | H11-315109 A | 11/1999 |
| JP | 2000-095810 A | 4/2000 |
| JP | 2000-505785 A | 5/2000 |
| JP | 2000-509040 A | 7/2000 |
| JP | 2000-239312 A | 9/2000 |
| JP | 2001-502714 A | 2/2001 |
| JP | 2002-179721 A | 6/2002 |
| JP | 2003-327611 A | 11/2003 |
| JP | 2004-051801 A | 2/2004 |
| JP | 2005-263749 A | 9/2005 |
| JP | 2005-538203 | 12/2005 |
| JP | 2008-069361 A | 3/2008 |
| JP | 2009-001829 A | 1/2009 |
| JP | 2010-144035 A | 7/2010 |
| JP | 2011-178682 A | 9/2011 |
| JP | 2011-195584 A | 10/2011 |
| JP | 2012-092199 A | 5/2012 |
| JP | 2013-060518 A | 4/2013 |
| RU | 2 109 765 C1 | 4/1998 |
| WO | WO-2001/27124 A1 | 4/2001 |
| WO | WO-2001/55231 A1 | 8/2001 |
| WO | WO-03/091262 A1 | 11/2003 |
| WO | WO-2004/029062 A1 | 4/2004 |
| WO | WO-2004/087775 A1 | 10/2004 |
| WO | WO-2007/136496 A2 | 11/2007 |
| WO | WO-2009/005003 A1 | 1/2009 |
| WO | WO-2010/055652 | 5/2010 |
| WO | WO-2011/142400 A1 | 11/2011 |

OTHER PUBLICATIONS

Meisters et al., "Exhaustive C-Methlation of Carboxylic Acids by Trimethylaluminium: A New Route to t-Butyl Compounds", Australian Journal of Chemistry vol. 27, 1974, pp. 1665-1672.

Meisters et al., "Exhaustive C-Methalation of Ketones by Trimethylaluminium" Australian Journal of Chemistry vol. 27, 1974, pp. 1655-1663.

Pangborn et al., "Safe and Convenient Procedure for Solvent Purification", Organometallics vol. 15, Mar. 5, 1996, pp. 1518-1520.

Spaleck et al., "The Influence of Aromatic Substituents on the Polymerization Behavior of Bridged Zirconocene Catalysts", Organometallics vol. 13, Mar. 1994, pp. 954-963.

Office Action issued in Chinese Patent Application No. 201480007183.8 dated Apr. 26, 2016.

Office Action dated Mar. 14, 2017 in corresponding Russian Patent Application No. 2015137544.

International Search Report issued in PCT/JP2014/052856 dated Feb. 24, 2014 with its English translation.

[FIG. 1]
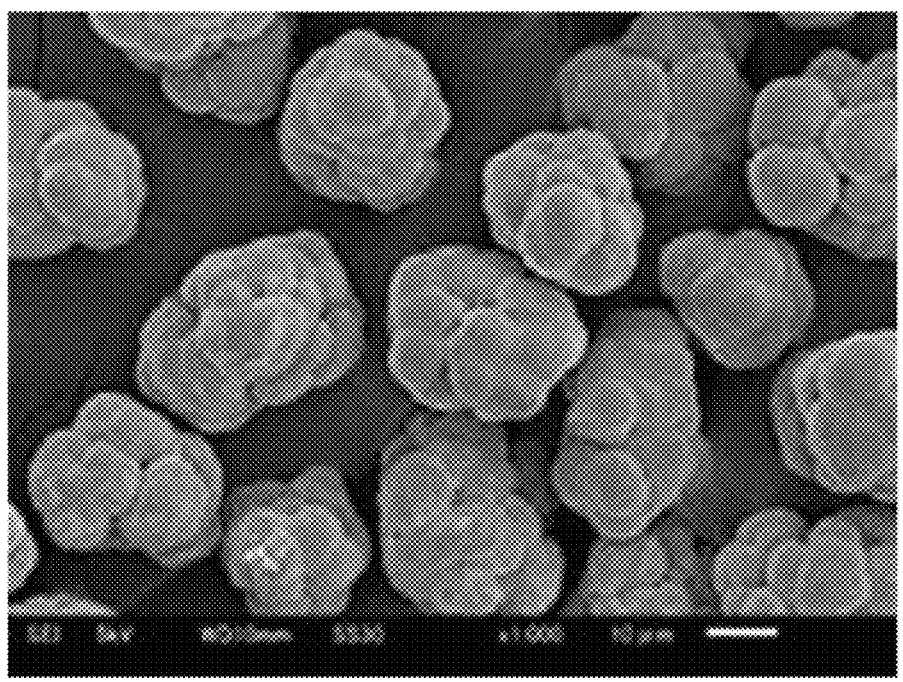
[FIG. 2]
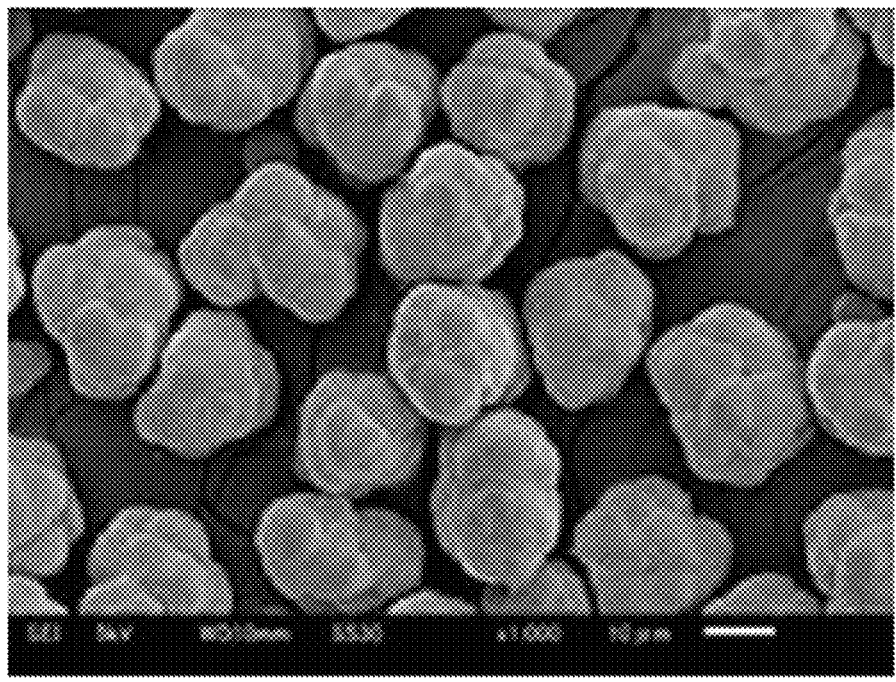

[FIG. 3]
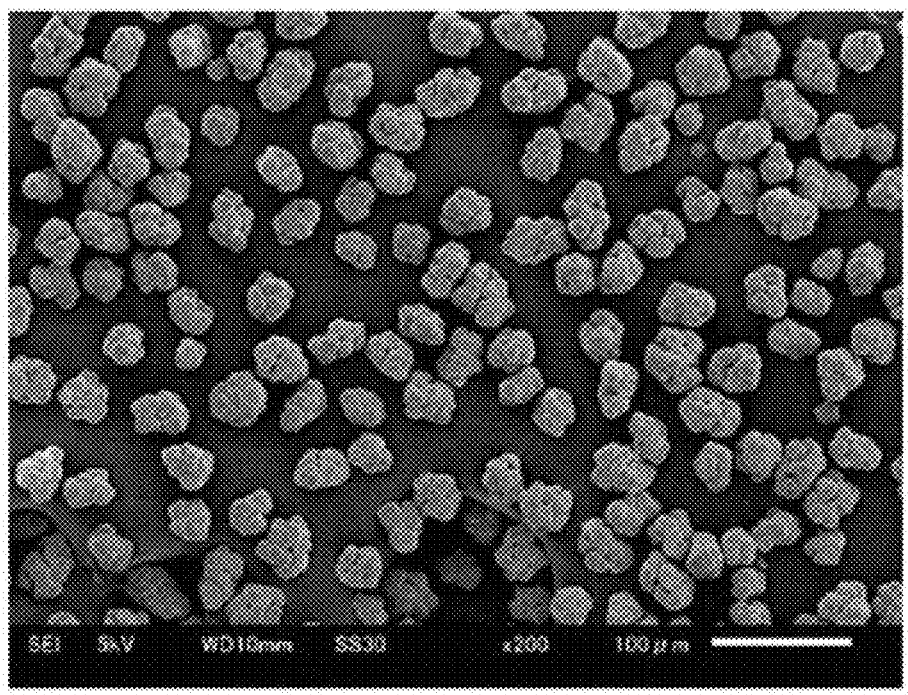
[FIG. 4]
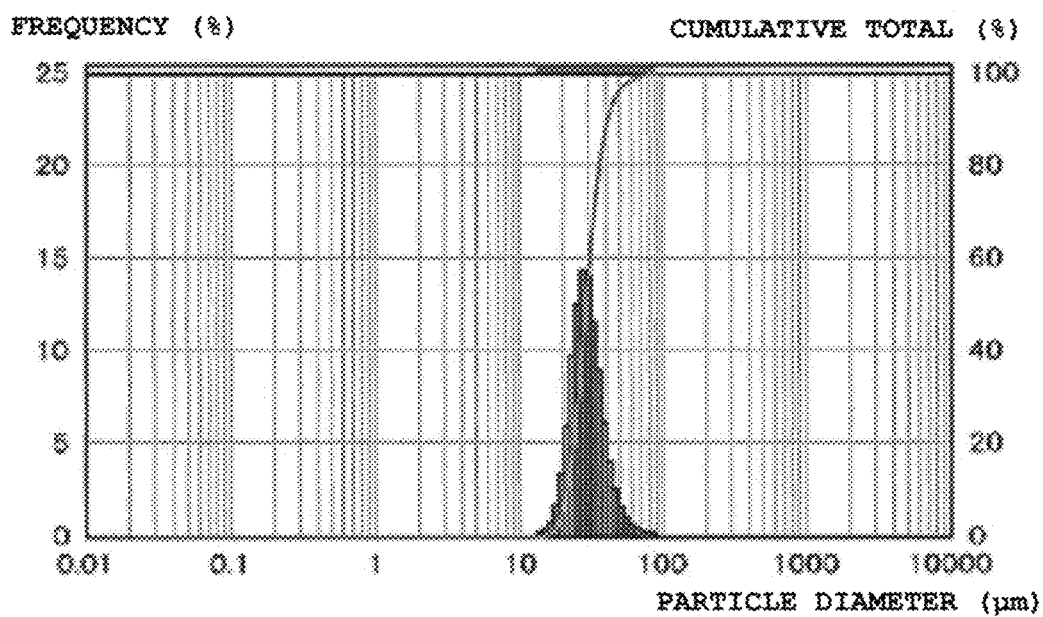

[FIG. 5]
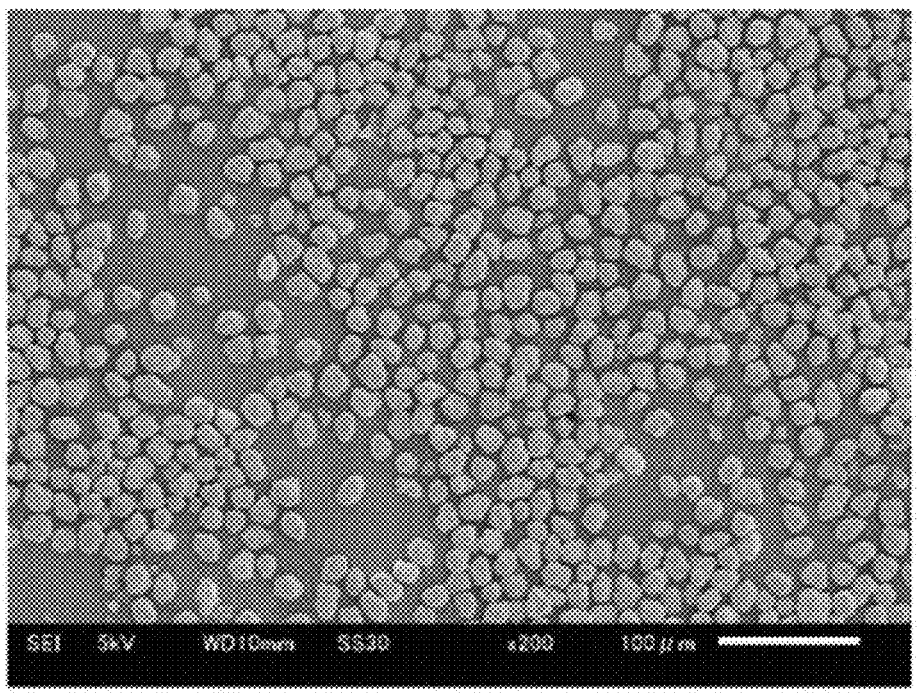
[FIG. 6]
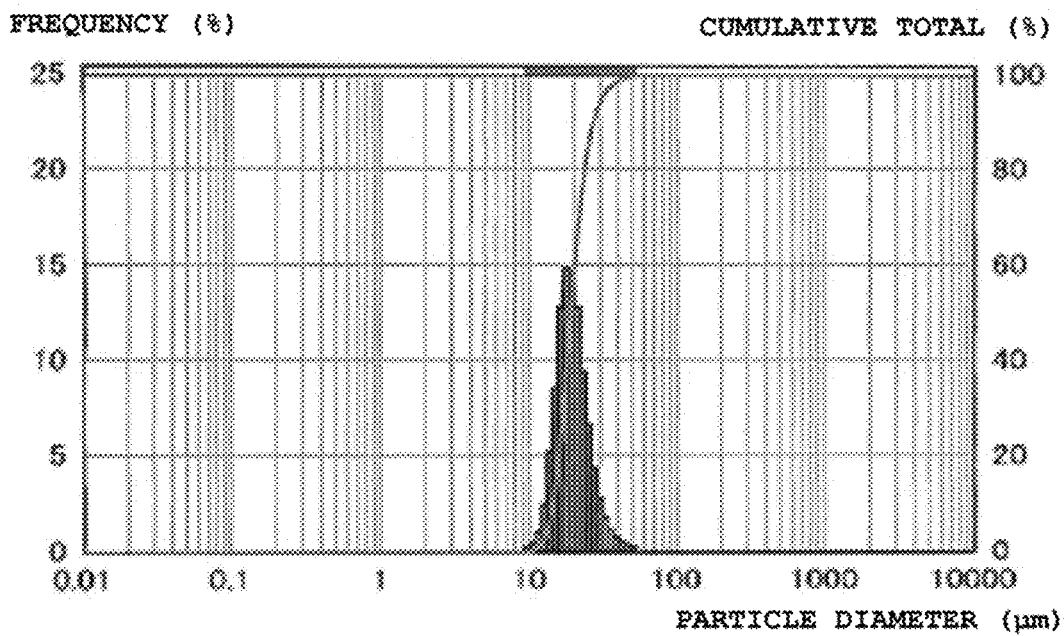

[FIG. 7]
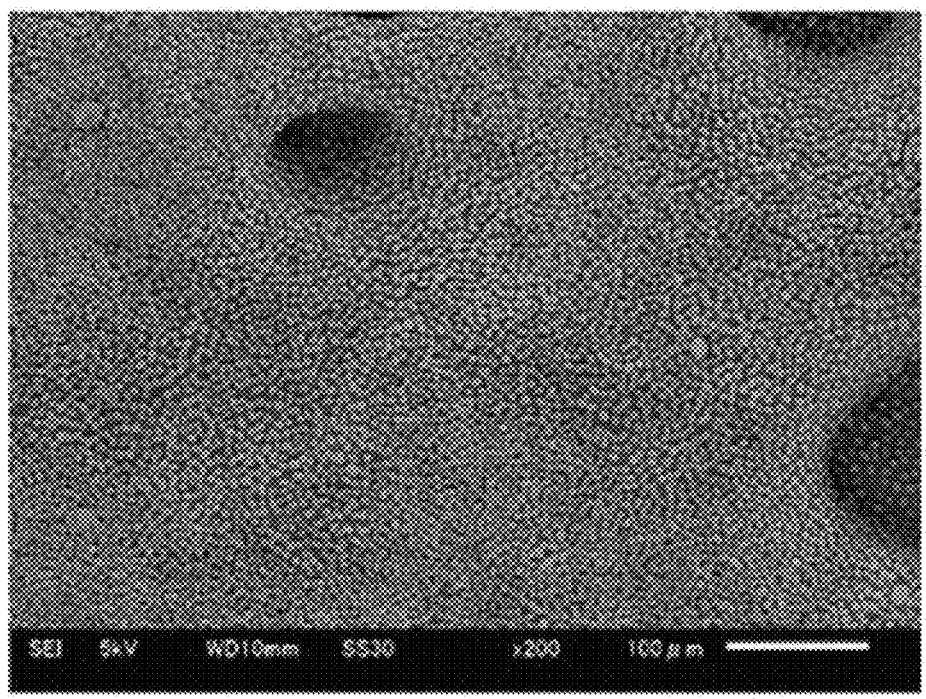
[FIG. 8]
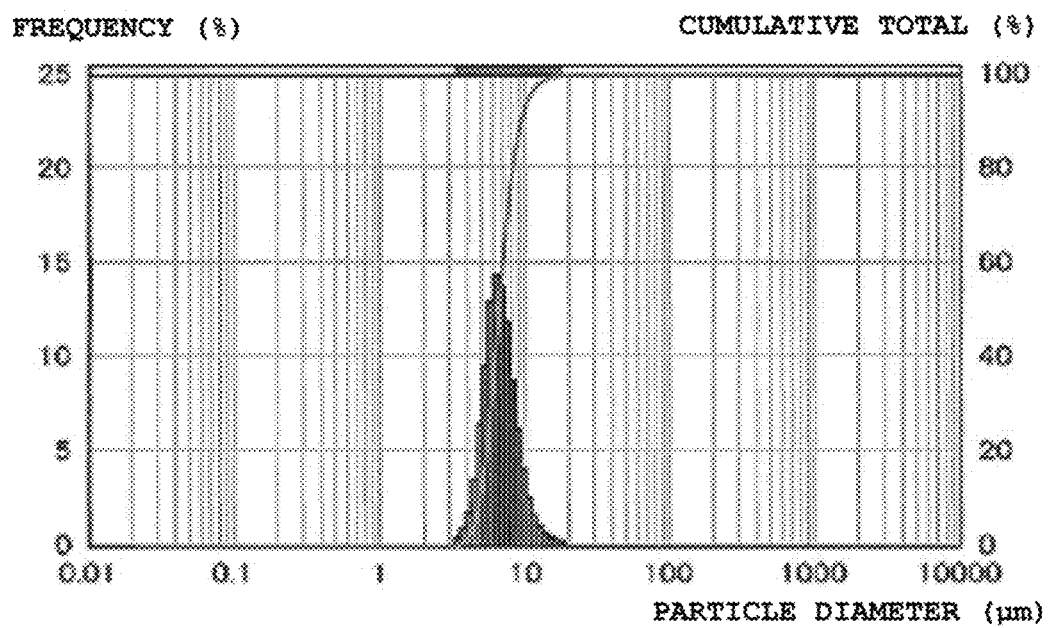

[FIG. 9]
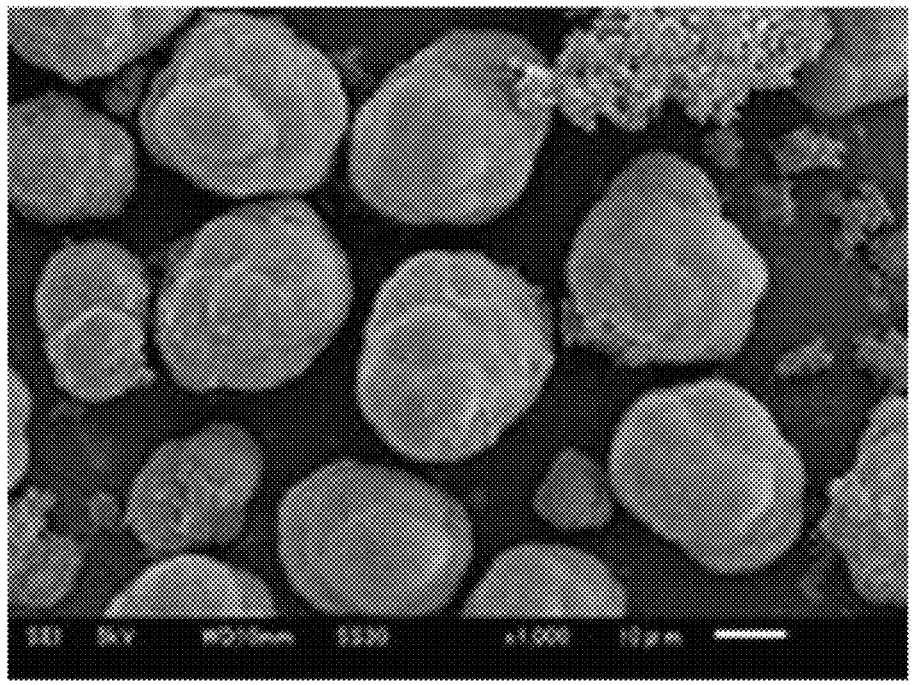
[FIG. 10]
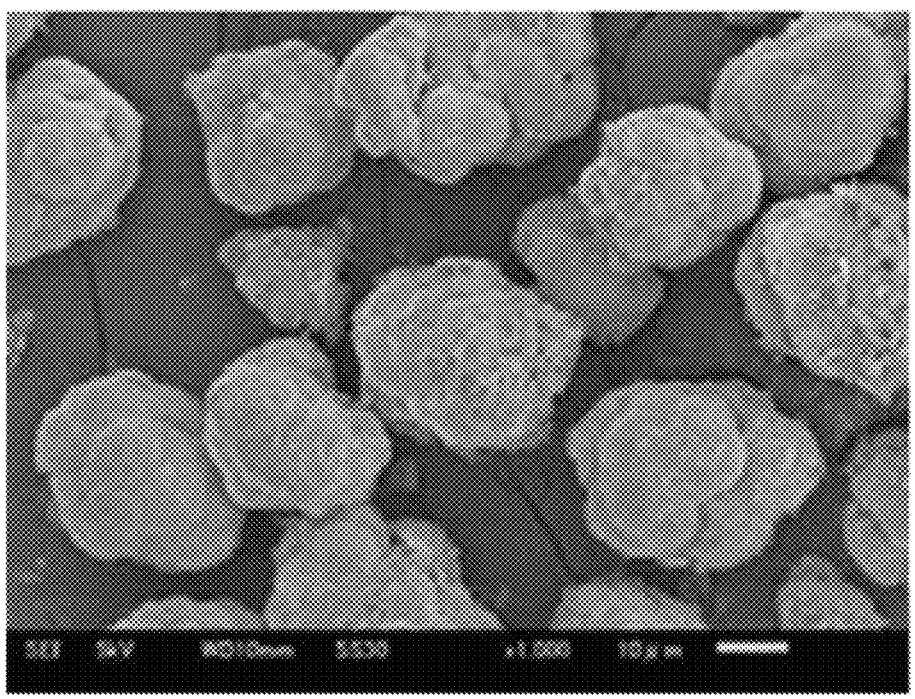

[FIG. 11]
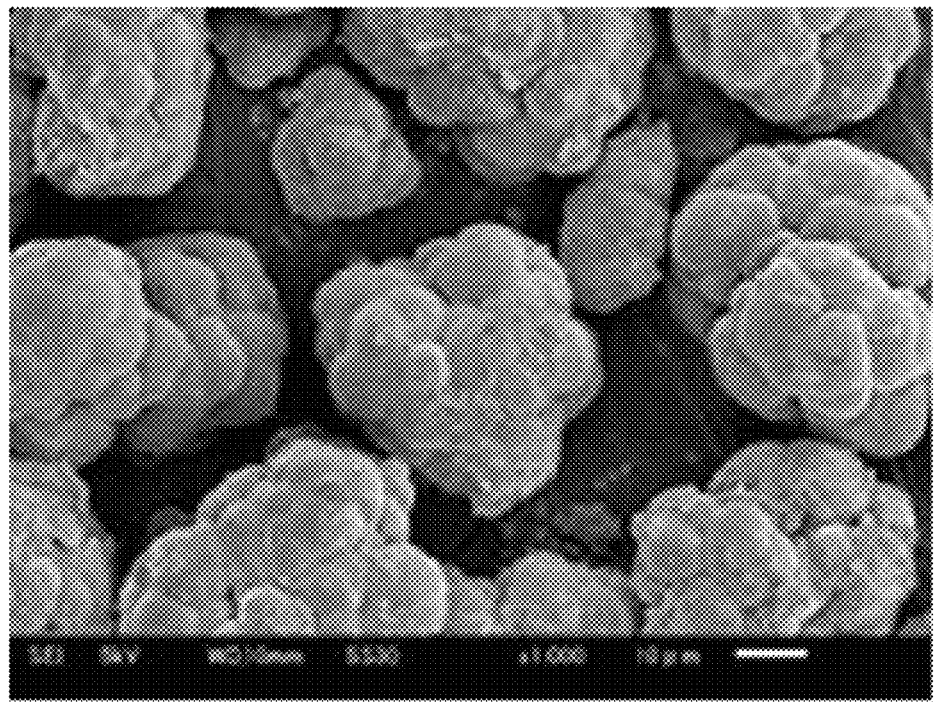
[FIG. 12]
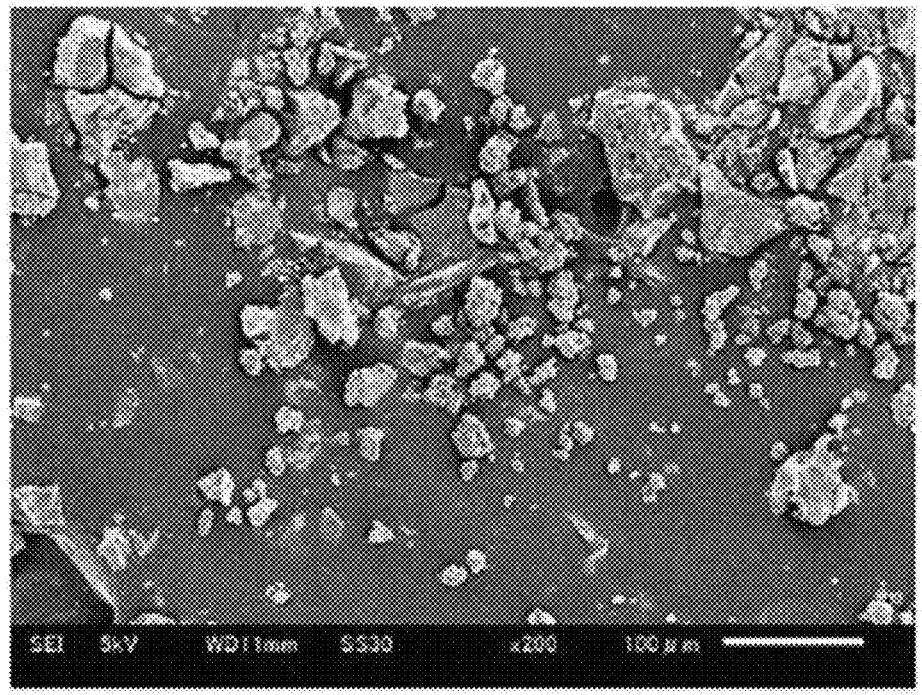

[FIG. 13]
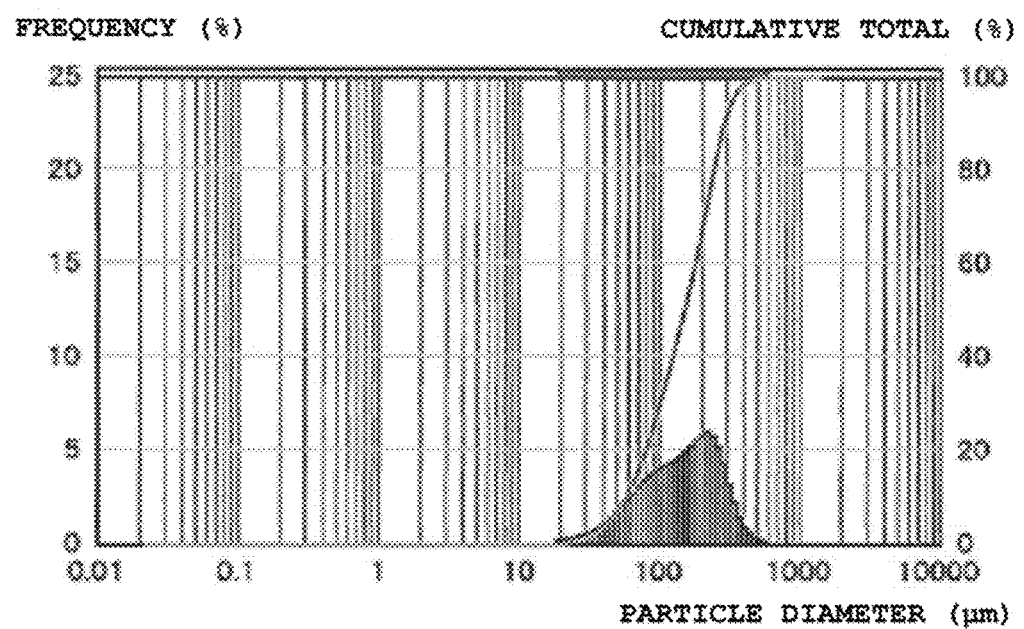
[FIG. 14]
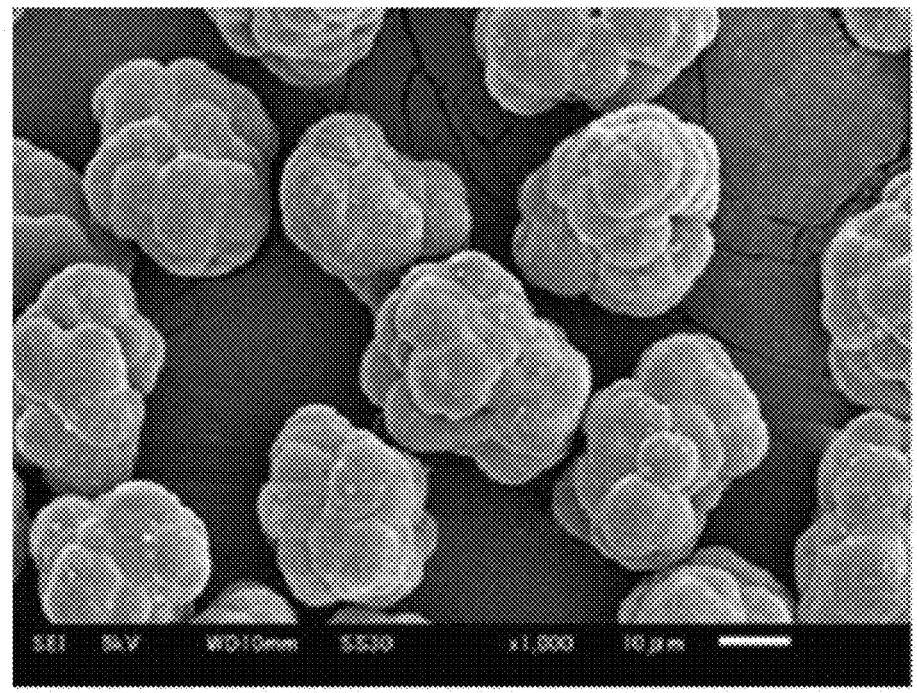

[FIG. 15]
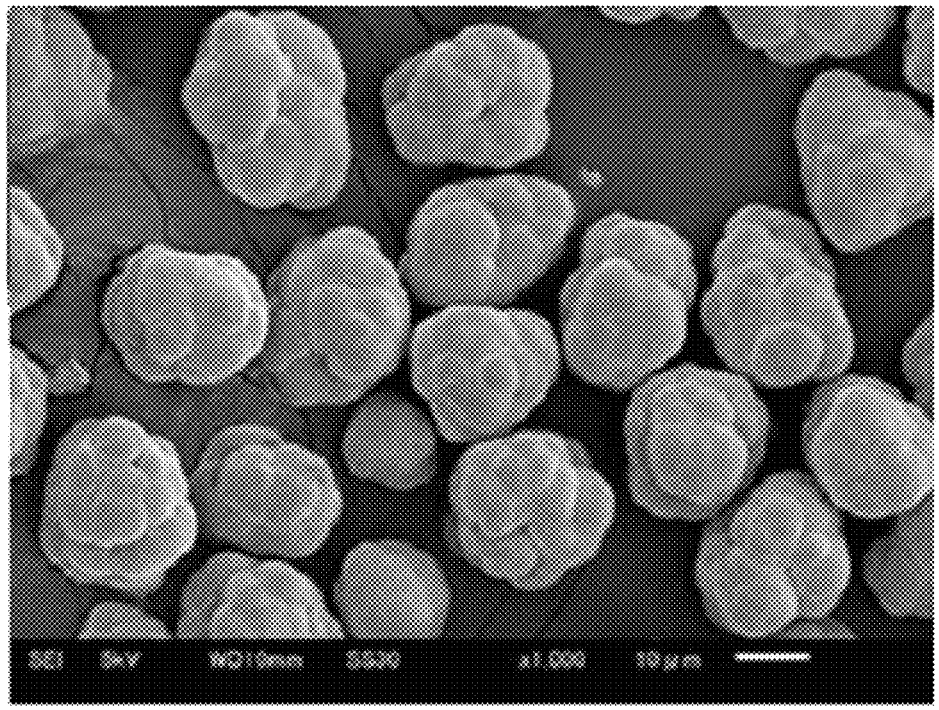
[FIG. 16]
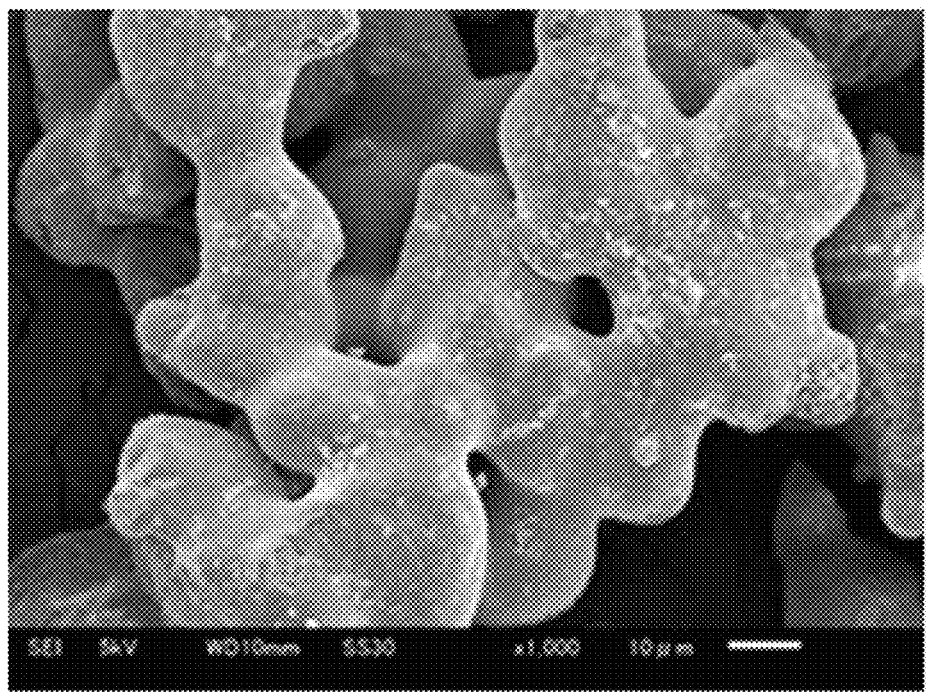

[FIG. 17]
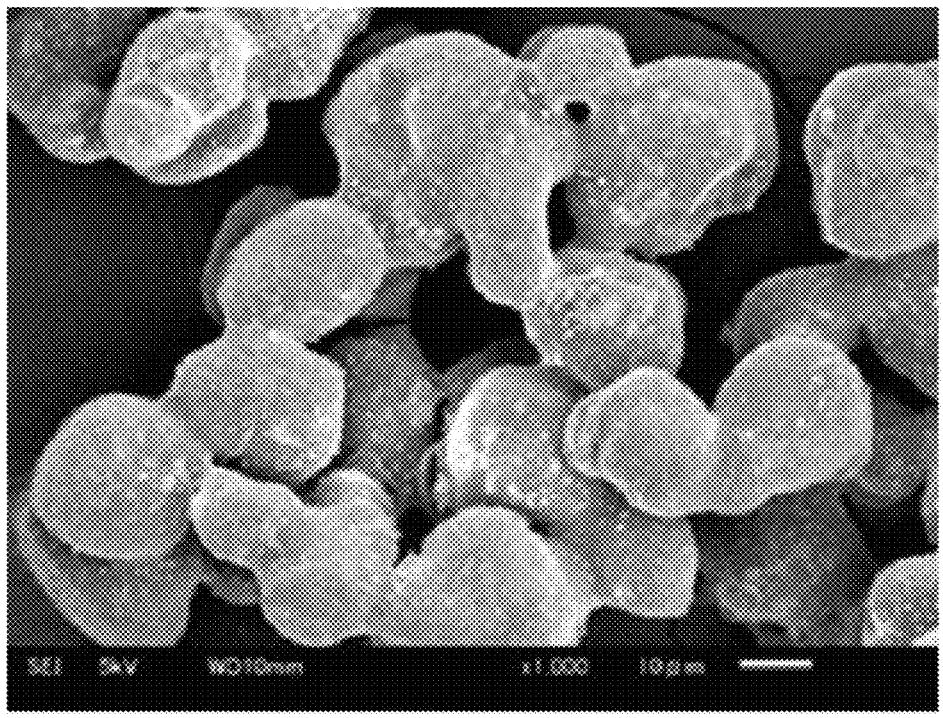
[FIG. 18]
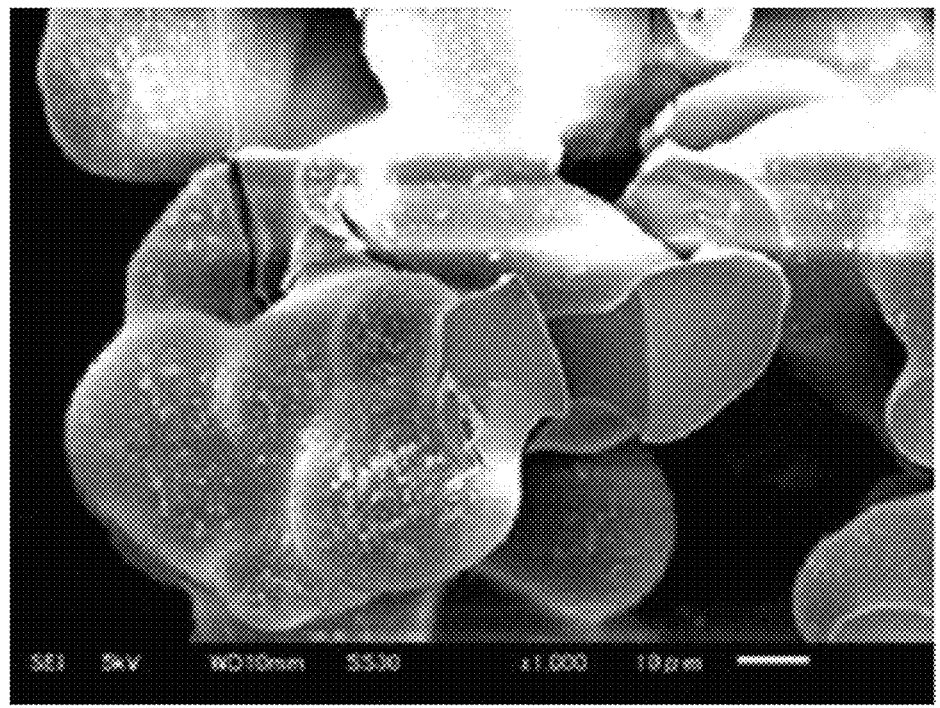

SOLID POLYALUMINOXANE COMPOSITION, OLEFIN POLYMERIZATION CATALYST, OLEFIN POLYMER PRODUCTION METHOD AND SOLID POLYALUMINOXANE COMPOSITION PRODUCTION METHOD

CROSS-REFERENCE TO RELATED APPLICATIONS

This application is a Continuation of U.S. patent application Ser. No. 15/588,358, filed on May 5, 2017, which is a Divisional of U.S. patent application Ser. No. 14/766,396, filed on Aug. 6, 2015, which is a U.S. National Phase of International Patent Application No. PCT/JP2014/052856, filed on Feb. 7, 2014, which is based upon and claims the benefit of priority of Japanese Patent Application No. 2013-023266, filed on Feb. 8, 2013 and Japanese Patent Application No. 2013-212878, filed on Oct. 10, 2013. The entire contents of which are hereby incorporated by reference in their entireties.

TECHNICAL FIELD

The present invention relates to solid polyaluminoxane compositions used in the oligomerization reaction or the polymerization reaction of olefins, olefin polymerization catalysts including the composition, and methods for producing olefin polymers in the presence of the catalyst.

The present invention also relates to solid polyaluminoxane composition production methods and solid polyaluminoxane compositions obtained by the production method.

BACKGROUND ART

Polyaluminoxane compositions that are partial hydrolyzates of alkylaluminums are known to serve as cocatalysts that activate transition metal complexes as the main catalysts in the production of olefin oligomers or olefin polymers. In particular, it is widely known that polymethylaluminoxane compositions prepared from trimethylaluminum as a raw material exhibit excellent cocatalytic performance (Patent Literature 1).

Polymethylaluminoxane compositions are produced by the partial hydrolysis reaction of trimethylaluminum (Patent Literatures 2 and 3) or by the pyrolysis reaction of alkylaluminum compounds which have an aluminum-oxygen-carbon bond formed by the reaction of trimethylaluminum with an oxygen-containing organic compound such as a carboxylic acid (Patent Literatures 4 and 5). Such polymethylaluminoxane compositions are marketed in the form of solutions in aromatic hydrocarbon solvents such as toluene.

When an olefin polymer is produced in such a manner that a solution of the polymethylaluminoxane composition is added as such to the polymerization system as a cocatalyst in the olefin polymerization reaction, it is impossible to control the morphology of the obtainable olefin polymer. Further, stable production is difficult because the process often experiences fouling problems by the deposition of the olefin polymer to apparatuses such as the polymerization reactor.

To realize the stable production of olefin polymers with a good particulate shape, production methods have been disclosed which involve a supported cocatalyst in which a polymethylaluminoxane composition is supported on a solid inorganic carrier such as silica, alumina, silica-alumina or magnesium chloride (Patent Literatures 6 to 9). An advantage in the use of a solid inorganic carrier is that the carrier particle diameter may be selected. In the production of olefin oligomers or olefin polymers, the carrier particle diameter is selected in accordance with the types of processes, namely, whether the process is liquid-phase polymerization such as slurry polymerization or involves a gas-phase polymerization apparatus.

However, these supported cocatalysts which have a polymethylaluminoxane composition supported on a solid inorganic carrier exhibit a markedly lower cocatalytic activity than when the polymethylaluminoxane composition is used alone, thus causing economic disadvantages. Further, the solid inorganic carriers tend to remain as foreign matters in polymers obtained and deteriorate polymer properties.

To solve the above problems, approaches have been proposed in which polyaluminoxane compositions are obtained as solids so that the polyaluminoxane compositions themselves can be used as carriers. Some of such production processes that have been disclosed are a method in which a polyaluminoxane composition in the form of a solution in an aromatic hydrocarbon solvent such as toluene is brought into contact with a bad or poor solvent and thereby a solid polyaluminoxane composition is precipitated (Patent Literatures 10 and 11), a method in which a solid slurry is obtained by the addition of a salt to polymethylaluminoxane (Patent Literature 12), a method in which a polymethylaluminoxane soluble in a bad or poor solvent is prepared and an organic boroxine is reacted with the polymethylaluminoxane (Patent Literature 13), a method similar to the method described above in which an oxygen-containing compound is reacted with a slurry that contains a solid precipitated by the contact with a bad or poor solvent (Patent Literature 14), and a method in which a polymethylaluminoxane composition in the form of a special solution having a low trimethylaluminum content is heated (Patent Literature 15).

However, the production methods described in Patent Literatures 10 to 14 are problematic from an economic viewpoint in that the polyaluminoxane composition as the solid product is recovered in a low rate relative to the polyaluminoxane composition used as the raw material. Further, these production methods do not specifically consider how to control the particle diameter of the polyaluminoxane composition or do not specifically address the uniformity of particle diameters. Furthermore, Patent Literatures 10 to 15 are substantially silent on the polymer morphology such as bulk specific gravity of olefin polymer particles obtained by the combined use of the solid polyaluminoxane composition with a transition metal compound. In particular, the production method described in Patent Literature 14 cannot produce a polyaluminoxane composition with a uniform particle diameter due to the use of a slurry.

That is, the aforementioned conventional techniques are focused primarily on the superiority over the demerits in the use of solid inorganic carriers and do not substantially reflect the merits in using solid inorganic carriers. For example, the use of silica carriers suppresses the dissolution of polyaluminoxane components into solvents by virtue of the formation of aluminum-oxygen covalent bonds by the reaction of the hydroxyl groups on the silica surface with the polymethylaluminoxane. As a result, the dissolution or the so-called leaching of a cocatalyst component, a main catalyst component or a reaction composition between a main catalyst component and a cocatalyst component into a reaction solvent is prevented from occurring during catalyst preparation steps and/or polymerization (oligomerization) reaction steps. Consequently, olefin polymers having a high bulk specific gravity may be obtained while ensuring excellent operation stability.

When a solid polyaluminoxane composition is used as a cocatalyst carrier in liquid-phase polymerization such as olefin slurry polymerization or a gas-phase polymerization process, it is necessary from the viewpoint of fouling prevention that the occurrence of leaching be suppressed to the minimum. In addition, while polymerization (oligomerization) reaction steps generally involve the addition of highly polar substances such as antistatic agents having a high-polarity functional group such as an ionic functional group or a polyether functional group in the molecule, leaching should be suppressed to a sufficient extent even in the presence of such highly polar substances.

Patent Literature 11 discloses that a solid polymethylaluminoxane composition described in Examples has a solubility in n-hexane of 1.0 mol % or more. Further, Patent Literature 15 discloses that a solid polymethylaluminoxane composition described in Examples has a 12 mol % or less molar fraction of methyl groups derived from trimethylaluminum moieties relative to the total number of moles of the methyl groups and this measurement is feasible by $^1$H-NMR in tetrahydrofuran-d$_8$ that is a highly polar compound. Namely, it is described that the tetrahydrofuran-d$_8$ soluble components in the solid polymethylaluminoxane composition have a high content of polymethylaluminoxane and a low content of trimethylaluminum.

Patent Literature 15 discloses a method for producing a solid polymethylaluminoxane composition while enhancing the uniformity of particle diameters. However, there is no specific description as to how to control the particle diameter of the solid polymethylaluminoxane composition. According to the disclosure, it is necessary that a polymethylaluminoxane composition in the form of a special solution be used as a raw material in order to obtain a solid polymethylaluminoxane composition with a high recovery rate relative to the amount of the polymethylaluminoxane composition used as the raw material. However, the raw material has a low trimethylaluminum content and this fact causes a problem in the storage stability of the raw material itself (Patent Literature 8). In addition, the production of the special polymethylaluminoxane composition solution entails the use of a high concentration of dangerous trimethylaluminum as a raw material. Thus, severe constraints are imposed on production facilities in order to realize commercial-scale production.

Patent Literature 15 uses a polymethylaluminoxane composition solution prepared by the reaction of trimethylaluminum with an oxygen-containing organic compound. Because of this configuration, the technique is incapable of controlling as desired the particle diameter of the solid polyaluminoxane produced from the polyaluminoxane composition solution. Usually, solid polyaluminoxane compositions used in liquid-phase polymerization processes such as slurry polymerization or gas-phase polymerization processes desirably have a carrier particle diameter that is optimum for the production process, and this is the case particularly when the compositions are applied to existing facilities for such polymerization processes. On the other hand, from an economic viewpoint, it is desired that a solid polyaluminoxane composition be produced with a high recovery rate relative to the amount of a polyaluminoxane composition used as a raw material in view of the expensiveness of the polyaluminoxane composition used as the raw material. However, no method has been reported which can easily produce a solid polyaluminoxane composition having a uniform particle diameter from a commercially available polyaluminoxane composition solution as a raw material while allowing the particle diameter to be varied as desired and also achieving a high recovery rate.

CITATION LIST

Patent Literature

Patent Literature 1: U.S. Pat. No. 4,960,878
Patent Literature 2: JP-A-H06-329680
Patent Literature 3: JP-A-2000-509040
Patent Literature 4: JP-A-2005-263749
Patent Literature 5: JP-A-2000-505785
Patent Literature 6: JP-A-2002-179721
Patent Literature 7: JP-A-2003-327611
Patent Literature 8: JP-A-2008-069361
Patent Literature 9: JP-A-2009-001829
Patent Literature 10: JP-B-H07-42301
Patent Literature 11: JP-A-2000-95810
Patent Literature 12: JP-A-H08-319309
Patent Literature 13: JP-A-H07-70144
Patent Literature 14: JP-A-H07-300486
Patent Literature 15: WO 2010/055652

SUMMARY OF INVENTION

Technical Problem

An object of the present invention is to provide a solid polyaluminoxane composition suitably used as a cocatalyst and a catalyst carrier in combination with an olefin oligomerization or polymerization catalyst, without the use of solid inorganic carriers such as silica. Another object is to provide a solid polyaluminoxane composition whose particle diameters are controlled to be relatively uniform and which can be applied to existing liquid-phase polymerization processes such as olefin slurry polymerization or gas-phase polymerization processes. A further object is to provide a solid polyaluminoxane composition which is such that the leaching of a cocatalyst component, a main catalyst component or a reaction composition between a main catalyst component and a cocatalyst component is suppressed to the minimum during olefin polymerization (oligomerization) reaction steps and/or catalyst preparation steps; namely, to provide a solid polyaluminoxane composition exhibiting a minimized solubility with respect to solvents.

A still further object is to provide an olefin polymerization (oligomerization) catalyst including the solid polyaluminoxane composition and a transition metal compound, and a method for producing olefin polymers in the presence of the catalyst.

Another object is to provide a method for producing a solid polyaluminoxane composition while ensuring a high recovery rate and a uniform particle diameter. A further object is to provide such a production method which does not require the use of a special polyaluminoxane composition solution as a raw material, namely, to provide a method which can produce a solid polyaluminoxane composition from a commercially available polyaluminoxane composition solution as a raw material.

Solution to Problem

The present inventors have carried out extensive studies in order to achieve the above objects. As a result, the present inventors have found that leaching that occurs during steps for the preparation of olefin polymerization (oligomerization) catalysts may be suppressed by decreasing as much as possible the solubility of solid polyaluminoxane compositions with respect to solvents. The present invention has been completed based on the finding.

Further, the present inventors have found that the contact of a specific polyaluminoxane composition solution (A) with a specific organic compound (B) described later followed by a reaction between compounds with an aluminum-carbon bond present in the polyaluminoxane composition solution (A) and the organic compound (B) under heating conditions results in a solid polyaluminoxane composition that is precipitated with a high recovery rate relative to the polyaluminoxane composition used as the raw material while ensuring that the composition has a highly uniform particle diameter that is controlled to any desired particle diameter.

A solid polyaluminoxane composition according to the present invention includes a polyalkylaluminoxane and a trialkylaluminum, the composition having a solubility in n-hexane at 25° C. of less than 0.50 mol % as measured by a method (i) described below, the composition having a solubility in toluene at 25° C. of less than 1.0 mol % as measured by a method (ii) described below, the molar fraction of alkyl groups derived from the trialkylaluminum moieties being 13 mol % or more relative to the total number of moles of alkyl groups derived from the polyalkylaluminoxane moieties and the alkyl groups derived from the trialkylaluminum moieties as measured with respect to tetrahydrofuran-$d_8$ soluble components by a method (iii) described below.

[Method (i)]

2 g of the solid polyaluminoxane composition is added to 50 mL of n-hexane held at 25° C.; the mixture is stirred for 2 hours and is filtered to give a filtrate and a residue; and the aluminum concentration in the filtrate is measured by ICP atomic emission spectroscopy (ICP-AES) to determine the solubility as the ratio of aluminum atoms present in the filtrate relative to the amount of aluminum atoms corresponding to 2 g of the solid polyaluminoxane composition.

[Method (ii)]

The solubility is measured in a similar manner to the method (i) except that toluene is used in place of n-hexane.

[Method (iii)]

0.5 mL of tetrahydrofuran (THF)-$d_8$ (a heavy solvent) is added to 10 mg of the solid polyaluminoxane composition; the mixture is stirred at 25° C. for 2 hours; and the molar fraction is determined by analyzing the THF soluble components by $^1$H-NMR at a measurement temperature of 24° C.

The solid polyaluminoxane composition of the invention preferably has a solubility in tetrahydrofuran at 25° C. of 95 mol % or less as measured by a method (iv) described below.

[Method (iv)]

The solubility is measured in a similar manner to the method (i) except that tetrahydrofuran is used in place of n-hexane.

An olefin polymerization catalyst according to the present invention is obtained by bringing the solid polyaluminoxane composition of the invention into contact with a transition metal compound (H) having a transition metal atom selected from Groups 3 to 10 in the periodic table, the transition metal compound being represented by General Formula (8) below:

$$R^{31}R^{32}R^{33}R^{34}M \qquad (8)$$

(in the formula, M is a transition metal atom selected from Groups 3 to 10 in the periodic table, and $R^{31}$, $R^{32}$, $R^{33}$ and $R^{34}$ may be the same as or different from one another and each indicate a cyclopentadienyl skeleton-containing group, an alkyl, a cycloalkyl, an aryl, an aralkyl, an alkoxy, an aryloxy, a halogen atom, an alkylsilyl, an alkylamide, an alkylimide, —SO$_3$R or a hydrogen atom).

An olefin polymer production method according to the present invention includes a step of polymerizing one or more olefins selected from α-olefins having 2 to 20 carbon atoms, cycloolefins having 3 to 20 carbon atoms and diene compounds having 4 to 20 carbon atoms in the presence of the olefin polymerization catalyst of the invention.

A solid polyaluminoxane composition production method according to the present invention includes:

a step of contacting a polyaluminoxane composition solution (A) including a polyalkylaluminoxane, a trialkylaluminum and a hydrocarbon solvent, with at least one organic compound (B) containing a Group 15-17 element in the periodic table, and a step of precipitating a solid polyaluminoxane composition by reacting the compounds with an aluminum-carbon bond present in the polyaluminoxane composition solution (A) with the organic compound (B) under heating conditions.

Preferably, the production method further includes a step of thermally aging the precipitate after the precipitation step.

Advantageous Effects of Invention

According to the present invention, it is possible to provide solid polyaluminoxane compositions suitably used as cocatalysts and catalyst carriers in combination with olefin oligomerization or polymerization catalysts without the use of solid inorganic carriers such as silica, the solid polyaluminoxane compositions exhibiting very low solubility in solvents. With the solid polyaluminoxane composition of the invention, the leaching of a cocatalyst component, a main catalyst component or a reaction composition between a main catalyst component and a cocatalyst component is suppressed to the minimum during olefin polymerization (oligomerization) reaction steps and/or catalyst preparation steps. The use of the solid polyaluminoxane composition of the invention as a cocatalyst allows polymerization to proceed with very high activity as compared to when a supported cocatalyst which has a polymethylaluminoxane composition supported on a silica carrier is used.

Further, the solid polyaluminoxane composition of the invention has relatively uniform particle diameters and is suitably used for existing liquid-phase polymerization processes such as olefin slurry polymerization or gas-phase polymerization processes.

According to the production method of the invention, a solid polyaluminoxane composition may be produced with a very high recovery rate while ensuring that the composition has a highly uniform particle diameter that is controlled to any desired particle diameter. Further, the production method of the invention may produce a solid polyaluminoxane composition in a favorable manner using a commercially available polyaluminoxane composition solution as a raw material.

BRIEF DESCRIPTION OF DRAWINGS

FIG. 1 is an electron micrograph (×1000) of a dried solid polyaluminoxane composition obtained in Test Example A1 (Test Example D1)

FIG. 2 is an electron micrograph (×1000) of a dried solid polyaluminoxane composition obtained in Test Example A7 (Test Example D14)

FIG. 3 is an electron micrograph (×200) of a dried solid polyaluminoxane composition obtained in Test Example D9.

FIG. 4 illustrates a grain size distribution evaluated with Microtrack MT3300EX II with respect to the dried solid polyaluminoxane composition obtained in Test Example D9.

FIG. 5 is an electron micrograph (×200) of a dried solid polyaluminoxane composition obtained in Test Example D31.

FIG. 6 illustrates a grain size distribution evaluated with Microtrack MT3300EX II with respect to the dried solid polyaluminoxane composition obtained in Test Example D31.

FIG. 7 is an electron micrograph (×200) of a dried solid polyaluminoxane composition obtained in Test Example D33.

FIG. 8 illustrates a grain size distribution evaluated with Microtrack MT3300EX II with respect to the dried solid polyaluminoxane composition obtained in Test Example D33.

FIG. 9 is an electron micrograph (×1000) of a dried solid polyaluminoxane composition obtained in Test Example a1.

FIG. 10 is an electron micrograph (×1000) of a dried solid polyaluminoxane composition obtained in Test Example a2

FIG. 11 is an electron micrograph (×1000) of a dried solid polyaluminoxane composition obtained in Test Example a3

FIG. 12 is an electron micrograph (×200) of a dried solid polyaluminoxane composition obtained in Test Example a5 (Test Example d4)

FIG. 13 illustrates a grain size distribution evaluated with Microtrack MT3300EX II with respect to the dried solid polyaluminoxane composition obtained in Test Example a5 Test Example d4

FIG. 14 is an electron micrograph (×1000) of a dried olefin polymerization catalyst obtained in Test Example B1.

FIG. 15 is an electron micrograph (×1000) of a dried olefin polymerization catalyst obtained in Test Example B5.

FIG. 16 is an electron micrograph (×1000) of dried particles obtained in Test Example b1.

FIG. 17 is an electron micrograph (×1000) of dried particles obtained in Test Example b2.

FIG. 18 is an electron micrograph (×1000) of dried particles obtained in Test Example b3.

DESCRIPTION OF EMBODIMENTS

[Solid Polyaluminoxane Compositions]

A solid polyaluminoxane composition of the invention includes a polyalkylaluminoxane and a trialkylaluminum. For the reason that the composition shows excellent cocatalytic performance when used in combination with an olefin oligomerization or polymerization catalyst, the composition preferably includes a polyalkylaluminoxane which contains a structural unit represented by General Formula (1) below (in the invention, also written as the "polyaluminoxane which contains a structural unit represented by General Formula (1)") and trimethylaluminum, and more preferably includes polymethylaluminoxane and trimethylaluminum. In the invention, the solid polyaluminoxane composition including polymethylaluminoxane and trimethylaluminum is also written as the "solid polymethylaluminoxane composition".

[Chem. 1]

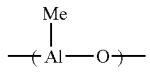

(1)

In the invention, Me indicates a methyl group.

The polyalkylaluminoxane usually includes units represented by General Formula (1) and/or General Formula (2). The structure of the polyalkylaluminoxane is not fully identified but is assumed to contain usually about 2 to 50 repeating units represented by General Formula (1) and/or General Formula (2) below. However, the configuration is not limited thereto as long as the advantageous effects of the invention may be obtained. The manner in which the units are connected together is any of various forms such as, for example, linear forms, cyclic forms and cluster forms. The polyalkylaluminoxane is assumed to be usually any one of such structures or a mixture of such structures. The polyalkylaluminoxane may be composed solely of the units represented by General Formula (1) or General Formula (2).

[Chem. 2]

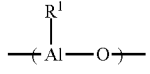

(2)

In General Formula (2), $R^1$ is usually a hydrocarbon group having 2 to 20 carbon atoms, preferably a hydrocarbon group having 2 to 15 carbon atoms, and more preferably a hydrocarbon group having 2 to 10 carbon atoms. Specific examples of the hydrocarbon groups include ethyl, propyl, n-butyl, pentyl, hexyl, octyl, decyl, isopropyl, isobutyl, sec-butyl, tert-butyl, 2-methylbutyl, 3-methylbutyl, 2-methylpentyl, 3-methylpentyl, 4-methylpentyl, 2-methylhexyl, 3-methylhexyl, 2-ethylhexyl, cyclohexyl, cyclooctyl, phenyl and tolyl.

Examples of the trialkylaluminums include trimethylaluminum having methyl groups, and trialkylaluminums and triarylaluminums having hydrocarbon groups with 2 to 20 carbon atoms.

Specific examples of the trialkylaluminums include tri(n-alkyl)aluminums such as triethylaluminum, tri(n-butyl)aluminum, tripropylaluminum, tripentylaluminum, trihexylaluminum, trioctylaluminum and tridecylaluminum; tri(branched-alkyl)aluminums such as triisopropylaluminum, triisobutylaluminum, tri(sec-butyl)aluminum, tri(tert-butyl)aluminum, tri(2-methylbutyl)aluminum, tri(3-methylbutyl)aluminum, tri(2-methylpentyl)aluminum, tri(3-methylpentyl)aluminum, tri(4-methylpentyl)aluminum, tri(2-methylhexyl)aluminum, tri(3-methylhexyl)aluminum and tri(2-ethylhexyl)aluminum; and tricycloalkylaluminums such as tricyclohexylaluminum and tricyclooctylaluminum.

Specific examples of the triarylaluminums include triphenylaluminum and tritolylaluminum. Trimethylaluminum is preferable.

The polyalkylaluminoxane present in the solid polyaluminoxane composition of the invention appropriately contains structural units represented by General Formula (1) and/or General Formula (2).

That is, the configuration of the polyalkylaluminoxane is usually such that:

(a) the polyalkylaluminoxane is composed solely of structural units represented by General Formula (1);

(b) the polyalkylaluminoxane is composed solely of structural units represented by General Formula (2) in which $R^1$s are identical;

(c) the polyalkylaluminoxane is composed of structural units represented by General Formula (2) in which $R^1$s indicate two or more kinds of substituents; or (d) the polyalkylaluminoxane contains both structural units represented by General Formula (1) and structural units represented by General Formula (2) (in which $R^1$s are identical or indicate two or more kinds of substituents).

Of these configurations, the polyalkylaluminoxane preferably contains structural units represented by General Formula (1) as is the case in (a) or (d) from the viewpoint of the cocatalytic performance in combination with an olefin oligomerization or polymerization catalyst. From a further viewpoint of the availability of the raw material, the configuration (a), namely, polymethylaluminoxane composed solely of structural units represented by General Formula (1) is more preferable.

The trialkylaluminum present in the solid polyaluminoxane composition of the invention may have any alkyl groups regardless of the type of the polyalkylaluminoxane. From the viewpoints of cocatalytic activity and raw material availability, in particular, trimethylaluminum is preferably used.

The solid polyaluminoxane composition of the invention satisfies the following requirements (i) to (iii), and preferably satisfies the following requirements (i) to (iv).

Requirement (i): The solubility in n-hexane at 25° C. is less than 0.50 mol % as measured by a method (i) described below.

Requirement (ii): The solubility in toluene at 25° C. is less than 1.0 mol % as measured by a method (ii) described below.

Requirement (iii): The molar fraction of alkyl groups derived from the trialkylaluminum moieties (hereinafter, also written as the "molar fraction (1)") is 13 mol % or more relative to the total number of moles of alkyl groups derived from the polyalkylaluminoxane moieties and the alkyl groups derived from the trialkylaluminum moieties as measured with respect to tetrahydrofuran-$d_8$ soluble components by a method (iii) described below.

[Method (i)]

2 g of the solid polyaluminoxane composition is added to 50 mL of n-hexane held at 25° C. The mixture is stirred for 2 hours and is filtered to give a filtrate and a residue. The aluminum concentration in the filtrate is measured by ICP atomic emission spectroscopy (ICP-AES) to determine the solubility as the ratio of aluminum atoms present in the filtrate relative to the amount of aluminum atoms corresponding to 2 g of the solid polyaluminoxane composition.

[Method (ii)]

The solubility is measured in a similar manner to the method (i) except that toluene is used in place of n-hexane. Specifically, 2 g of the solid polyaluminoxane composition is added to 50 mL of toluene held at 25° C.; the mixture is stirred for 2 hours and is filtered to give a filtrate and a residue; and the aluminum concentration in the filtrate is measured by ICP atomic emission spectroscopy (ICP-AES) to determine the solubility as the ratio of aluminum atoms present in the filtrate relative to the amount of aluminum atoms corresponding to 2 g of the solid polyaluminoxane composition.

[Method (iii)]

0.5 mL of tetrahydrofuran (THF)-$d_8$ (a heavy solvent) is added to 10 mg of the solid polyaluminoxane composition. The mixture is stirred at 25° C. for 2 hours. The molar fraction is determined by analyzing the THF soluble components by $^1$H-NMR at a measurement temperature of 24° C.

When the polyalkylaluminoxane present in the composition is a polyalkylaluminoxane containing a structural unit represented by General Formula (1) and the trialkylaluminums include trimethylaluminum, the molar fraction of alkyl groups derived from the trialkylaluminum moieties including trimethylaluminum (hereinafter, also written as the "molar fraction (2)") is 13 mol % or more relative to the total number of moles of alkyl groups derived from the polyalkylaluminoxane moieties and the alkyl groups derived from the trialkylaluminum moieties including trimethylaluminum as measured with respect to tetrahydrofuran-$d_8$ soluble components by the method (iii).

The molar fractions (1) and (2) of the alkyl groups include the number of moles of methyl groups.

When the polyalkylaluminoxane present in the composition is polymethylaluminoxane and the trialkylaluminum is trimethylaluminum, the molar fraction of methyl groups derived from the trimethylaluminum moieties (hereinafter, also written as the "molar fraction (3)") is 13 mol % or more relative to the total number of moles of methyl groups derived from the polymethylaluminoxane moieties and the methyl groups derived from the trimethylaluminum moieties as measured with respect to tetrahydrofuran-$d_8$ soluble components by the method (iii).

In the invention, it is preferable that the composition include a polyalkylaluminoxane containing a structural unit represented by General Formula (1) and trimethylaluminum, or include polymethylaluminoxane and trimethylaluminum.

The solid polyaluminoxane composition of the invention may be used as a catalyst carrier and is particularly suited for use as a cocatalyst and a catalyst carrier in combination with an olefin oligomerization or polymerization catalyst. However, the use of the composition is not limited thereto and the composition may be applied to other purposes that will enjoy the advantageous effects of the invention.

Preferably, the composition of the invention exhibits very low solubility with respect to n-hexane and toluene held at 25° C. In olefin polymerization (oligomerization) reaction steps and/or catalyst preparation steps, the leaching of a cocatalyst component, a main catalyst component or a reaction composition between a main catalyst component and a cocatalyst component leads to the formation of amorphous olefin polymers and is a cause of the fouling of apparatuses such as a polymerization reactor. Thus, the composition advantageously exhibits as low solubility as possible with respect to aliphatic hydrocarbon solvents represented by n-hexane and aromatic hydrocarbon solvents represented by toluene that are used in the olefin polymerization (oligomerization) reaction steps and/or the catalyst preparation steps.

From the above viewpoints and in consideration of the application of the composition to an olefin polymerization (oligomerization) reaction, the solubility with respect to n-hexane at 25° C. as measured by the method (i) is usually less than 0.50 mol %, preferably not more than 0.30 mol %, and more preferably not more than 0.10 mol %, and the solubility with respect to toluene at 25° C. as measured by the method (ii) is usually less than 1.0 mol %, preferably not more than 0.50 mol %, and more preferably not more than 0.30 mol %. As mentioned earlier, the solubility is preferably as low as possible. Thus, there is no significant point in specifying the lower limit of the solubility in n-hexane and toluene. Preferably, the lower limit is 0 mol %. The solubility may be measured in accordance with a method described in JP-B-H07-42301. The measurement method will be described in detail in Test Examples.

The molar fractions (1) and (2) in the tetrahydrofuran-$d_8$ soluble components of the solid polyaluminoxane composition may be measured by a method similar to the MMAO analysis method described in TOSOH Research & Technology Review, 2003, Vol. 47, pp. 55-60. Specifically, the molar fractions (1) and (2) may be determined based on the ratios of the respective areas assigned to the polyalkylaluminoxane having the structure of General Formula (1), the polyalkylaluminoxane having the structure of General Formula (2), trimethylaluminum and the trialkylaluminums (except trimethylaluminum) according to $^1$H-NMR measurement.

When the polyalkylaluminoxane in the solid polyaluminoxane composition is polymethylaluminoxane and the trialkylaluminum is trimethylaluminum, the molar fraction (3) may be measured by $^1$H-NMR in accordance with a method described in WO 2010/055652, specifically, may be determined based on the ratios of the respective areas assigned to polymethylaluminoxane and trimethylaluminum. The measurement method will be described in detail in Test Examples.

In the composition, the molar fractions (1) and (2) measured by the method (iii) are 13 mol % or more. That is, the tetrahydrofuran-$d_8$ soluble components preferably have a higher molar fraction of the trialkylaluminum(s). Similarly, the composition preferably has a molar fraction (3) measured by the method (iii) of 13 mol % or more, namely, the tetrahydrofuran-$d_8$ soluble components preferably have a higher molar fraction of trimethylaluminum.

It is generally known that a polyaluminoxane composition solution comes to contain gel components which are insoluble in solvents when the molar fraction of a trialkylaluminum such as trimethylaluminum is decreased. Therefore, it may be considered that a solid polyaluminoxane composition will similarly exhibit a lower solubility with respect to solvents and consequently the occurrence of leaching will be prevented to a greater extent with decreasing molar fraction of a trialkylaluminum. Thus, the invention may seem to be inconsistent with this reasoning.

In an olefin polymerization reaction using a single-site catalyst such as a metallocene catalyst or a postmetallocene catalyst, it is widely known that the catalytic activity that is exhibited when a trialkylaluminum is used alone as a cocatalyst is very low and therefore the cocatalytic performance of a polyaluminoxane composition solution is essentially dependent on a polyalkylaluminoxane component. Thus, the essence in the prevention of fouling due to the leaching of components from a solid polyaluminoxane composition will reside in the suppression of the leaching of a polyalkylaluminoxane rather than a trialkylaluminum.

In general slurry polymerization (oligomerization) reactions or gas-phase polymerization reactions, antistatic agents are added for the purpose of preventing the occurrence of fouling due to an electrostatic interaction between resultant polymer particles. Antistatic agents generally have a high-polarity functional group such as an ionic functional group or a polyether functional group in the molecule. To ensure that the occurrence of fouling due to leaching will be sufficiently prevented, it is necessary that a polyalkylaluminoxane that is an effective cocatalyst component be sufficiently restrained from leaching into a reaction solvent even in the presence of highly polar substances such as antistatic agents.

The occurrence of leaching is sometimes facilitated also by the contact with a single-site catalyst such as a metallocene catalyst or a postmetallocene catalyst, specifically, by the intramolecular polarization inherent to the transition metal complex that is the main catalyst.

In the solid polyaluminoxane composition of the invention, it is desirable from the above viewpoints that the components soluble in polar tetrahydrofuran-$d_8$ contain the polyalkylaluminoxane in a lower proportion, namely, contain the trialkylaluminum in a higher content; specifically, the molar fraction (1) in the tetrahydrofuran-$d_8$ soluble components is not less than 13 mol %, preferably not less than 14 mol %, and more preferably not less than 15 mol %. Similarly, it is desirable that the tetrahydrofuran-$d_8$ soluble components contain the polyalkylaluminoxane in a lower proportion, namely, contain the trialkylaluminums including trimethylaluminum in a higher content; specifically, the molar fraction (2) in the tetrahydrofuran-$d_8$ soluble components is not less than 13 mol %, preferably not less than 14 mol %, and more preferably not less than 15 mol %. Similarly, it is desirable that the tetrahydrofuran-$d_8$ soluble components contain polymethylaluminoxane in a lower proportion, namely, contain trimethylaluminum in a higher content; specifically, the molar fraction (3) in the tetrahydrofuran-$d_8$ soluble components is not less than 13 mol %, preferably not less than 14 mol %, and more preferably not less than 15 mol %.

If the molar fraction is less than 13 mol %, the leaching of the polyalkylaluminoxanes such as polymethylaluminoxane occurs in an increased proportion and consequently the solid polyaluminoxane composition is prone to breakage by the contact with a transition metal complex as a main catalyst. Further, such an excessively low fraction leads to phenomena such as the decrease in bulk specific gravity of olefin polymers obtained by an olefin polymerization (oligomerization) reaction, and increases the probability of the occurrence of fouling. While the upper limit of the molar fraction (1) in the tetrahydrofuran-$d_8$ soluble components is not particularly limited, the upper limit is, for example, 99 mol % in view of the fact that a lower proportion of the leaching of the polyaluminoxane is more preferable. The same applies to the upper limits of the molar fractions (2) and (3) in the tetrahydrofuran-$d_8$ soluble components.

In order to suppress the leaching of the polyalkylaluminoxane into a reaction solvent in the presence of polar compounds, it is preferable that the composition of the invention further satisfy the following requirement (iv).

Requirement (iv): The solubility in tetrahydrofuran at 25° C. as measured by a method (iv) described below is preferably 95 mol % or less, more preferably 90 mol % or less, and still more preferably 85 mol % or less. The lower limit of the solubility in tetrahydrofuran is not particularly limited as long as the advantageous effects of the invention may be obtained. From the viewpoint of leaching, the lower limit may be, for example, 1 mol %.

[Method (iv)]

The solubility is measured in a similar manner to the method (i) except that tetrahydrofuran is used in place of n-hexane. Specifically, 2 g of the solid polyaluminoxane composition is added to 50 mL of tetrahydrofuran held at 25° C.; the mixture is stirred for 2 hours and is filtered to give a filtrate and a residue; and the aluminum concentration in the filtrate is measured by ICP atomic emission spectroscopy (ICP-AES) to determine the solubility as the ratio of aluminum atoms present in the filtrate relative to the amount of aluminum atoms corresponding to 2 g of the solid polyaluminoxane composition.

The tetrahydrofuran used in the method (iv) is free from stabilizers (such as dibutylhydroxytoluene (BHT)) and has a water content of less than 2.0 ppm. The deaeration and dehydration may be performed by a method described in Organometallics, 1996, Vol. 15, pp. 1518-1520.

The solid polyaluminoxane composition of the invention is usually in the form of particles and preferably has a specific surface area in the range of 400 to 800 m²/g. It is known that the specific surface area of a carrier significantly affects the catalytic activity in an olefin polymerization reaction. If the specific surface area is small, a transition metal complex that is a main catalyst may not be activated efficiently and may exhibit low catalytic activity as a result. On the other hand, a carrier having an excessively large specific surface area generally has a small pore diameter and consequently a transition metal complex that is a main catalyst may not be supported on the carrier uniformly. In view of these facts, the specific surface area is preferably in the range of 400 to 800 m²/g, and more preferably in the range of 420 to 700 m²/g.

The specific surface area of the solid polyaluminoxane composition of the invention may be measured using the BET adsorption isotherm equation based on the adsorption and desorption phenomena of a gas on the surface of the solid. The measurement method will be described in detail in Test Examples.

The solid polyaluminoxane composition of the invention preferably has a median diameter D50 in the cumulative volume in the range of 0.1 to 100 μm. If the mean particle diameter exceeds 100 μm, the use of such a composition as an olefin polymerization (oligomerization) catalyst component results in the generation of a large amount of coarse polymer particles and may give rise to the occurrence of troubles such as the clogging of polymer discharge outlets or polymer transfer lines. If, on the other hand, the mean particle diameter is less than 0.1 μm, the catalyzed reaction will produce a large amount of micro polymer particles to facilitate the occurrence of problems associated with electrostatic attraction and further the production efficiency may be decreased due to the difficulty to settle or filter such minute particles. In view of these problems, the median diameter D50 in the cumulative volume is preferably in the range of 0.1 to 100 μm, more preferably in the range of 0.5 to 80 μm, and still more preferably in the range of 1.0 to 60 μm. For example, the median diameter D50 in the cumulative volume may be determined by a laser diffraction scattering method using MT3300EX II manufactured by Microtrack. The measurement method will be described in detail in Test Examples.

As an index of the uniformity of the particle diameters of solid polyaluminoxane compositions, WO 2010/055652 discloses a definition represented by the following equation (1).

$$\text{Uniformity} = \Sigma Xi |D50 - Di| / D50 \Sigma Xi \quad (1)$$

Here, Xi is the histogram value of a particle i, D50 is the volume-based median diameter, and Di is the volume-based diameter of the particle i. A larger value of this index indicates a broader distribution.

When the solid polyaluminoxane composition of the invention is applied to an olefin polymerization (oligomerization) process, it is preferable from the viewpoint of stable operation that the grain size distribution of the solid polyaluminoxane composition be narrow. Specifically, the uniformity represented by the above equation (1) is usually not more than 0.40, preferably not more than 0.30, more preferably not more than 0.27, and still more preferably not more than 0.25. In particular in view of the use as an alternative to a supported cocatalyst in which a polyaluminoxane composition is supported on silica, the above-defined uniformity is desirably equal to or higher than the uniformity of such a supported catalyst. In view of the fact that the solid polyaluminoxane composition forms particles by self-association, the lower limit of the uniformity may be, for example, 0.15.

The solid polyaluminoxane composition of the invention may be in the form of a slurry dispersion in a solvent, or may be in a desolvated state or in a dry state as required.

The solid polyaluminoxane composition of the invention contains no solid carriers. Here, the term solid carriers may refer to, for example, solid inorganic carriers such as silica, alumina, silica-alumina and magnesium chloride, and solid organic carriers such as polystyrene beads. The freedom from solid carriers makes it possible to avoid defects possessed by polyaluminoxane compositions containing solid carriers.

[Solid Polyaluminoxane Composition Production Methods]

Methods for producing the solid polyaluminoxane compositions of the invention will be described in detail. However, the production methods are not limited thereto as long as the advantageous effects of the invention may be obtained.

For particle diameter control reasons, the solid polyaluminoxane composition of the invention is preferably obtained by a production method including:

a step of contacting a polyaluminoxane composition solution (A) including a polyalkylaluminoxane, a trialkylaluminum and a hydrocarbon solvent, with at least one organic compound (B) containing a Group 15-17 element in the periodic table (hereinafter, also written as the "organic compound (B)"), and a step of precipitating a solid polyaluminoxane composition by reacting the compounds with an aluminum-carbon bond present in the polyaluminoxane composition solution (A) with the organic compound (B) under heating conditions.

Preferably, the production method further includes a step of thermally aging the solid polyaluminoxane composition that has been precipitated.

Hereinbelow, there will be described details of the polyaluminoxane composition solution (A) and the organic compound (B), and further will be described the method for producing the solid polyaluminoxane composition by the reaction between the component (A) and the component (B).

[Polyaluminoxane Composition Solutions (A)]

The polyaluminoxane composition solution (A) includes a polyalkylaluminoxane, preferably a polyalkylaluminoxane containing structural units represented by General Formula (3) below and/or General Formula (2) described hereinabove, more preferably a polyalkylaluminoxane containing structural units represented by General Formula (3), still more preferably polymethylaluminoxane; a trialkylaluminum, preferably trimethylaluminum; and a hydrocarbon solvent.

[Chem. 3]

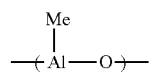

(3)

The polyaluminoxanes containing structural units represented by General Formula (3) are compounds prepared from trimethylaluminum or from two or more components including trimethylaluminum and a trialkylaluminum or a triarylaluminum having hydrocarbon groups with 2 to 20 carbon atoms. When the polyalkylaluminoxane is prepared from two or more of the above components, the compound may contain structural units represented by General Formula (2) described hereinabove. The trialkylaluminums and the triarylaluminums are as mentioned hereinabove.

Other details of the polyalkylaluminoxanes and the trialkylaluminums are as mentioned hereinabove.

The polyaluminoxane composition solution (A) used as a raw material in the production method may be prepared by any method without limitation as long as the solution includes a polyalkylaluminoxane, a trialkylaluminum and a hydrocarbon solvent. For example, this raw material may be a polymethylaluminoxane composition solution prepared from trimethylaluminum alone by the partial hydrolysis reaction of trimethylaluminum described in JP-A-H06-329680 or JP-A-2000-509040 or by the pyrolysis reaction of trimethylaluminum with an oxygen-containing organic compound described in JP-A-2005-263749 or JP-A-2000-505785. Alternatively, the raw material may be one prepared from two or more components including trimethylaluminum and a trialkylaluminum or a triarylaluminum having hydrocarbon groups with 2 to 20 carbon atoms, for example, may be a polyaluminoxane composition solution described in U.S. Pat. No. 5,041,584 or JP-A-2001-502714, namely, a so-called "modified methylaluminoxane (MMAO)".

In the production method, the polyaluminoxane composition may be any of such a composition that is soluble in hydrocarbon solvents. In consideration of commercial-scale implementation and from the viewpoint of raw material availability, it is preferable to use a polyaluminoxane composition solution widely available in the market, and it is particularly preferable to use a polymethylaluminoxane composition solution prepared by the partial hydrolysis reaction of trimethylaluminum.

The polyaluminoxane composition solution (A) may contain the unreacted trialkylaluminum such as trimethylaluminum used as a raw material in the preparation of the composition (A). Further, the polyaluminoxane composition solution (A) may contain a trialkylaluminum such as trimethylaluminum added to adjust the chemical composition.

Similarly to the molar fractions (1) to (3), the molar fraction of the alkyl groups such as methyl groups in the polyaluminoxane composition solution (A) may be measured by $^1$H-NMR in accordance with the description in WO 2010/055652 or in TOSOH Research & Technology Review, 2003, Vol. 47, pp. 55-60.

There is no particular limitation on the molar fraction of the alkyl groups derived from the trialkylaluminum moieties relative to the total number of moles of all the alkyl groups, or on the molar fraction of the methyl groups derived from the trimethylaluminum moieties relative to the total number of moles of all the alkyl groups in the polyaluminoxane composition solution (A) as measured in the aforementioned manner. It is, however, considered desirable that the amount of the polyalkylaluminoxane components be larger. When the component (A) is a polymethylaluminoxane composition solution, there is similarly no particular limitation on the molar fraction of the methyl groups derived from the trimethylaluminum moieties relative to the total number of moles of all the methyl groups as measured in the aforementioned manner. It is, however, considered desirable that the amount of the polymethylaluminoxane components be larger. In an olefin polymerization reaction using a single-site catalyst such as a metallocene catalyst or a postmetallocene catalyst, it is known that the catalytic activity that is exhibited when trimethylaluminum is used alone as a cocatalyst is very low and therefore the cocatalytic performance of a polyaluminoxane composition solution is essentially dependent on a polyalkylaluminoxane component such as polymethylaluminoxane. In the case where the preparation is made by hydrolysis, the molar fraction of the methyl groups derived from the trimethylaluminum moieties relative to the total number of moles of all the methyl groups may be usually up to 60 mol %, preferably up to 55 mol %, and more preferably up to 50 mol %. The same applies to the upper limit of the molar fraction of the alkyl groups derived from the trialkylaluminum moieties relative to the total number of moles of all the alkyl groups, and the upper limit of the molar fraction of the methyl groups derived from the trimethylaluminum moieties relative to the total number of moles of all the alkyl groups. On the other hand, the lower limit is appropriately such that gel components will not be formed and is variable depending on the method for the preparation of the polyaluminoxane composition solution (A). The lower limit is, however, generally 6 mol %, and preferably 16 mol %.

In the polyaluminoxane composition solution (A) used as a raw material, the concentration of the polyalkylaluminoxane and the trialkylaluminum to the hydrocarbon solvent is not particularly limited as long as the composition is in the form of a solution and the advantageous effects of the invention may be obtained. The concentration may be appropriately such that the solution may be stored stably without any precipitation of the polyalkylaluminoxane or the trialkylaluminum.

It is generally known that a polyaluminoxane composition solution easily experiences the deposition of gels derived from a polyalkylaluminoxane depending on preparation conditions or storage conditions (JP-A-2005-263749). Further, it is widely known to those skilled in the art that polyaluminoxane composition solutions can essentially contain gel components even if gel deposits are invisible. The polyaluminoxane composition solution (A) may contain such gel components. Although the component (A) may be used as such even when the presence of gels is visible, it is preferable that such gels be removed by an appropriate method such as filtration or decantation before the use of the solution in order to control the uniformity in particle diameters.

The hydrocarbon solvent used in the polyaluminoxane composition solution (A) is not particularly limited as long as the advantageous effects of the invention may be obtained. Solvents which can dissolve the polyalkylaluminoxanes and the trialkylaluminums are preferred. Inert hydrocarbon solvents are preferable, with examples including aliphatic hydrocarbons such as pentane, isopentane, hexane, heptane, octane, decane, dodecane, hexadecane and octadecane; alicyclic hydrocarbons such as cyclopentane, cyclohexane and methylcyclopentane; and aromatic hydrocarbons such as benzene, toluene, ethylbenzene, propylbenzene, butylbenzene, xylene, trimethylbenzene, cumene, cymene and tetralin. While it is preferable to use the aromatic hydrocarbons in consideration of the boiling point and the solubility of the polyalkylaluminoxane, preferably the polyalkylaluminoxane containing structural units represented by General Formula (3), and more preferably polymethylaluminoxane, the aliphatic hydrocarbon solvents or the alicyclic hydrocarbon solvents may be mixed therewith in such amounts that any precipitation of polyalkylaluminoxane components will not be caused. Preferably, the solvent has a boiling point that is not less than the temperature at which a solid polyaluminoxane composition is precipitated. The boiling point is more preferably 65° C. or above. When a low-boiling solvent is used, the pressure may be increased to perform heating at a desired temperature.

[At Least One Organic Compound (B) Containing Group 15-17 Element in Periodic Table]

The at least one organic compound (B) containing a Group 15-17 element in the periodic table is not particularly limited as long as the compound can react with the compounds having an aluminum-carbon bond that are present in the composition (A), namely, the polyalkylaluminoxane and the trialkylaluminum such as trimethylaluminum in the composition (A), and can thereby form a bond between aluminum and the Group 15-17 element. Such compounds having high reactivity with the alkylaluminum compounds are preferable. The organic compound (B) may contain two or more kinds of Group 15-17 elements in the periodic table, or may contain two or more identical elements. The organic compounds differ from the polyalkylaluminoxanes described hereinabove.

From the viewpoint of the availability of the raw material (B), the at least one organic compound containing a Group 15 element in the periodic table preferably contains nitrogen or phosphorus, and the at least one organic compound containing a Group 16 element in the periodic table preferably contains oxygen or sulfur. The at least one organic compound containing a Group 17 element in the periodic table preferably contains a halogen; from the viewpoint of reactivity, it is more preferable to use a partially halogenated organic compound.

Examples of the compounds containing nitrogen include amines, imines, imides, amides, nitriles, isocyanides, nitro compounds, nitroso compounds, hydrazine compounds and nitrogen-containing heterocyclic compounds. More specifically, examples of the amines include primary to tertiary amines, diamines, triamines, polyamines, amino compounds and amino acids such as glycine.

Examples of the primary to tertiary amines include aliphatic amines such as methylamine, ethylamine, propylamine, butylamine, amylamine, hexylamine, heptylamine, octylamine, decylamine, dodecylamine, stearylamine, dimethylamine, diethylamine, dipropylamine, dibutylamine, trimethylamine and triethylamine; and aromatic amines such as aniline, benzylamine and N,N-dimethylbenzylamine, and derivatives thereof.

Examples of the diamines include ethylenediamine, tetramethylenediamine, pentamethylenediamine and phenylenediamine.

Examples of the triamines include diethylenetriamine.

Examples of the amino compounds include amino alcohols such as ethanolamine, dimethylethanolamine, diethanolamine and triethanolamine.

Examples of the imines include piperidine, piperazine, pyrrolidine and ethyleneimine.

Examples of the imides include succinimide, maleimide and phthalimide.

Examples of the amides include carboxylic acid amides, N-substituted amides such as N-substituted amides and N-disubstituted amides, aromatic amides such as aromatic amides and aromatic diamides, urea (urea), carbamide, urethane, lactam, lactim, hydrazide, imide acids and imide acid esters. Specific examples include acetamide and benzamide.

Examples of the nitriles include aliphatic nitriles such as butyronitrile and acetonitrile, and aromatic nitriles such as benzonitrile, phthalonitrile, isophthalonitrile, terephthalonitrile and tetracyanobenzene.

Examples of the isocyanides include tert-butyl isocyanide, 1,1,3,3-tetramethylbutyl isocyanide, 1-adamantyl isocyanide and 2,6-xylyl isocyanide.

Examples of the nitro compounds include nitrobenzene and nitropyridine.

Examples of the nitroso compounds include nitrosodimethylaniline and nitrosonaphthol.

Examples of the hydrazine compounds include hydrazine, methylhydrazine and phenylhydrazine.

Examples of the nitrogen-containing heterocyclic compounds include nitrogen-containing heteromonocyclic compounds and nitrogen-containing condensed heterocyclic compounds. Examples of the nitrogen-containing heteromonocyclic compounds include 5-membered ring compounds, for example, pyrrole and derivatives thereof, diazoles such as pyrazole and imidazole as well as derivatives thereof, and triazoles and derivatives thereof; and 6-membered ring compounds, for example, pyridine and derivatives thereof, diazines such as pyridazine, pyrimidine and pyrazine as well as derivatives thereof, triazines, and triazine derivatives such as melamine and cyanuric acid. Examples of the nitrogen-containing condensed heterocyclic compounds include quinoline, phenanthroline and purine.

Examples of the compounds containing phosphorus include organophosphorus compounds such as phosphines, phosphinites, phosphonites, phosphites, phosphinous amides, phosphonous diamides, phosphorous triamides, phosphoramidites, phosphorodiamidites, phosphine oxides, phosphinates, phosphonates, phosphates, phosphinic amides, phosphonodiamidates, phosphoramides, phosphoramidates, phosphorodiamidates, phosphinimides, phosphine sulfides, phosphonium ylides and organic phosphonic acids.

Examples of the phosphines include triarylphosphines, trialkylphosphines, diarylmonoalkylphosphines and monoaryldialkylphosphines. Examples of the triarylphosphines include triphenylphosphine, tri(o-tolyl)phosphine and tri(o-methoxyphenyl)phosphine. Examples of the trialkylphosphines include tricyclohexylphosphine, tri(tert-butyl)phosphine and bis(tert-butyl)methylphosphine. Examples of the monoaryldialkylphosphines include bis(cyclohexyl)biphenylphosphine and bis(tert-butyl)biphenylphosphine.

Examples of the phosphonites include aryl phosphonites such as phenyldiphenoxyphosphine; alkyl phosphonites such as butyldibutoxyphosphine; and alkylaryl phosphonites such as phenyldibutoxyphosphine.

Examples of the phosphites include aryl phosphites such as triphenyl phosphite; alkyl phosphites such as tributyl phosphite; and alkylaryl phosphites such as dimethylphenyl phosphite.

Examples of the compounds containing oxygen include alcohols, ethers, aldehydes, ketones, carboxylic acids, carboxylic anhydrides, carboxylic acid halides, esters, epoxides, carbonates and oxygen-containing heterocyclic compounds.

Examples of the compounds containing sulfur include thiols, sulfides, disulfides, sulfoxides, thioesters, thionoesters, sulfonic acids, sulfonate esters, sulfuranes, persulfuranes and sulfur-containing heterocyclic compounds.

Examples of the thiols include ethylmercaptan, propylmercaptan, butylmercaptan, amylmercaptan, hexylthiol, heptylthiol, octylthiol, nonylthiol, decylthiol, undecylthiol, dodecylthiol, tridecylthiol, tetradecylthiol, pentadecylthiol, hexadecylthiol, benzylmercaptan, o-, m- or p-tolylmercaptan, and o-, m- or p-methylphenylmethanethiol.

Examples of the sulfides include ethyl sulfide, propyl sulfide, butyl sulfide, allyl sulfide, methylethyl sulfide and methylphenyl sulfide.

Examples of the disulfides include dihexyl disulfide, diheptyl disulfide, dioctyl disulfide, dinonyl disulfide, didecyl disulfide, diundecyl disulfide, didodecyl disulfide, ditridecyl disulfide, ditetradecyl disulfide, dipentadecyl disulfide and dihexadecyl disulfide.

Examples of the sulfoxides include dimethyl sulfoxide.

Examples of the thioesters include methyl thioesters, ethyl thioesters, n-propyl thioesters, isopropyl thioesters, t-butyl thioesters, pentyl thioesters and hexyl thioesters.

Examples of the sulfonic acids include methanesulfonic acid, ethanesulfonic acid, propanesulfonic acid, butanesulfonic acid, pentanesulfonic acid, methanedisulfonic acid, 1,1-ethanedisulfonic acid, 1,1-propanedisulfonic acid, 1,2-ethylenedisulfonic acid, 1,3-propylenedisulfonic acid, hydroxymethanesulfonic acid, 2-hydroxyethanesulfonic acid, 3-hydroxypropanesulfonic acid, 4-hydroxy-2-butanesulfonic acid and 4-hydroxy-1-butanesulfonic acid.

Examples of the sulfonate esters include p-toluenesulfonates, methoxysulfonates, methanesulfonates and perfluoroalkylsulfonates.

Examples of the sulfur-containing heterocyclic compounds include thiophene and thiazole.

When the compound contains a Group 17 element (a halogen) in the periodic table, the halogen is more preferably fluorine.

Specific examples include α,α,α-trifluorotoluene, perfluorotoluene, 2-methylbenzotrifluoride, 3-methylbenzotrifluoride, 4-methylbenzotrifluoride, 1,2-bis(trifluoromethyl)benzene, 1,3-bis(trifluoromethyl)benzene, 1,4-bis(trifluoromethyl)benzene, 4,4'-bis(trifluoromethyl)diphenylmethane, 1,2-bis{3'-(trifluoromethyl)phenyl}-1,1,2,2-tetrafluoroethane, 3-(trifluoromethyl)biphenyl, 1,2-bis{2-(trifluoromethyl)phenyl}ethane, 1,3,5-tris(trifluoromethyl)benzene, α, α-difluorotoluene, 1,4-bis(difluoromethyl)benzene, 4-(bromodifluoromethyl)-1-(difluoromethyl)benzene, perfluoro(benzyltetralin), perfluoroperhydrofluorene, heptafluoroisopropylbenzene, α-fluorotoluene, 1-fluorobutane, 2-methyl-2-fluoropropane (t-butyl fluoride), 1-fluoropentane, 1-fluorohexane, 3-methyl-fluoropentane, 3-methyl-fluorohexane, 1-methyl-1-fluorocyclohexane, 1-fluoroheptane, 1-fluorooctane, 2-methyl-2-fluoroheptane, 1,2-difluoro-1-methylcyclooctane, 1-fluorononane, 1-fluorodecane, 1-fluorododecane, 1,3-difluoro-1,3,5-methylcyclooctane, 4-fluorobenzotrifluoride, 4-bromobenzotrifluoride, 4-iodobenzotrifluoride, 3-fluorobenzotrifluoride, 3-chlorobenzotrifluoride, 3-bromobenzotrifluoride, 3-iodobenzotrifluoride, 2-fluorobenzotrifluoride, 2-chlorobenzotrifluoride, 2-bromobenzotrifluoride, 2-iodobenzotrifluoride, 4-(trifluoromethyl)benzyl chloride, 4-(trifluoromethyl)benzyl bromide, 3-(trifluoromethyl)benzyl chloride, 3-(trifluoromethyl)benzyl bromide, 2-(trifluoromethyl)benzyl chloride, 2-(trifluoromethyl)benzyl bromide, 4-(trifluoromethyl)diphenyl ether, 3-(trifluoromethyl)anisole, 3,3'-bis(trifluoromethyl)diphenylmethane, 2,4-bis(trifluoromethyl)bromobenzene, 3,5-bis(trifluoromethyl)bromobenzene, 1-iodo-3,5-bis(trifluoromethyl)benzene, 3,5-bis(trifluoromethyl)anisole, 2-(trifluoromethyl)pyridine, 3-(trifluoromethyl)pyridine, 4-(trifluoromethyl)pyridine, 2,6-bis(trifluoromethyl)pyridine, 2,3-bis(trifluoromethyl)pyridine, 2-chloro-6-trifluoromethylpyridine, 2-bromo-6-(trifluoromethyl)pyridine, 2,3-dichloro-5-trifluoromethylpyridine, 2,6-dichloro-3-(trifluoromethyl)pyridine, 2-chloro-3-trifluoromethylpyridine, 2-chloro-5-trifluoromethylpyridine, 2-bromo-5-(trifluoromethyl)pyridine, 2-methoxy-3-(trifluoromethyl)pyridine, 2-methoxy-5-(trifluoromethyl)pyridine, 2-bromo-3-(trifluoromethyl)pyridine, 3-chloro-2-methoxy-5-(trifluoromethyl)pyridine, 2-chloro-6-methyl-4-(trifluoromethyl)pyridine, 3-fluoro-4-(trifluoromethyl)pyridine, 4-chloro-2-(trifluoromethyl)quinoline, 4-chloro-6-methyl-2-(trifluoromethyl)quinoline, 4,5,7-trichloro-2-(trifluoromethyl)quinoline, and 4-chloro-2,8-bis(trifluoromethyl)quinoline.

The organic compounds (B) may be used singly, or two or more may be used in combination.

From the viewpoint of reaction control described later, the organic compound (B) is preferably an organic compound containing a Group 16 element in the periodic table, and is particularly preferably an oxygen-containing organic compound (C). The reaction control includes the control of the rate of the reaction between the component (A) and the component (B), and also includes the control of the particle diameters of the solid polyaluminoxane composition.

Of the oxygen-containing organic compounds (C), examples of the compounds that exhibit high reactivity with the component (A) include aldehyde-containing organic compounds (D), ketone-containing organic compounds (E), alcohol-containing organic compounds (F) and carboxylic acid-containing organic compounds (G). In general, a polymethylaluminoxane composition solution for use as the component (A) that is prepared from trimethylaluminum is widely marketed as a toluene solution. By the use of any of the compounds (D) to (G) mentioned above, the solid polyaluminoxane composition may be prepared under mild heating conditions at temperatures not exceeding the boiling point of toluene.

Of the aforementioned compounds, the aldehyde-containing organic compounds (D), the ketone-containing organic compounds (E) and the alcohol-containing organic compounds (F) are particularly preferably used because excellent control of the particle diameters may be obtained.

The aldehyde-containing organic compounds (D) may be represented by $R^2$—CHO. $R^2$ is a hydrocarbon group having 1 to 50 carbon atoms, and is preferably a hydrocarbon group having 1 to 20 carbon atoms, with examples including alkyls, cycloalkyls, alkenyls, aryls, aralkyls and monovalent heterocyclic groups. $R^2$ may be a hydrogen atom, namely, the compound may be formaldehyde. The hydrocarbon groups may contain substituents such as hydroxyl groups, alkoxy groups, carbonyl groups, aldehyde groups, carboxylic acid groups, ester groups, amino groups, imino groups, nitrile groups and halogens.

Specific examples of the aldehyde-containing organic compounds in which $R^2$ is an alkyl include acetaldehyde, 2-chloroacetaldehyde, propionaldehyde, butyraldehyde, isobutyraldehyde, pivalaldehyde, valeraldehyde, isovaleraldehyde, 2-methylbutanal, hexanal, undecanal, 7-methoxy-3,7-dimethyloctanal, oxalaldehyde and malonaldehyde.

Examples of the compounds in which $R^2$ is a cycloalkyl include cyclohexanecarbaldehyde.

Examples of the compounds in which $R^2$ is an alkenyl include acrolein, 2-butenal, 2-pentenal, 2-hexenal, 2-heptenal, 2-octenal, 2-decenal, 2-dodecenal, 2-octadecenal, 2,4-hexadienal, 2,4-heptadienal, 2,4-octadienal, cinnamaldehyde, 2-furyl acrolein, prenal, geranial, neral, citral and farnesal.

The aryls as $R^2$ more preferably have 6 to 20 carbon atoms, and examples of such compounds include benzaldehyde, 2-naphthaldehyde, o-, m- or p-tolualdehyde, o-, m- or p-fluorobenzaldehyde, o-, m- or p-chlorobenzaldehyde, o-, m- or p-anisaldehyde, o-, m- or p-acetoxybenzaldehyde, o-, m- or p-(N,N-dimethylamino)benzaldehyde, and o-, m- or p-phthalaldehyde.

The aralkyls as $R^2$ more preferably have 7 to 21 carbon atoms, and examples of such compounds include phenylacetaldehyde and 3-phenylpropionaldehyde.

The monovalent heterocyclic groups as $R^2$ are preferably such that the heterocyclic ring contains 4 to 20 carbon atoms, and examples of such compounds include furfural, 2-thiophenecarbaldehyde and nicotinaldehyde.

Of these compounds, particularly preferred compounds are those in which $R^2$ is an aryl such as benzaldehyde, 2-naphthaldehyde, o-, m- or p-tolualdehyde, o-, m- or p-fluorobenzaldehyde, o-, m- or p-chlorobenzaldehyde, and o-, m- or p-phthalaldehyde; and those in which $R^2$ is an alkenyl such as acrolein, 2-butenal, 2-pentenal, 2-hexenal, 2-heptenal, 2-octenal, 2-decenal, 2-dodecenal, 2-octadecenal, 2,4-hexadienal, 2,4-heptadienal, 2,4-octadienal, cinnamaldehyde, 2-furyl acrolein, prenal, geranial, neral, citral and farnesal.

The ketone-containing organic compounds (E) may be represented by $R^3COR^4$. $R^3$ and $R^4$ may be the same as or different from each other, and are hydrocarbon groups having 1 to 50 carbon atoms, and preferably hydrocarbon groups having 1 to 20 carbon atoms, with examples including alkyls, cycloalkyls, alkenyls, aryls, aralkyls and monovalent heterocyclic groups. The hydrocarbon groups may contain substituents such as hydroxyl groups, alkoxy groups, carbonyl groups, aldehyde groups, carboxylic acid groups, ester groups, amino groups, imino groups, nitrile groups and halogens. $R^3$ and $R^4$ may be linked to each other to form a ring structure.

In the ketone-containing organic compounds, examples of the alkyls as $R^3$ and $R^4$ include methyl, ethyl, propyl, isopropyl, n-butyl, isobutyl, s-butyl, t-butyl, n-pentyl, isopentyl, t-pentyl, n-hexyl, isohexyl, s-hexyl, t-hexyl, n-heptyl, isoheptyl, s-heptyl, t-heptyl, n-octyl, isooctyl, s-octyl, t-octyl, nonyl, decyl, undecyl, dodecyl, tetradecyl, hexadecyl and octadecyl.

Examples of the cycloalkyls as $R^3$ and $R^4$ include cyclopropyl, cyclobutyl, cyclopentyl and cyclohexyl.

Examples of the alkenyls as $R^3$ and $R^4$ include vinyl, allyl, butenyl, pentenyl, hexenyl, heptenyl, octenyl, nonenyl, decenyl, dodecenyl, tetradecenyl, hexadecenyl, octadecenyl, eicosenyl, octadecadienyl, 9,12,15-octadecatrienyl, 9,11,13-octadecatrienyl and crotyl.

The aryls as $R^3$ and $R^4$ more preferably have 6 to 20 carbon atoms, and examples of such groups include phenyl, tolyl, xylyl, halogenated phenyl, naphthyl, anthryl, phenanthrene and perylene.

The aralkyls as $R^3$ and $R^4$ more preferably have 7 to 21 carbon atoms, and examples of such groups include benzyl, naphthylmethyl and anthrylmethyl.

The monovalent heterocyclic groups as $R^3$ and $R^4$ are more preferably such that the heterocyclic ring contains 4 to 20 carbon atoms, and examples of such groups include furyl, pyrrolyl, pyrrolidyl, pyridyl and thiophenyl.

Specific examples of the ketone-containing organic compounds include ketones such as acetone, ethyl methyl ketone, propyl methyl ketone, isopropyl methyl ketone, butyl methyl ketone, isobutyl methyl ketone, diethyl ketone, diisopropyl ketone, 2-undecanone, methyl vinyl ketone, acrylophenone, mesityl oxide, fluoroacetone, chloroacetone, 2,4-pentanedione, cyclobutanone, cyclopentanone, cyclohexanone, 2-methylcyclohexanone, cyclodecanone, 2-norbornanone, 2-adamantanone, tetrahydropyran-4-one, benzylacetone, 1-indanone, 2-indanone, α-tetralone, β-tetralone, 7-methoxy-2-tetralone, acetophenone, propiophenone, dibenzyl ketone, 3,4-dimethylacetophenone, 2-acetonaphthone, 2-chloroacetophenone, o-, m- or p-fluoroacetophenone, benzalacetophenone, o-, m- or p-nonylacetophenone, phenyl benzyl ketone, cyclohexyl phenyl ketone, benzophenone, o-, m- or p-chlorobenzophenone, o-, m- or p-methylbenzophenone, 2,4-dimethylbenzophenone, butyrophenone, isobutyrophenone, pivalophenone, valerophenone, caprophenone, enanthophenone, caprylophenone, nonanophenone, decanophenone, undecanophenone, laurophenone, palmitophenone, 2-benzoylnaphthalene, 1,3-dibenzoylpropane, 2-benzoylpyridine, vinyl methyl ketone, vinyl ethyl ketone, cinnamyl methyl ketone and furfural acetone.

Of these, particularly preferred compounds include acetophenone, propiophenone, 3,4-dimethylacetophenone, o-, m- or p-chlorobenzophenone, o-, m- or p-fluoroacetophenone, o-, m- or p-methylbenzophenone, 2-acetonaphthone, benzalacetophenone, o-, m- or p-nonylacetophenone, phenyl benzyl ketone, cyclohexyl phenyl ketone, benzophenone, 2,4-dimethylbenzophenone, butyrophenone, isobutyrophenone, pivalophenone, valerophenone, caprophenone, enanthophenone, caprylophenone, nonanophenone, decanophenone, undecanophenone, laurophenone, palmitophenone, vinyl methyl ketone, vinyl ethyl ketone, cinnamyl methyl ketone and furfural acetone.

The alcohol-containing organic compounds (F) may be represented by $R^5$—OH. $R^5$ is a hydrocarbon group having 1 to 50 carbon atoms, and is preferably a hydrocarbon group having 1 to 20 carbon atoms, with examples including alkyls, cycloalkyls, alkenyls, aryls, aralkyls and monovalent heterocyclic groups. $R^5$ may be a hydrogen atom, namely, the compound may be water. The hydrocarbon groups may contain substituents such as hydroxyl groups, alkoxy groups, carbonyl groups, aldehyde groups, carboxylic acid groups, ester groups, amino groups, imino groups, nitrile groups and halogens.

Specific examples of the alcohol-containing organic compounds in which $R^5$ is an alkyl include methanol, ethanol, propanol, isopropanol, butanol, isobutanol, s-butanol, t-butanol, pentanol, 3-methyl-1-butanol, hexanol, 4-methyl-1-pentanol, 1-phenyl-1-pentanol, heptanol, 5-methyl-1-hexanol, octanol, 2-ethylhexanol, 6-methyl-1-heptanol, nonanol, decanol, undecanol, dodecanol, tridecanol, tetradecanol, pentadecanol, hexadecanol, heptadecanol, octadecanol, nonadecanol, eicosanol, 2-octyl-1-dodecanol, glycol, propylene glycol, 1,3-propanediol, 1,4-butanediol, glycerol, pentanediol, hexanediol, heptanediol, octanediol, nonanediol, decanediol, dodecanediol, octadecanediol and furfuryl alcohol.

Examples of the compounds in which $R^5$ is a cycloalkyl include cyclohexanol and 1- or 2-tetralol.

Examples of the compounds in which $R^5$ is an alkenyl include propenol, crotyl alcohol, 2-hexen-1-ol, 2-hepten-1-ol, 2-octen-1-ol, 2-dodecen-1-ol, 2-octadecenol, cinnamyl alcohol, prenol, 2-methyl-3-buten-2-ol, geraniol, linalool, farnesol, nerolidol, phytol, isophytol, geranyl linalool, sorbyl alcohol and 2,4-heptadien-1-ol.

The aryls as $R^5$ more preferably have 6 to 20 carbon atoms, and examples of such compounds include phenol, o-, m- or p-cresol, o-, m- or p-chlorophenol, 2,3,4,5,6-pentafluorophenol, 1,2-, 1,3- or 1,4-benzenediol and naphthol.

The aralkyls as $R^5$ more preferably have 7 to 21 carbon atoms, and examples of such compounds include benzyl alcohol, o-, m- or p-methylbenzyl alcohol, o-, m- or p-isopropylbenzyl alcohol, o-, m- or p-fluorobenzyl alcohol, 1-phenylethyl alcohol, 1-phenyl-1-propanol, 2-phenyl-2-propanol and 1-(o-, m- or p-tolyl)ethanol.

The monovalent heterocyclic groups as R⁵ are more preferably such that the heterocyclic ring contains 4 to 20 carbon atoms, and examples of such compounds include tetrahydrofuran-2-ol, tetrahydrofuran-2,4-diol and 2-hydroxypiperidine.

Of the aforementioned compounds, particularly preferred compounds include 1-phenyl-1-pentanol, propenol, crotyl alcohol, 2-hexen-1-ol, 2-hepten-1-ol, 2-octen-1-ol, 2-dodecen-1-ol, 2-octadecenol, cinnamyl alcohol, prenol, 2-methyl-3-buten-2-ol, geraniol, linalool, farnesol, nerolidol, phytol, isophytol, geranyl linalool, sorbyl alcohol, 2,4-heptadien-1-ol, benzyl alcohol, o-, m- or p-methylbenzyl alcohol, o-, m- or p-isopropylbenzyl alcohol, o-, m- or p-fluorobenzyl alcohol, 1-phenylethyl alcohol, 1-phenyl-1-propanol, 2-phenyl-2-propanol, 1-(o-, m- or p-tolyl)ethanol and 2,3,4,5,6-pentafluorophenol.

The carboxylic acid-containing organic compounds (G) may be represented by R⁶COOH. R⁶ is a hydrocarbon group having 1 to 50 carbon atoms, and is preferably a hydrocarbon group having 1 to 20 carbon atoms, with examples including alkyls, cycloalkyls, alkenyls, aryls, aralkyls and monovalent heterocyclic groups. R⁶ may be a hydrogen atom, namely, the compound may be formic acid. The hydrocarbon groups may contain substituents such as hydroxyl groups, alkoxy groups, carbonyl groups, aldehyde groups, carboxylic acid groups, ester groups, amino groups, imino groups, nitrile groups and halogens.

In the general formula R⁶COOH, examples of the alkyls as R⁶ include methyl, ethyl, propyl, isopropyl, butyl, isobutyl, sec-butyl, tert-butyl, 1-methylpropyl, pentyl, 1-methylbutyl, hexyl, 1-methylpentyl, heptyl, octyl, 1-methylheptyl, nonyl, decyl, dodecyl, tetradecyl, hexadecyl and octadecyl. Specific examples include acetic acid, propionic acid, butyric acid, valeric acid, isovaleric acid, caproic acid, enanthic acid, caprylic acid, pelargonic acid, capric acid, lauric acid, stearic acid, oxalic acid, malonic acid, succinic acid, glutaric acid, adipic acid, suberic acid, sebacic acid, tartaric acid, malic acid and lactic acid.

Examples of the compounds in which R⁶ is a cycloalkyl include 2-cyclopropenecarboxylic acid, cyclopentanecarboxylic acid, cyclohexanecarboxylic acid and 1-tetralincarboxylic acid.

Examples of the compounds in which R⁶ is an alkenyl include acrylic acid, methacrylic acid, crotonic acid, senecioic acid, 2-pentenoic acid, 2-hexenoic acid, 2-heptenoic acid, 2-octenoic acid, 2-nonenoic acid, geranic acid, 2-decenoic acid, 2-dodecenoic acid, 2-octadecenoic acid, farnesyl acid, geranylgeranoic acid, cinnamic acid, maleic acid, fumaric acid, traumatic acid, cinnamylideneacetic acid, sorbic acid, muconic acid and 2,4-octadienoic acid.

The aryls as R⁶ more preferably have 6 to 20 carbon atoms, with examples including phenyl, tolyl, xylyl, halogenated phenyl, naphthyl, anthryl, phenanthrene and perylene. Specific examples include benzoic acid, o-, m- or p-toluic acid, o-, m- or p-fluorobenzoic acid, 2,3,4,5,6-pentafluorobenzoic acid, o-, m- or p-chlorobenzoic acid, 4-methoxybenzoic acid, naphthoic acid, anthracenecarboxylic acid, phenanthrenecarboxylic acid, perylenecarboxylic acid, phthalic acid, isophthalic acid and terephthalic acid.

The aralkyls as R⁶ more preferably have 7 to 21 carbon atoms, with examples including benzyl, naphthylmethyl and anthrylmethyl. Specific examples include phenylacetic acid, naphthylacetic acid and anthrylacetic acid.

The monovalent heterocyclic groups as R⁶ are more preferably such that the heterocyclic ring contains 4 to 20 carbon atoms, and examples of such compounds include 2-furancarboxylic acid, 3-furancarboxylic acid, nicotinic acid and isonicotinic acid.

Of the aforementioned compounds, particularly preferred compounds include acrylic acid, methacrylic acid, crotonic acid, senecioic acid, 2-pentenoic acid, 2-hexenoic acid, 2-heptenoic acid, 2-octenoic acid, 2-nonenoic acid, geranic acid, 2-decenoic acid, 2-octadecenoic acid, farnesyl acid, geranylgeranoic acid, cinnamic acid, maleic acid, fumaric acid, traumatic acid, cinnamylideneacetic acid, sorbic acid, muconic acid, 2,4-octadienoic acid, benzoic acid, o-, m- or p-toluic acid, o-, m- or p-fluorobenzoic acid, 2,3,4,5,6-pentafluorobenzoic acid, o-, m- or p-chlorobenzoic acid, 4-methoxybenzoic acid, naphthoic acid, anthracenecarboxylic acid, phenanthrenecarboxylic acid, perylenecarboxylic acid, phthalic acid, isophthalic acid and terephthalic acid.

From the viewpoint of the reactivity between the component (A) and the component (B), the organic compound (B) is more preferably a compound which contains a structure having a multiple bond at the β position relative to the Group 15-17 element. For example, the use of a compound containing a structure represented by General Formula (4) below advantageously results in an increase in the reaction rate in the reaction between the component (A) and the component (B).

[Chem. 4]

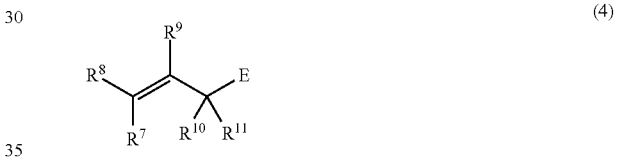

(4)

In General Formula (4), E indicates a substituent containing a Group 15-17 element. R⁷ to R¹¹ may be the same as or different from one another, and each indicate a hydrogen atom or a hydrocarbon group having 1 to 50 carbon atoms. R⁸ and R⁹, and R⁹ and R¹⁰ may be linked to each other to form an alicyclic or aromatic ring. Further, R⁸ and R⁹ may directly form a carbon-carbon bond to form a triple bond, and E and R¹⁰ and/or R¹¹ may directly form a bond between E and the carbon atom.

Here, E is preferably a substituent containing a nitrogen atom, a phosphorus atom, an oxygen atom or a sulfur atom, or is preferably a halogen-containing hydrocarbon group or a halogen atom. Specifically, the substituents containing a nitrogen atom, a phosphorus atom, an oxygen atom or a sulfur atom, the halogen-containing hydrocarbon groups and the halogen atoms are not particularly limited as long as they correspond to the aforementioned examples of the organic compounds (B) and as long as the advantageous effects of the invention may be obtained. When, for example, E is a substituent containing a nitrogen atom, the substituent appropriately corresponds to any of the aforementioned amines, imines, imides, amides, nitriles, isocyanides, nitro compounds, nitroso compounds and nitrogen-containing heterocyclic compounds.

As already mentioned, E is preferably a substituent containing a Group 16 element in the periodic table, more preferably a substituent containing an oxygen atom, still more preferably a substituent selected from alcohols, ethers, aldehydes, ketones and carboxylic acids, and particularly preferably a substituent selected from aldehydes, ketones and alcohols.

In General Formula (4), specific examples of the hydrocarbon groups having 1 to 50 carbon atoms include linear or branched aliphatic hydrocarbon groups having 1 to 50 carbon atoms, alicyclic hydrocarbon groups having 3 to 50 carbon atoms and aromatic hydrocarbon groups having 6 to 50 carbon atoms.

[Methods for Producing Solid Polyaluminoxane Compositions by Reaction of Component (A) and Component (B)]

In the production method, the polyaluminoxane composition solution (A) is contacted with the organic compound (B) and a reaction is performed between the compounds with an aluminum-carbon bond present in the polyaluminoxane composition solution (A) and the organic compound (B) under heating conditions, resulting in the precipitation of a solid polyaluminoxane composition. It is probable that components represented by General Formulae (5) to (7) below occur during the reaction process depending on the type of the organic compound (B) used which contains a Group 15-17 element in the periodic table.

$$(R^{12})Al-X(R^{13})(R^{14}) \quad (5)$$

$$(R^{12})Al-YR^{13} \quad (6)$$

$$(R^{12})Al-Z \quad (7)$$

In General Formulae (5) to (7), $R^{12}$ is a hydrocarbon group having 1 to 20 carbon atoms or is an oxygen atom. X is a Group 15 element, Y a Group 16 element, and Z a Group 17 element. $R^{13}$ and $R^{14}$ are hydrocarbon groups having 1 to 50 carbon atoms, and may be the same as or different from each other.

The components represented by General Formulae (5) to (7) have a bond between aluminum and the Group 15-17 element and result from the reaction of the organic compound (B) with the compounds having an aluminum-carbon bond, preferably an aluminum-alkyl bond, namely, the polyalkylaluminoxane and the trialkylaluminum such as trimethylaluminum present in the polyaluminoxane composition solution (A) (Australian Journal of Chemistry, 1974, Vol. 27, pp. 1639-1653, 1974, Vol. 27, pp. 1655-1663, and 1974, Vol. 27, pp. 1665-1672, Tetrahedron Letters, 1997, Vol. 38, pp. 5679-5682). When the organic compound used in the reaction contains a Group 15-16 element in the periodic table, the components represented by General Formulae (5) to (7) further react with aluminum. Consequently, when, for example, the element Y in General Formula (6) is oxygen, an aluminum-oxygen-aluminum bond is formed (Australian Journal of Chemistry, 1974, Vol. 27, pp. 1639-1653). That is, it is probable that the polyalkylaluminoxane has various chain lengths as a result of the reaction of the component (B) with the compounds having an aluminum-carbon bond, preferably an aluminum-alkyl bond, present in the polyaluminoxane composition solution (A).

The present inventors assume that the type of the organic compound (B) has an importance in controlling the particle diameters and the uniformity of the particle diameters of the solid polyaluminoxane composition. The present inventors presume that the organic compound (B) not only gives rise to a direct change in the chain lengths of the polyalkylaluminoxane by reacting with the aluminum-carbon bonds, preferably the aluminum-alkyl bonds, but also affects the self-association of the polyalkylaluminoxane molecules. Probably as a result of the direct change in the polyalkylaluminoxane chain lengths and the self-association of the polyalkylaluminoxane molecules, the resultant polyaluminoxane composition is precipitated as a solid having an energetically stable particle diameter when the composition reaches its solubility limit with respect to the solvent.

The present inventors also assume that the size of the energetically stable particle diameters of the solid polyaluminoxane composition is largely dependent on the properties of the organic compound (B) that is added. When, for example, the organic compound (B) includes a component having a long-chain alkyl group, the solid polyaluminoxane composition tends to have a smaller mean particle diameter. For example, one of the possible reasons that explain this phenomenon is such that when one or more of $R^{12}$ to $R^{14}$ in the components represented by General Formulae (5) to (7) have a long-chain alkyl group, the long-chain alkyl groups repel each other to inhibit the polyalkylaluminoxane molecules from coming close to one another and consequently the self-association of the polyalkylaluminoxane molecules is difficult to occur and the mean particle diameter becomes small.

When, on the other hand, the organic compound (B) strongly assists the self-association of the polyalkylaluminoxane molecules by serving as, for example, a template, the mean particle diameter will be increased.

In the production method, as described above, it is possible to control the particle diameter of the solid polyaluminoxane composition as desired by changing the type of the organic compound (B). Specifically, the median diameter D50 in the cumulative volume may be controlled in the range of 0.1 to 100 μm. In terms of the uniformity of the particle diameters of the solid polyaluminoxane composition, a further enhancement in uniformity may be obtained in the range of the median diameter D50 in the cumulative volume of from 0.5 to 80 μm. A still further enhancement in uniformity may be obtained in the range of the median diameter of from 1.0 to 60 μm. Details of the median diameter D50 and the measurement method are as described hereinabove and in Test Examples.

The solid polyaluminoxane composition prepared by the production method has a relatively narrow grain size distribution. The uniformity of particle diameters determined by the equation (1) may be controlled to 0.40 or less. In consideration of the use as an alternative to a supported cocatalyst in which a polyaluminoxane composition is supported on silica, the uniformity is desirably equal to or higher than the uniformity of such a supported catalyst. The uniformity of the solid polyaluminoxane composition determined by the aforementioned equation is preferably controlled to 0.30 or less, more preferably 0.27 or less, and still more preferably 0.25 or less.

The specific surface area of the solid polyaluminoxane composition obtained by the production method is usually about 400 to 800 ($m^2$/g). The measurement method will be described in detail in Examples. The specific surface area of the composition is markedly larger than in the conventional techniques (see JP-B-H07-42301 and WO 2010/055652). The reasons for this are not clear, but the present inventors assume that the increase in specific surface area is associated with the roles of the component (B) in the process of forming the composition.

The solid polyaluminoxane composition may contain the unreacted raw materials, namely, the unreacted polyalkylaluminoxane, trialkylaluminum such as trimethylaluminum and organic compound (B). The composition is usually dried but may contain a remaining amount of the hydrocarbon solvent.

In view of the roles of the organic compound (B) to control the particle diameters, the amount in which the organic compound (B) is added is also considered as an important factor. The amount of the organic compound (B) added to the polyaluminoxane composition solution (A) depends on the type of the organic compound (B) and is not particularly limited as long as the advantageous effects of the invention may be obtained. In order to obtain a certain effect in controlling the particle diameters of the solid polyaluminoxane composition, however, the amount is preferably 0.01 to 0.35 mol, more preferably 0.03 to 0.3 mol, and still more preferably 0.05 to 0.25 mol per 1 mol of aluminum in the component (A).

The upper limit of the concentration A (wt %) of the total of the polyalkylaluminoxane and the trialkylaluminum in the polyaluminoxane composition solution (A) depends on how the polyaluminoxane composition solution is obtained. When the composition (A) is purchased in the market, the upper limit is about 30 wt %. However, this does not necessarily apply when the composition is prepared from a trialkylaluminum such as trimethylaluminum. Because the concentration A affects the reaction rate, the upper limit is preferably 40 wt %, more preferably 30 wt %, and still more preferably 25 wt % in consideration of the influence on the uniformity of the particle diameters of the solid polyaluminoxane composition. On the other hand, the lower limit of the concentration A (wt %) is preferably 1 wt % or above, more preferably 3 wt % or above, and still more preferably 5 wt % or above in consideration of the productivity of the solid polyaluminoxane composition.

The production method includes a step of contacting the polyaluminoxane composition solution (A) with the organic compound (B). The organic compound (B) may be brought into contact with the polyaluminoxane composition solution (A) by any method without limitation as long as the advantageous effects of the invention may be obtained. For example, the contacting method may be such that the solid or liquid component (B) is added at once or in portions to the polyaluminoxane composition solution (A); a solution or a suspension of the component (B) in the same hydrocarbon solvent as in the component (A) is added at once or in portions to the polyaluminoxane composition solution (A); or the component (A) is added to the component (B). To ensure a uniform reaction, the contact preferably takes place by the addition of the component (B) to the component (A). In the case where two or more organic compounds (B) are used in combination, the components (B) may be added separately or as a mixture of two or more components.

The reaction of the polyaluminoxane composition solution (A) with the organic compound (B) may be performed in any reaction apparatus without limitation. Exemplary reaction apparatuses include batchwise reactors (tanks), (continuous) tubular reactors and continuous tank reactors. When a tank reactor is used, conditions such as the reactor volume, and the type and the rotational speed of a stirrer may be selected appropriately in accordance with the desired properties such as the particle diameter and the grain size distribution of the solid polyaluminoxane composition.

The temperature at which the polyaluminoxane composition solution (A) and the organic compound (B) are contacted with each other is not particularly limited as long as the temperature is not more than 200° C., and may be selected in accordance with the type of the organic compound (B) to be added. Specifically, the temperature is selected in consideration of the reactivity of the organic compound (B) with the aluminum-carbon bonds, preferably the aluminum-alkyl bonds. For example, the uniformity of particle diameters can be lowered in the event of the precipitation of the solid polyaluminoxane composition during the addition of the organic compound (B). When the reactivity between (A) and (B) is very high as in such cases, it will be possible to increase the uniformity in particle diameters by performing the contact at a lower temperature. When, on the other hand, the reactivity between (A) and (B) is low, increasing the contact temperature is desirable but gives rise to a concern that the polyaluminoxane composition solution (A) itself may be degraded by heating.

From the above viewpoints, the polyaluminoxane composition solution (A) and the organic compound (B) are preferably contacted at a temperature in the range of −10 to 120° C., more preferably in the range of −5 to 110° C., and still more preferably in the range of 0 to 95° C. Further decreasing the lower limit of the contact temperature does not have any particular influence on the reaction itself as long as the polyalkylaluminoxane such as polymethylaluminoxane is not precipitated as gels. However, the above lower limit is considered as preferable in consideration of the service costs incurred for commercial production.

From the viewpoint of particle diameter control, it is also preferable that the polyaluminoxane composition solution (A) and the organic compound (B) be contacted under heating conditions. Further, it is also preferable that the polyaluminoxane composition solution (A) and the organic compound (B) be preheated prior to the contact and be contacted with each other at the preheating temperature or at a further elevated temperature. More preferably, the contact takes place at a temperature reached by preheating because the solid polyaluminoxane composition may be precipitated as particles having relatively uniform diameters. In any of the above cases, the contact temperature is not particularly limited as long as the advantageous effects of the invention may be obtained, but, from the viewpoint of particle diameter control, is preferably 40° C. or above, more preferably 50 to 100° C., and still more preferably 60 to 90° C.

The production method includes a step of precipitating at least part of a solid polyaluminoxane composition by reacting the compounds with an aluminum-carbon bond present in the polyaluminoxane composition solution (A) with the organic compound (B) under heating conditions. Here, the phrase "at least part" does not limit the amount of precipitation to any particular amount as long as the solid polyaluminoxane composition is precipitated. In the production method, the phrase "under heating conditions" means that the system is heated at normal temperature or above.

After the contact between the polyaluminoxane composition solution (A) and the organic compound (B), the reaction may be performed at the contact temperature, or the temperature of the reaction liquid may be increased continuously or stepwise in order to accelerate the reaction. As long as the reaction is performed under heating conditions, the temperature may be lower than the contact temperature. When the temperature is increased, the heating rate is not particularly limited but is appropriately in the range of about 0.01 to 5° C./min in consideration of heating facility limitations in commercial-scale production. The reaction liquid may contain at least part of the solid polyaluminoxane composition that has been precipitated during or after the contact.

The progress of the reaction between the polyaluminoxane composition solution (A) and the organic compound (B) is accompanied by the precipitation of the solid polyaluminoxane composition as the product. Any precipitation onset temperature that is less than 40° C. is not favorable from the viewpoint of the uniformity of particles because gels or amorphous particles are easily precipitated. Thus, when the component (A) and the component (B) are contacted together at below 40° C., it is desirable that the reaction liquid be heated so that the precipitation onset temperature is increased to 40° C. or above, preferably 45° C. or above, and more preferably 50° C. or above. Further, any precipitation of the solid polyaluminoxane composition during the addition of the organic compound (B) is not favorable from the viewpoint of the uniformity of particle diameters. Thus, the heating for the precipitation is preferably performed at a temperature that is not less than the temperature of the contact between the polyaluminoxane composition solution (A) and the organic compound (B).

The production method may further include a step of thermally aging the reaction liquid which contains the solid polyaluminoxane composition precipitated.

The thermal aging allows the reaction between the component (A) and the component (B) to proceed to a further extent and thus makes it possible to obtain the solid polyaluminoxane composition in a high yield. The thermal aging temperature is not particularly limited as long as the advantageous effects of the invention may be obtained. To obtain a high yield, the temperature is preferably 65 to 200° C., more preferably 70 to 180° C., still more preferably 80 to 170° C., further preferably 90 to 150° C., and most preferably 93 to 130° C. The thermal aging may be carried out while keeping the temperature at which at least part of the solid polyaluminoxane composition has been precipitated.

The amount of the precipitation of the solid aluminoxane composition is increased with the progress of the reaction between the component (A) and the component (B). When the amount has reached a certain level, the increase in the amount of precipitation becomes slow. When the reaction is performed under the same reaction conditions while changing the types of the organic compounds (B), the amounts of the solid polyaluminoxane composition precipitated at any given time are variable. Although it seems that the rate of the recovery of the solid aluminoxane composition is largely dependent on the types of the organic compounds (B), it is possible to precipitate the solid aluminoxane composition in a very high recovery rate by selecting the optimum reaction conditions in accordance with the type of the component (B). In the production method, the rate of the recovery of the solid aluminoxane composition may be expressed as the rate of the solidification of aluminum components, and is usually 95.0 to 99.9(%). The measurement method will be described in detail in Test Examples.

The optimum time of the reaction between the polyaluminoxane composition solution (A) and the organic compound (B) is variable depending on factors such as the chemical composition of the polyaluminoxane composition solution (A), the type and the amount of the organic compound (B), the reaction concentration and the reaction temperature. In view of productivity, conditions are desirably selected such that the reaction completes in less than 48 hours, preferably less than 36 hours, and more preferably less than 24 hours.

The precipitation of the solid polyaluminoxane composition requires a shorter time with increasing amount in which the organic compound (B) is added. Provided that the organic compound (B) is not changed, the time required for the precipitation of the solid polyaluminoxane composition tends to be decreased with decreasing molar fraction of the trialkylaluminum in the polyaluminoxane composition solution (A), with increasing reaction concentration, and with increasing reaction temperature.

It is probable that the particle diameters of the solid polyaluminoxane composition are mainly determined at the stage in which the solid is precipitated. In general, the solubility of a substance depends on temperature. Thus, the uniformity in particle diameters will be increased with decreasing variations in temperature during the precipitation of the solid polyaluminoxane composition. From this viewpoint, it will be desirable that the difference in reaction temperature be smaller from the initial stage to the final stage of the reaction. Accordingly, it is more preferable to select a component (B) which can react with the component (A) under relatively mild heating conditions and which is such that a solid polyaluminoxane composition with relatively uniform particle diameters is precipitated with the progress of the reaction.

As already mentioned, a preferred organic compound (B) is an oxygen-containing organic compound (C). By the use of this component in the reaction with the component (A), the reaction thereof with the component (A) is allowed to proceed under relatively mild heating conditions, preferably at 40° C. or above, and a solid polyaluminoxane composition with relatively uniform particle diameters may be precipitated with the progress of the reaction. For preferred ranges of the heating conditions, a reference may be made to the thermal aging temperature.

The oxygen-containing organic compound (C) is more preferably a compound which contains a structure represented by General Formula (4) described hereinabove, namely, a structure having a multiple bond at the β position relative to the oxygen atom. The reaction between the component (A) and such a component (C) advantageously tends to proceed at an increased reaction rate. In this case, the organic compound (C) with a structure represented by General Formula (4) may be preferably added to the polyaluminoxane composition solution (A) in an amount of 0.01 to 0.35 mol, more preferably 0.03 to 0.3 mol, and still more preferably 0.05 to 0.25 mol per 1 mol of aluminum in the component (A).

Similarly in the reaction using the oxygen-containing organic compound (C), the mean particle diameter of the solid polyaluminoxane composition tends to be decreased when the resultant components represented by General Formula (6) have long-chain alkyl groups as $R^{12}$ and $R^{13}$. The long-chain alkyl groups may have branches.

The particle diameter of the solid polyaluminoxane composition tends to be varied depending on the type of the substrate of the oxygen-containing organic compound (C), namely, depending on whether the compound is an aldehyde-containing organic compound (D), a ketone-containing organic compound (E), an alcohol-containing organic compound (F) or a carboxylic acid-containing organic compound (G).

The substrates of (D) to (G) will be compared based on the production of solid polyaluminoxane compositions using these organic compounds with the proviso that the production conditions are the same and the components represented by General Formula (6) have the same $R^{13}$. The particle diameters tend to be largest when a ketone-containing organic compound (E) is used, and to be smallest when an alcohol-containing organic compound (F) is used. The reasons for this are not clear, but the present inventors assume that the oxygen-containing organic compounds (C) added have different levels of the function as a template to promote the self-association of the polyaluminoxane molecules.

When the oxygen-containing organic compound (C) is a ketone-containing organic compound (E), the compound tends to serve very strongly as a template to promote the self-association of the polyaluminoxane molecules and this effect will sometimes surpass the effects of the components represented by General Formula (6).

Usually, the particle diameters of the solid polyaluminoxane composition tend to become smaller with increasing amount of the component (C). However, the ketone-containing organic compound exhibits so strong a function as a template that the particle diameters may be sometimes increased with increasing amount of the ketone-containing organic compound.

The comparison of the rates of the precipitation of solid polyaluminoxane compositions depending on the types of the substrates of (D) to (G) shows that the rate of the precipitation of solid polyaluminoxane compositions tends to be highest when a ketone-containing organic compound (E) or an aldehyde-containing organic compound (D) is used, second highest when an alcohol-containing organic compound (F) is used, and lowest when a carboxylic acid-containing organic compound (G) is used. In these cases, the composition is usually precipitated as particles.

The production method may further include a step in which the solid polyaluminoxane composition precipitated is cleaned with, for example, any of the hydrocarbon solvents described hereinabove. The hydrocarbon solvent used is not particularly limited as long as the advantageous effects of the invention may be obtained, but is preferably selected in accordance with the purpose of use. That is, it is preferable to select a solvent which may be applied to an olefin polymerization process, or to select a solvent having a low boiling point when the purpose is drying.

[Olefin Polymerization (Oligomerization) Catalysts]

The aspects of the invention include a catalyst for the polymerization (oligomerization) of olefins (hereinafter, also written as the "olefin polymerization (oligomerization) catalyst"). The olefin polymerization catalyst of the invention may be obtained by bringing the solid polyaluminoxane composition of the invention into contact with a transition metal complex (H) represented by General Formula (8) below:

(In the formula, M is a transition metal atom, and $R^{31}$, $R^{32}$, $R^{33}$ and $R^{34}$ may be the same as or different from one another and each indicate a cyclopentadienyl skeleton-containing group, an alkyl, a cycloalkyl, an aryl, an aralkyl, an alkoxy, an aryloxy, a halogen atom, an alkylsilyl, an alkylamide, an alkylimide, —$SO_3R$ or a hydrogen atom.)

<Transition metal complexes (H)>

The transition metal complex (H) used in the invention is not particularly limited as long as it is a transition metal compound which can function as a conventional olefin polymerization (oligomerization) catalyst.

M in General Formula (8) is a Group 3 to Group 10 transition metal atom in the periodic table, with specific examples including scandium, yttrium, lanthanum, titanium, zirconium, hafnium, vanadium, tantalum, chromium, manganese, iron, cobalt, nickel, palladium and niobium. The transition metal atom is preferably in Group 3 to Group 6 of the periodic table, more preferably in Group 4 to Group 5 of the periodic table, and still more preferably in Group 4 of the periodic table.

In General Formula (8), examples of the cyclopentadienyl skeleton-containing groups include cyclopentadienyl; alkyl-substituted cyclopentadienyls such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butyl-cyclopentadienyl, methylbutylcyclopentadienyl and hexyl-cyclopentadienyl; indenyl; 4,5,6,7-tetrahydroindenyl; fluorenyl, and azulenyl. Examples of the groups further include indenyl, fluorenyl, azulenyl and groups resulting from the replacement of one or more hydrogen atoms in these groups by hydrocarbon groups. In the groups having indenyl, fluorenyl or azulenyl, some or all of the double bonds of the unsaturated ring(s) condensed to the cyclopentadienyl may be hydrogenated. The groups may be substituted with substituents such as halogen atoms and trialkylsilyls.

In General Formula (8), examples of the ligands other than the cyclopentadienyl skeleton-containing ligands include hydrocarbon groups having 1 to 12 carbon atoms. Specific examples include alkyls such as methyl, ethyl, propyl, isopropyl, butyl and pentyl; cycloalkyls such as cyclopentyl and cyclohexyl; aryls such as phenyl and tolyl; and aralkyls such as benzyl and neophyl.

Examples of the alkoxys include methoxy, ethoxy and butoxy.

Examples of the aryloxys include phenoxy.

Examples of the alkylsilyls include trimethylsilyl, triethylsilyl, t-butyldimethylsilyl and triisopropylsilyl.

Examples of the alkylamides include dimethylamide and diethylamide.

Examples of the alkylimides include methylcarbonylaminocarbonyl, ethylcarbonylaminocarbonyl and n-butylcarbonylaminocarbonyl.

Examples of the halogen atoms include fluorine, chlorine, bromine and iodine.

Examples of the ligands represented by —$SO_3R$ include p-toluenesulfonate, methanesulfonate and trifluoromethanesulfonate. R is a monovalent functional group.

Specific examples of the transition metal complexes (H) include transition metal halides, transition metal alkyls, transition metal alkoxides, and unbridged or bridged metallocene compounds.

Preferred examples of the transition metal complexes (H) in the present invention are described below, but the complexes are not limited thereto.

Of the transition metal compounds (H) mentioned above, unbridged or bridged metallocene compounds having one or more, preferably one or two cyclopentadienyl skeleton-containing groups are preferable from viewpoints such as polymerization activity. Unbridged or bridged metallocene compounds having two cyclopentadienyl skeletons are more preferable.

The cyclopentadienyl skeleton-containing groups are as described above.

When the compound has two or more cyclopentadienyl skeleton-containing groups, two of such cyclopentadienyl skeleton-containing groups may be bonded via, for example, an alkylene such as ethylene or propylene; an alkylidene such as isopropylidene or diphenylmethylene; silylene; or a substituted silylene such as dimethylsilylene, diphenylsilylene or methylphenylsilylene.

When the complex has a cyclopentadienyl skeleton, the other ligands may be hydrocarbon groups having 1 to 12 carbon atoms such as alkyls, cycloalkyls, aryls and aralkyls, alkoxys, aryloxys, halogen atoms, alkylsilyls, alkylamides, alkylimides, —$SO_3R$ or hydrogen atoms. Specific examples of these groups or atoms are as described above.

Preferred examples of the general structures of these compounds may be represented by General Formula (A1) or (A2) below.

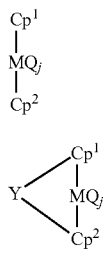

(A1)

(A2)

In Formulae (A1) and (A2), M indicates a transition metal atom similar to as defined in General Formula (8). Specific examples of M include titanium, zirconium, hafnium, vanadium, niobium and tantalum, with titanium, zirconium and hafnium being preferable.

In Formulae (A1) and (A2), Q indicates a hydrocarbon group optionally containing a heteroatom. Examples of the hydrocarbon groups include halogen-containing hydrocarbon groups, oxygen-containing hydrocarbon groups (for example, groups containing an oxygen atom in the form of alkoxy, carbonyl or carboxyl), sulfur-containing hydrocarbon groups (for example, groups containing a sulfur atom in the form of alkylthio, thiocarbonyl, thiocarboxyl or dithiocarboxyl), silicon-containing hydrocarbon groups (for example, groups containing a silicon atom in the form of —Si($R^{20}$)($R^{21}$)($R^{22}$)), phosphorus-containing hydrocarbon groups (for example, groups containing a phosphorus atom in the form of —P($R^{23}$)($R^{24}$)), nitrogen-containing hydrocarbon groups (for example, groups containing a nitrogen atom in the form of —N($R^{25}$)($R^{26}$)) and boron-containing hydrocarbon groups (for example, groups containing a boron atom in the form of —B($R^{27}$)($R^{28}$)). Specifically, Q may indicate any of optionally substituted alkyls, optionally substituted alkenyls, optionally substituted alkynyls and optionally substituted aryls. The number of carbon atoms in the hydrocarbon groups is preferably 1 to 8. More preferred are alkyls having 1 to 8 carbon atoms, alkenyls having 1 to 8 carbon atoms, optionally substituted alkynyls having 1 to 8 carbon atoms, and optionally substituted aryls having 1 to 8 carbon atoms. Alkyls having 1 to 8 carbon atoms are most preferable.

In Formulae (A1) and (A2), j is an integer of 1 to 4, preferably an integer of 2 to 4, and more preferably 2 or 3. When j is an integer of 2 or greater, the plurality of Qs may be the same as or different from one another.

In Formulae (A1) and (A2), $Cp^1$ and $Cp^2$ may be the same as or different from each other, and indicate cyclopentadienyls or substituted cyclopentadienyls which can form a sandwich structure with M. The substituted cyclopentadienyls are groups in which at least one hydrogen atom of the cyclopentadienyl is replaced by a substituent. For details of these groups, a reference may be made to the aforementioned description.

Examples of the substituents in the substituted cyclopentadienyls include hydrocarbon groups (hereinafter, also written as the "groups (f1)") and silicon-containing hydrocarbon groups (hereinafter, also written as the "groups (f2)"). Examples of the substituents in the substituted cyclopentadienyls further include heteroatom-containing hydrocarbon groups such as halogenated hydrocarbon groups, oxygen-containing hydrocarbon groups and nitrogen-containing hydrocarbon groups (except the silicon-containing hydrocarbon groups (f2)).

The groups (f1) are preferably hydrocarbon groups having 1 to 20 carbon atoms, with examples including linear or branched hydrocarbon groups (for example, alkyls, alkenyls and alkynyls), cyclic saturated hydrocarbon groups (for example, cycloalkyls) and cyclic unsaturated hydrocarbon groups (for example, aryls). The hydrocarbon groups (f1) include those groups in which any two hydrogen atoms bonded to adjacent carbon atoms in the above groups are both substituted to form an alicyclic or aromatic ring.

Specific examples of the groups (f1) include linear aliphatic hydrocarbon groups such as methyl, ethyl, n-propyl, n-butyl, n-pentyl, n-hexyl, n-heptyl, n-octyl, n-nonyl, n-decanyl and allyl (allyl); branched aliphatic hydrocarbon groups such as isopropyl, isobutyl, sec-butyl, t-butyl, amyl, 3-methylpentyl, neopentyl, 1,1-diethylpropyl, 1,1-dimethylbutyl, 1-methyl-1-propylbutyl, 1,1-propylbutyl, 1,1-dimethyl-2-methylpropyl and 1-methyl-1-isopropyl-2-methylpropyl; cyclic saturated hydrocarbon groups such as cyclopentyl, cyclohexyl, cycloheptyl, cyclooctyl, norbornyl and adamantyl; cyclic unsaturated hydrocarbon groups such as phenyl, naphthyl, biphenyl, phenanthryl and anthracenyl as well as nuclear alkyl-substituted products of these groups; and saturated hydrocarbon groups whose at least one hydrogen atom is replaced by an aryl, such as benzyl and cumyl.

Of the groups (f1), preferred examples include linear or branched aliphatic hydrocarbon groups having 1 to 20 carbon atoms, specifically, methyl, ethyl, n-propyl, n-butyl, n-hexyl, isopropyl, isobutyl, sec-butyl, t-butyl and neopentyl.

The groups (f2) are preferably silicon-containing hydrocarbon groups having 1 to 20 carbon atoms, with examples including cyclopentadienyls which have a silicon atom covalently bonded directly to a ring carbon. Specific examples include alkylsilyls (for example, trimethylsilyl) and arylsilyls (for example, triphenylsilyl).

Specific examples of the heteroatom-containing hydrocarbon groups (except the groups (f2)) include methoxy, ethoxy, phenoxy, N-methylamino, trifluoromethyl, tribromomethyl, pentafluoroethyl and pentafluorophenyl.

In Formula (A2), Y indicates a divalent hydrocarbon group having 1 to 30 carbon atoms, a divalent halogenated hydrocarbon group having 1 to 20 carbon atoms, a divalent silicon-containing group, a divalent germanium-containing group, a divalent tin-containing group, —O—, —CO—, —S—, —SO—, —SO$_2$—, —Ge—, —Sn-(tin), —NR$^a$—, —P(R$^a$)—, —P(O)(R$^a$)—, —BR$^a$— or —AlR$^a$— wherein R$^a$ is a hydrocarbon group having 1 to 20 carbon atoms, a halogenated hydrocarbon group having 1 to 20 carbon atoms, a hydrogen atom, a halogen atom or a nitrogen compound residue having one or two C1-20 hydrocarbon groups bonded to a nitrogen atom (—NRH or —NR$_2$; R is a hydrocarbon group having 1 to 20 carbon atoms).

Of the metallocene compounds, those compounds represented by General Formula (A2) above are preferable. More preferred compounds are bridged metallocene compounds represented by General Formula (II) below which are disclosed in WO 2001/27124 (hereinafter, also written as the "bridged metallocene compounds (II)").

[Chem. 6]

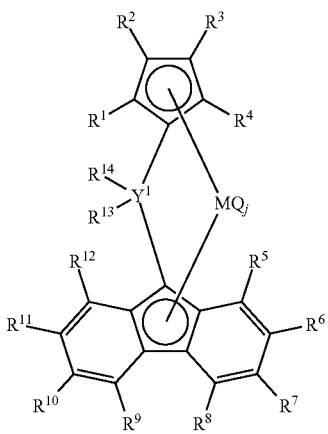

(II)

The bridged metallocene compounds (II) have the following structural characteristics [m1] to [m3].

[m1] Of the two ligands, one is cyclopentadienyl optionally having a substituent and the other is fluorenyl having a substituent (hereinafter, also written as the "substituted fluorenyl").

[m2] The two ligands are linked together via an aryl-containing covalent bridge (hereinafter, also written as the "bridge") which includes a carbon atom or a silicon atom having aryls (aryls).

[m3] The transition metal (M) constituting the metallocene compound is a Group 4 atom in the periodic table, specifically, titanium, zirconium or hafnium.

Hereinbelow, the bridged metallocene compound (II) will be described sequentially with respect to the optionally substituted cyclopentadienyl, the substituted fluorenyl, the bridge and other characteristics.

(Optionally Substituted Cyclopentadienyls)

In Formula (II), $R^1$, $R^2$, $R^3$ and $R^4$ each independently indicate a hydrogen atom, a hydrocarbon group, a silicon-containing group or a heteroatom-containing group other than silicon-containing groups, and preferably a hydrogen atom, a hydrocarbon group or a silicon-containing group. Any two adjacent groups may be bonded to each other to form a ring.

For example, $R^1$, $R^2$, $R^3$ and $R^4$ are all hydrogen atoms, or one or more of $R^1$, $R^2$, $R^3$ and $R^4$ are hydrocarbon groups (preferably hydrocarbon groups having 1 to 20 carbon atoms) or silicon-containing groups (preferably silicon-containing groups having 1 to 20 carbon atoms). These substituents may be other groups, for example, heteroatom-containing groups such as halogenated hydrocarbon groups, oxygen-containing groups and nitrogen-containing groups.

In the case where two or more of $R^1$, $R^2$, $R^3$ and $R^4$ are substituents other than hydrogen atoms, these substituents may be the same as or different from one another; any two adjacent groups of $R^1$, $R^2$, $R^3$ and $R^4$ may be bonded to each other to form an alicyclic ring or an aromatic ring.

Examples of the hydrocarbon groups represented by $R^1$ to $R^4$ as well as preferred such groups include the hydrocarbon groups (f1) defined in the description of the substituted cyclopentadienyls. Examples of the silicon-containing groups represented by $R^1$ to $R^4$ as well as preferred such groups include the silicon-containing groups (f2) defined in the description of the substituted cyclopentadienyls. Examples of the heteroatom-containing groups represented by $R^1$ to $R^4$ include those groups mentioned in the description of the substituted cyclopentadienyls.

(Substituted fluorenyls)

In Formula (II), $R^5$, $R^8$, $R^9$ and $R^{12}$ each independently indicate a hydrogen atom, a hydrocarbon group, a silicon-containing group or a heteroatom-containing group other than silicon-containing groups, and preferably a hydrogen atom, a hydrocarbon group or a silicon-containing group. $R^6$ and $R^{11}$ are the same atoms or the same groups selected from hydrogen atoms, hydrocarbon groups, silicon-containing groups and heteroatom-containing groups other than silicon-containing groups, and are preferably hydrogen atoms, hydrocarbon groups or silicon-containing groups; $R^7$ and $R^{10}$ are the same atoms or the same groups selected from hydrogen atoms, hydrocarbon groups, silicon-containing groups and heteroatom-containing groups other than silicon-containing groups, and are preferably hydrogen atoms, hydrocarbon groups or silicon-containing groups; $R^6$ and $R^7$ may be bonded to each other to form a ring, and $R^{10}$ and $R^{11}$ may be bonded to each other to form a ring; and "$R^6$, $R^7$, $R^{10}$ and $R^{11}$ cannot be hydrogen atoms at the same time".

From the viewpoint of polymerization activity, it is preferable that $R^6$ and $R^{11}$ be not hydrogen atoms, and it is more preferable that $R^6$, $R^7$, $R^{10}$ and $R^{11}$ be not hydrogen atoms. Particularly preferably, $R^6$ and $R^{11}$ are the same groups selected from hydrocarbon groups and silicon-containing groups, and $R^7$ and $R^{10}$ are the same groups selected from hydrocarbon groups and silicon-containing groups. It is also preferable that $R^6$ and $R^7$ be bonded to each other to form an alicyclic ring or an aromatic ring, and $R^{10}$ and $R^{11}$ be bonded to each other to form an alicyclic ring or an aromatic ring.

Examples of the hydrocarbon groups represented by $R^5$ to $R^{12}$ as well as preferred such groups include the hydrocarbon groups (f1) defined in the description of the substituted cyclopentadienyls. Examples of the silicon-containing groups represented by $R^5$ to $R^{12}$ as well as preferred such groups include the silicon-containing groups (f2) defined in the description of the substituted cyclopentadienyls. Examples of the heteroatom-containing groups represented by $R^5$ to $R^{12}$ include those groups mentioned in the description of the substituted cyclopentadienyls.

Preferred examples of the substituted fluorenyls in which $R^6$ and $R^7$ ($R^{10}$ and $R^{11}$) are bonded to each other to form an alicyclic ring or an aromatic ring include those groups derived from compounds represented by General Formulae (III) to (VII) described later.

(Bridges)

In Formula (II), $R^{13}$ and $R^{14}$ each independently indicate an aryl, and $Y^1$ indicates a carbon atom or a silicon atom. An important feature in the method for producing olefin polymers according to the invention is that identical or different aryls (aryls) [$R^{13}$ and $R^{14}$] are bonded to the bridging atom $Y^1$ in the bridge. For easy production, $R^{13}$ and $R^{14}$ are preferably the same as each other.

Examples of the aryls include phenyl, naphthyl, anthracenyl and groups corresponding to these groups except that one or more aromatic hydrogen atoms (sp2 hydrogen atoms) are replaced by substituents. Examples of the substituents include the hydrocarbon groups (f1) and the silicon-containing groups (f2) defined in the description of the substituted cyclopentadienyls, as well as halogen atoms and halogenated hydrocarbon groups.

Specific examples of the aryls include unsubstituted aryls having 6 to 14 carbon atoms, preferably 6 to 10 carbon atoms, such as phenyl, naphthyl, anthracenyl and biphenyl; alkyl-substituted aryls such as tolyl, dimethylphenyl, isopropylphenyl, n-butylphenyl and t-butylphenyl; cycloalkyl-substituted aryls such as cyclohexylphenyl; halogenated aryls such as chlorophenyl, bromophenyl, dichlorophenyl and dibromophenyl; and halogenated alkyl-substituted aryls such as (trifluoromethyl)phenyl and bis(trifluoromethyl)phenyl. The positions of the substituents are preferably the meta positions and/or the para positions. Of these, substituted phenyls having a substituent(s) at the meta position and/or the para position are more preferred.

(Other Characteristics of Bridged Metallocene Compounds)

In Formula (II), Q indicates an alkyl optionally containing a heteroatom, and j indicates an integer of 1 to 4. When j is an integer of 2 or greater, the plurality of Qs may be the same as or different from one another.

Examples of the alkyls represented by Q include the same atoms and groups mentioned with respect to Q in Formulae [A1] and [A2].

(Preferred Examples of Bridged Metallocene Compounds (II))

Specific examples of the bridged metallocene compounds (II) will be described below. In such compounds, octamethyloctahydrodibenzofluorenyl refers to a group derived from a compound with a structure represented by Formula (III), octamethyltetrahydrodicyclopentafluorenyl refers to a group derived from a compound with a structure represented by Formula (IV), dibenzofluorenyl refers to a group derived from a compound with a structure represented by Formula (V), 1,1',3,6,8,8'-hexamethyl-2,7-dihydrodicyclopentafluorenyl refers to a group derived from a compound with a structure represented by Formula (VI), and 1,3,3',6,6',8-hexamethyl-2,7-dihydrodicyclopentafluorenyl refers to a group derived from a compound with a structure represented by Formula (VII).

[Chem. 7]

(III)

[Chem. 8]

(IV)

[Chem. 9]

(V)

[Chem. 10]

(VI)

[Chem. 11]

(VII)

The metallocene compounds mentioned above may be produced by any known methods without limitation. Examples of such known methods include those described in WO 2001/27124, WO 2004/029062 and WO 2004/87775 filed by the present applicant.

Specific examples of the transition metal compounds of General Formula (8) in which M is zirconium will be described below without limiting the compounds to such examples:

Bis(indenyl)zirconium dichloride, bis(indenyl)zirconium dibromide, bis(indenyl)zirconiumbis(p-toluenesulfonate), bis(4,5,6,7-tetrahydroindenyl)zirconium dichloride, bis(fluorenyl)zirconium dichloride, ethylenebis(indenyl)zirconium dichloride, ethylenebis(indenyl)zirconium dibromide, ethylenebis(indenyl)dimethylzirconium, ethylenebis(indenyl)diphenylzirconium, ethylenebis(indenyl)methylzirconium monochloride, ethylenebis(indenyl)zirconiumbis(methanesulfonate), ethylenebis(indenyl)zirconiumbis(p-toluenesulfonate), ethylenebis(indenyl)zirconiumbis(trifluoromethanesulfonate), ethylenebis(4,5,6,7-tetrahydroindenyl)zirconium dichloride, isopropylidene(cyclopentadienyl-fluorenyl)zirconium dichloride, isopropylidene(cyclopentadienyl-methylcyclopentadienyl) zirconium dichloride, dimethylsilylenebis(cyclopentadienyl)zirconium dichloride, dimethylsilylenebis(methylcyclopentadienyl)zirconium dichloride, dimethylsilylenebis(dimethylcyclopentadienyl)zirconium dichloride, dimethylsilylenebis(trimethylcyclopentadienyl)zirconium dichloride, dimethylsilylenebis(indenyl)zirconium dichloride, dimethylsilylenebis(indenyl)zirconiumbis(trifluoromethanesulfonate), rac-dimethylsilylenebis{1-(2-methyl-4,5-acenaphthocyclopentadienyl)}zirconium dichloride, rac-dimethylsilylenebis{1-(2-methyl-4,5-benzoindenyl)}zirconium dichloride, rac-dimethylsilylenebis{1-(2-methyl-4-isopropyl-7-methylindenyl)}zirconium dichloride, rac-dimethylsilylenebis{1-(2-methyl-4-phenylindenyl)}zirconium dichloride, rac-dimethylsilylenebis{1-(2-methylindenyl)}zirconium dichloride, dimethylsilylenebis(4,5,6,7-tetrahydroindenyl)zirconium dichloride, dimethylsilylene(cyclopentadienyl-fluorenyl)zirconium dichloride, diphenylsilylenebis(indenyl)zirconium dichloride, methylphenylsilylenebis(indenyl)zirconium dichloride, bis(cyclopentadienyl)zirconium dichloride, bis(cyclopentadienyl)zirconium dibromide, bis(cyclopentadienyl)methylzirconium monochloride, bis(cyclopentadienyl)ethylzirconium monochloride, bis(cyclopentadienyl)cyclohexylzirconium monochloride, bis(cyclopentadienyl)phenylzirconium monochloride, bis(cyclopentadienyl)benzylzirconium monochloride, bis(cyclopentadienyl)zirconium monochloride monohydride, bis(cyclopentadienyl)methylzirconium monohydride, bis(cyclopentadienyl)dimethylzirconium, bis (cyclopentadienyl)diphenylzirconium, bis(cyclopentadienyl)dibenzylzirconium, bis(cyclopentadienyl)zirconium methoxychloride, bis(cyclopentadienyl)zirconium ethoxychloride, bis(cyclopentadienyl)zirconiumbis(methanesulfonate), bis(cyclopentadienyl)zirconiumbis(p-toluenesulfonate), bis(cyclopentadienyl)zirconiumbis(trifluoromethanesulfonate), bis(methylcyclopentadienyl)zirconium dichloride, bis(dimethylcyclopentadienyl)zirconium dichloride, bis(dimethylcyclopentadienyl)zirconium ethoxychloride, bis(dimethylcyclopentadienyl)zirconiumbis(trifluoromethane sulfonate), bis(ethylcyclopentadienyl)zirconium dichloride, bis(methylethylcyclopentadienyl)zirconium dichloride, bis(propylcyclopentadienyl)zirconium dichloride, bis(methylpropylcyclopentadienyl)zirconium dichloride, bis(n-butylcyclopentadienyl)zirconium dichloride, bis(butylcyclopentadienyl)zirconium dichloride, bis(methylbutylcyclopentadienyl)zirconium dichloride, bis(methylbutylcyclopentadienyl)zirconiumbis(methanesulfonate), bis(trimethylcyclopentadienyl)zirconium dichloride, bis(tetramethylcyclopentadienyl)zirconium dichloride, bis(pentamethylcyclopentadienyl)zirconium dichloride, bis(hexylcyclopentadienyl)zirconium dichloride, bis(trimethylsilylcyclopentadienyl)zirconium dichloride, diphenylmethylidene(cyclopentadienyl)(9-fluorenyl)zirconium dichloride, diphenylmethylene(3-tert-butyl-5-methyl-cyclopentadienyl)(2,7-di-tert-butyl-fluorenyl)zirconium dichloride, 8-octamethylfluoren-12'-yl-(2-(adamantan-1-yl)-8-methyl-3, 3b,4,5,6,7,7a,8-octahydrocyclopenta[a]indene))zirconium dichloride, bis(1,3-n-butylmethylcyclopentadienyl)zirconium (IV) dichloride, di-p-tolylmethylene(cyclopentadienyl)(octamethyloctahydrodibenzofluorenyl)zirconium dichloride, di-p-tolylmethylene(cyclopentadienyl)(octamethyloctahydrodibenzofluorenyl)zirconium (IV) dimethyl, and dimethylsilylenebis{1-(2-methyl-4-phenylindenyl)}zirconium (IV) dichloride.

In the above examples, the disubstituted cyclopentadienyl rings may be 1,2-substituted or 1,3-substituted, and the trisubstituted cyclopentadienyl rings may be 1,2,3-substituted or 1,2,4-substituted.

The alkyls such as propyl and butyl may be any of isomers such as n-, i-, sec- and tert-isomers.

In the invention, use may be made of transition metal compounds which correspond to the above zirconium compounds except that the zirconium metal is replaced by titanium metal or hafnium metal. Specific examples of such hafnium compounds include bis(t-butylcyclopentadienyl)hafnium dichloride. Further, use may be made of titanium compounds, hafnium compounds, bromides and iodides having the similar steric structures, and further transition metal compounds described in literature such as Organometallics, 1994, Vol. 13, pp. 954-963, JP-A-H03-9913, JP-A-H02-131488, JP-A-H03-21607, JP-A-H03-106907, JP-A-H03-188092, JP-A-H04-69394, JP-A-H04-300887, WO 2001/27124, JP-A-2010-144035, JP-A-2012-92199 and JP-A-2013-60518.

Examples of the transition metal compounds (H) further include those transition metal compounds represented by General Formula (9) below which are described in JP-A-H11-315109, JP-A-2000-239312, WO 2001/55231, and Chemical Review, 2011, Vol. 111, pp. 2363-2449.

[Chem. 12]

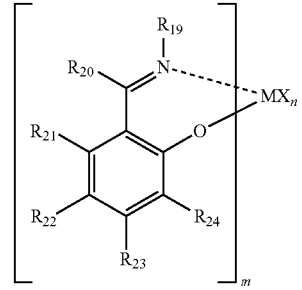

(9)

In General Formula (9), M indicates a Group 4-10 transition metal atom in the periodic table, m is an integer of 1 to 6, $R^{19}$ to $R^{24}$ may be the same as or different from one another and each indicate a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group wherein two or more of these substituents may be linked together to form a ring, when m is 2 or greater, two of the groups represented by $R^{19}$ to $R^{24}$ may be linked to each other, n is a number satisfying the valence of M, and X indicates a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group wherein when n is 2 or greater, the plurality of groups represented by X may be the same as or different from one another and the plurality of groups represented by X may be linked together to form a ring.

Specific examples include bis{N-(5-adamantyl-3-methyl-salicylidene)-2-methylcyclohexylaminato}zirconium (IV) dichloride and bis{N-(3-tert-butylsalicylidene)-2,3,4,5,6-pentafluoroanilinato}titanium (IV) dichloride.

Examples of the transition metal compounds (H) further include transition metal complexes having bridged bis-aromatic ligands which are described in WO 2003/091262, US Patent Application No. 2004/0010103 and WO 2007/136496.

Specific examples include bis((2-oxoyl-3-(3,5-bis(1,1-dimethylethyl)phenyl)-(5-(1,1-dimethylethyl)phenyl)-(4-(1,1-dimethylethyl)-2-phenoxy)-propane-1,3-diylzirconium (IV) dichloride.

Examples of the transition metal compounds (H) further include compounds represented by General Formula (10) below which are described in WO 2009/5003, JP-A-2011-178682 and JP-A-2011-195584.

[Chem. 13]

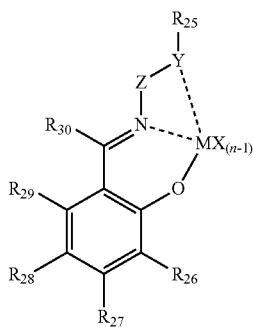

(10)

(In General Formula (10), $R^{25}$ to $R^{30}$ may be the same as or different from one another and each indicate a hydrogen atom, a halogen atom, a hydrocarbon group, a heterocyclic compound residue, an oxygen-containing group, a nitrogen-containing group, a boron-containing group, an aluminum-containing group, a sulfur-containing group, a phosphorus-containing group, a silicon-containing group, a germanium-containing group or a tin-containing group wherein two or more of these substituents may be linked together, and $R^{25}$ may be linked to Z;

M indicates a transition metal atom selected from Groups 3 to 10 of the periodic table;

n indicates the valence of M;

X indicates a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group wherein the atoms or groups represented by X may be the same as or different from one another, and the groups represented by X may be linked together to form a ring;

Y indicates an oxygen atom, a nitrogen atom, a phosphorus atom or a sulfur atom;

Z indicates an optionally substituted hydrocarbon group or heterocyclic compound residue and connects Y to N via the shortest link consisting of 4 to 6 bonds; and the bond between Y and Z may be a double bond or a triple bond, the bond between Y and $R^{25}$ may be a double bond or a triple bond, and the dotted lines in the formula indicate coordinate bonds.)

Examples of the compounds represented by General Formula (10) include trichloro{6-[(2'-methoxy-κO$^1$-biphenyl-2-yl)imino-κN$^1$-methyl]-4-methyl-2-(tricyclo[3.3.1.1$^{3,7}$]decan-1-yl)phenolato}titanium (IV) (Compound 9 described in Test Examples).

The olefin polymerization catalyst of the invention may include a solid carrier as required while ensuring that the advantageous effects of the invention are not impaired. Examples of the solid carriers include solid inorganic carriers such as silica, alumina, silica-alumina and magnesium chloride, and solid organic carriers such as polystyrene beads.

[Methods for Producing Olefin Polymerization (Oligomerization) Catalysts]

In the olefin polymerization catalyst of the present invention, the components are used in amounts described below.

In the invention, the solid polyaluminoxane composition is used in such an amount that the ratio of the number of moles of the Al atoms in the solid polyaluminoxane composition to the number of moles of the transition metal compound as the component (H) [=(number of moles of Al atoms in solid polyaluminoxane composition)/(number of moles of transition metal compound (H))] is usually 1 to 10000, preferably 3 to 3000, more preferably 5 to 1000, still more preferably 10 to 500, and particularly preferably 20 to 400.

If the ratio of the number of moles of the Al atoms in the solid polyaluminoxane composition to the number of moles of the transition metal compound as the component (H) is less than the above range, sufficient catalytic activity may not be obtained at times. Any molar ratio exceeding the above range is disadvantageous for economic reasons.

Methods for the preparation of the olefin polymerization catalysts of the present invention will be described.

The olefin polymerization catalyst of the invention may be prepared by contacting the solid polyaluminoxane composition and the component (H), namely, the transition metal compound in an organic solvent. The contacting methods are not particularly limited as long as the advantageous effects of the invention may be obtained. For example, the contacting method may be such that the solid or liquid transition metal compound (H) is added at once or in portions to a suspension of the solid polyaluminoxane composition in an organic solvent; a solution or a suspension of the component (H) in an organic solvent is added at once or in portions to a suspension of the solid polyaluminoxane composition in an organic solvent; or the solid polyaluminoxane composition or a suspension thereof in an organic solvent is added to the component (H). To ensure a uniform reaction, the contact preferably takes place by the addition of the component (H) to the solid polyaluminoxane composition. In the case where two or more transition metal compounds (H) are used in combination, the components (H) may be added separately or as a mixture of two or more components.

The solvents used in the preparation of the olefin polymerization catalysts of the invention are not particularly limited. However, solvents that do not react directly with the solid polyaluminoxane composition are preferred, and inert hydrocarbon solvents are particularly preferred. Examples include aliphatic hydrocarbons such as butane, isobutane, pentane, isopentane, hexane, heptane, octane, decane, dodecane, hexadecane and octadecane; alicyclic hydrocarbons such as cyclopentane, cyclohexane and methylcyclopentane; and aromatic hydrocarbons such as benzene, toluene, ethylbenzene, propylbenzene, butylbenzene, xylene, trimethylbenzene, cumene, cymene and tetralin. The solvents may be used singly, or two or more may be used in combination.

In the preparation of the olefin polymerization catalyst of the invention, the treatment is preferably carried out while selecting the temperature between −20 and 200° C.

The olefin polymerization catalyst of the invention may be used without being cleaned or may be used after being cleaned with any of the above organic solvents.

The olefin polymerization catalyst of the invention may be in the form of a slurry dispersion in a solvent, or may be in a desolvated state or dry state as required.

[Olefin Polymer (Olefin Oligomer) Production Methods]

An olefin polymer production method of the present invention includes a step of polymerizing an olefin in the presence of the olefin polymerization catalyst of the invention. The olefin polymerization catalyst of the invention may be used directly as a catalyst or a catalytic component, or may be used in the form of a prepolymerized catalyst obtained by prepolymerizing an olefin thereto. Olefin polymers may be produced by any of known methods as long as the method includes the above step. The term "olefin polymers" comprehends olefin homopolymers and copolymers such as block copolymers and random copolymers produced from two or more kinds of olefins.

Examples of the polymerization methods include slurry polymerization methods using nonpolar solvents such as butane, pentane, hexane, heptane and octane, gas-phase polymerization methods in which gas monomers are polymerized in contact with the catalyst, and bulk polymerization methods in which liquefied monomers are polymerized while serving as solvents. The polymerization may be single-stage polymerization, multi-stage polymerization such as two-stage polymerization, continuous polymerization or batchwise polymerization.

Specific examples of the inert hydrocarbon media used in the slurry polymerization methods include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane, and mixtures of these solvents. The olefin itself may be used as the solvent.

In the polymerization of olefins, the aforementioned olefin polymerization catalyst component is usually used in such an amount that the amount of the transition metal atoms derived from the component (H) present in the solid catalyst component is $10^{-12}$ to $10^{-1}$ mol, and preferably $10^{-8}$ to $10^{-2}$ mol per 1 liter of the reaction volume.

In the olefin polymerization using the aforementioned olefin polymerization catalyst component, the polymerization temperature is usually in the range of −50 to 200° C., preferably 0 to 170° C., and particularly preferably 40 to 170° C. The polymerization time may be usually in the range of 10 seconds to 20 hours. The polymerization pressure is usually 0.001 MPa to 250 MPa, preferably 0.005 MPa to 50 MPa, and more preferably 0.005 MPa to 10 MPa. The polymerization reaction may be performed batchwise, semi-continuously or continuously. It is also possible to carry out the polymerization in two or more stages under different reaction conditions.

The molecular weight of the obtainable olefin polymer may be controlled by adding hydrogen to the polymerization system or by changing the polymerization temperature. In order to prevent fouling or to improve particle properties, the polymerization may be carried out in the presence of at least one compound selected from polyalkylene oxide blocks, higher aliphatic amides, polyalkylene oxides, polyalkylene oxide alkyl ethers, alkyldiethanolamines and polyoxyalkylenealkylamines.

Examples of the olefins used in the olefin polymer production method of the invention include α-olefins having 2 to 20 carbon atoms, cycloolefins having 3 to 20 carbon atoms, and diene compounds having 4 to 20 carbon atoms. However, the olefins are not limited thereto as long as the advantageous effects of the invention may be obtained. In the invention, the olefins may be used singly, or two or more may be used in combination.

Examples of the α-olefins having 2 to 20 carbon atoms include ethylene, propylene, 1-butene, 1-pentene, 1-hexene, 1-heptene, 4-methyl-1-pentene, 1-octene, 1-decene, 1-dodecene, 1-hexadecene and 1-eicosene. Ethylene, propylene, 4-methyl-1-pentene, 1-hexene, 1-octene and 1-decene are preferred.

Examples of the cycloolefins having 3 to 20 carbon atoms include cyclopropene, cyclopentene, cyclohexene, cycloheptene, norbornene and tetracyclododecene. Norbornene and tetracyclododecene are preferred.

Examples of the diene compounds having 4 to 20 carbon atoms include butadiene, isoprene, 1,5-hexadiene, 1,7-octadiene, 1,3-cyclohexadiene, 1,4-cyclohexadiene, 1,5-cyclooctadiene, dicyclopentadiene, norbornadiene, 5-vinyl-2-norbornene and 5-ethylidene-2-norbornene. Butadiene, isoprene, 5-vinyl-2-norbornene and 5-ethylidene-2-norbornene are preferred.

Further, use may be made of monomers having a ring structure such as styrene, α-methylstyrene and vinylcyclohexane, polar monomers such as acrylic acid, methacrylic acid, fumaric acid, maleic anhydride, methyl acrylate, ethyl acrylate, methyl methacrylate and ethyl methacrylate, and halogenated olefins such as bisfluoroethylene, trifluoroethylene, tetrafluoroethylene, hexafluoropropene and chloroethylene.

After the completion of the polymerization, the olefin polymers obtained by the polymerization reaction may be separated and recovered from the polymerization solvent and dried by conventional known methods.

TEST EXAMPLES

The present invention is not limited to Test Examples described below.

The preparation of solid polyaluminoxane compositions of the present invention, the purification of solvents and the preparation of olefin polymerization (oligomerization) catalysts were carried out in an inert gas atmosphere. Components such as solvents were used after purification, drying and deoxygenation by known methods.

Hexane, toluene and tetrahydrofuran used in the testing of the solubility of solid polyaluminoxane compositions had a water content of less than 2.0 ppm. Tetrahydrofuran was free from stabilizers. Degasification and dehydration were carried out by a method described in Organometallics, 1996, Vol. 15, pp. 1518-1520.

Bis(n-butylcyclopentadienyl)zirconium (IV) dichloride, diphenylmethylidene(cyclopentadienyl)(9-fluorenyl)zirconium (IV) dichloride, dimethylsilylenebis(cyclopentadienyl)zirconium (IV) dichloride and bis(t-butylcyclopentadienyl)hafnium (IV) dichloride were purchased from Wako Pure Chemical Industries, Ltd.

Diphenylmethylene(3-tert-butyl-5-methyl-cyclopentadienyl) (2,7-di-tert-butyl-fluorenyl)zirconium dichloride was synthesized in accordance with a method described in WO 2004/87775.

Bis((2-oxoyl-3-(3,5-bis(1,1-dimethylethyl)phenyl)-(5-(1,1-dimethylethyl)phenyl)-(4-(1,1-dimethylethyl)-2-phenoxy)-propane-1,3-diylzirconium (IV) dichloride was synthesized with reference to synthesis procedures described in US Patent Application No. 2004/0010103.

Di-p-tolylmethylene(cyclopentadienyl)(octamethyloctahydrodibenzofluorenyl)zirconium (IV) dimethyl was synthesized by the methylation reaction of di-p-tolylmethylene (cyclopentadienyl) (octamethyloctahydrodibenzofluorenyl) zirconium (IV) dichloride described in WO 2004/029062.

In the following test methods (3) to (7), dry samples of solid polyaluminoxane compositions were used. The drying of solid polyaluminoxane compositions was performed under reduced pressure at 25° C., and was terminated when a constant weight was reached.

[Test Methods]

(1) Recovery Rate (Aluminum-Based Solidification Rate)

In Test Examples, the rate of the recovery of a solid polyaluminoxane composition was determined based on the rate of the solidification of aluminum components in the reaction between a polyaluminoxane composition solution (A) and an organic compound (B). Specifically, the aluminum content in the supernatant of the reaction solution was measured by ICP atomic emission spectroscopy (ICP-AES) using ICPS (registered trademark)-8100 manufactured by Shimadzu Corporation, and the obtained content was divided by the total aluminum content in the component (A), thereby determining the mol % of unsolidified aluminum. The recovery rate (the solidification rate) was calculated by the deduction of the percentage from 100 mol %.

(2) Grain Size Distribution: Median Diameter D50 in Cumulative Volume and Uniformity of Solid Polyaluminoxane Compositions The median diameter D50 in the cumulative volume and the uniformity of a solid polyaluminoxane composition were determined by a laser diffraction scattering method using MT3300EX II manufactured by Microtrack.

The measurement involved a sample that had been obtained beforehand by deactivating the solid polyaluminoxane composition in a wet desiccator in a stream of nitrogen. The dispersion medium was mainly methanol.

As an index of the catalyst grain size distribution, the uniformity was evaluated as defined by the following equation in accordance with a method described in WO 2010/055652.

$$\text{Uniformity} = \Sigma Xi|D50-Di|/D50/Xi$$

Here, Xi is the histogram value of a particle i, D50 is the volume-based median diameter, and Di is the volume-based diameter of the particle i.

Olefin polymers having uniform particle diameters tend to be obtained with decreasing value of the uniformity.

(3) Solubility

The solubility of a solid polyaluminoxane composition of the invention with respect to n-hexane and toluene at 25° C. was measured in accordance with a method described in JP-B-H07-42301. Specifically, the solid polyaluminoxane composition obtained was dried and tested to measure the solubility in the solvent. The solubility ratio with respect to n-hexane was determined by adding 2 g of the solid polyaluminoxane composition to 50 mL of n-hexane held at 25° C., stirring the mixture for 2 hours, separating the solution with use of a G-4 glass filter, and measuring the aluminum concentration in the filtrate. The solubility ratio obtained by this method represents the ratio of aluminum atoms present in the filtrate relative to the amount of aluminum atoms corresponding to 2 g of the solid polyaluminoxane composition used as the sample. The drying of the solid polyaluminoxane composition was performed under reduced pressure at 25° C., and was terminated when a constant weight was reached.

The solubility with respect to tetrahydrofuran at 25° C. was measured by the same method as above except that the solvent was replaced by 50 mL of tetrahydrofuran.

(4) Aluminum Content

The aluminum content in solid polyaluminoxane compositions and polyaluminoxane composition solutions (A) was measured by ICP atomic emission spectroscopy (ICP-AES) using ICPS (registered trademark)-8100 manufactured by Shimadzu Corporation.

(5) Molar Fractions (1) to (3) of Alkyl Groups or Methyl Groups (5-1) A solid polyaluminoxane composition was tested by a method similar to the MMAO analysis method described in TOSOH Research & Technology Review, 2003, Vol. 47, pp. 55-60 to measure the following molar fractions in tetrahydrofuran-$d_8$ soluble components: the molar fraction (1) of alkyl groups derived from trialkylaluminum moieties relative to the total number of moles (the total moles) of alkyl groups derived from polyalkylaluminoxane moieties and the alkyl groups derived from the trialkylaluminum moieties; and the molar fraction (2) of alkyl groups derived from trialkylaluminum moieties including trimethylaluminum relative to the total number of moles (the total moles) of alkyl groups derived from polyalkylaluminoxane moieties and the alkyl groups derived from the trialkylaluminum moieties including trimethylaluminum. Specifically, the molar fractions were determined based on the ratios of the respective areas assigned to polymethylaluminoxane including units of General Formula (1), polyalkylaluminoxane including units of General Formula (2), polymethylaluminoxane including units of General Formula (1) and General Formula (2), trimethylaluminum and trialkylaluminum according to $^1$H-NMR measurement.

(5-2) A solid polymethylaluminoxane composition was tested in accordance with a method described in WO 2010/055652 to measure the following molar fraction in tetrahydrofuran-$d_8$ soluble components: the molar fraction (3) of methyl groups derived from trimethylaluminum moieties relative to the total number of moles (the total moles) of methyl groups derived from polymethylaluminoxane moieties and the methyl groups derived from the trimethylaluminum moieties. Specifically, the molar fraction was measured by $^1$H-NMR based on the ratios of the respective areas assigned to trimethylaluminum and polymethylaluminoxane. An example of the determination of the molar fraction of methyl groups derived from trimethylaluminum moieties will be described below.

A polymethylaluminoxane composition is subjected to $^1$H-NMR using THF-$d_8$ as a heavy solvent. The $^1$H-NMR measurement was performed at 270 MHz and a measurement temperature of 24° C. with NMR device EX270 manufactured by JEOL Ltd.

An analysis sample of a polymethylaluminoxane composition in the form of a solution was prepared by adding 0.5 ml of THF-$d_8$ to approximately 0.05 ml of the polymethylaluminoxane composition solution.

In the case of a solid polymethylaluminoxane composition, 0.5 ml of THF-$d_8$ was added to 10 mg of the solid polymethylaluminoxane composition, and the mixture was stirred at 25° C. for 2 hours. The components that were dissolved in THF-$d_8$ were used as the analysis sample. The sample was subjected to the analysis even when it contained solid components.

(i) The total area of methyl (Me) peaks near −0.3 ppm to −1.2 ppm assigned to polymethylaluminoxanes including trimethylaluminum is integrated to give I (polymethylaluminoxanes).

(ii) A methyl (Me) peak near −1.1 ppm assigned to trimethylaluminum is cut out from the baseline of the methyl (Me) peaks assigned to polymethylaluminoxanes. The area thereof is integrated to give I (trimethylaluminum-Me).

Dividing I (trimethylaluminum-Me) by I (polymethylaluminoxanes) followed by normalization gives a molar fraction of the methyl groups derived from trimethylaluminum moieties.

In the procedure (ii), the peak was cut out by a baseline correction method.

(6) Specific Surface Area of Solid Polyaluminoxane Compositions

To determine the specific surface area of a solid polyaluminoxane composition, an adsorption desorption isotherm was measured by a nitrogen gas adsorption method at a liquid nitrogen temperature using BELSORP (registered trademark)-max manufactured by BEL JAPAN, INC. as the measurement apparatus. The specific surface area was determined using a BET method as the analytical method.

(7) Electron Microscope (SEM) Observation

Platinum was deposited onto a solid polyaluminoxane composition with use of Auto Fine Coater (JFC-1600) manufactured by JEOL Ltd., and the composition was observed on a scanning electron microscope (JSM-6510LV) manufactured by JEOL, Ltd. (magnification: ×200 or ×1000).

(8) Analysis of Olefin Polymerization (Oligomerization) Catalysts

Olefin polymerization (oligomerization) catalysts were analyzed in accordance with the analysis of solid polyaluminoxane compositions described above. The contents of titanium, zirconium and hafnium in the olefin polymerization (oligomerization) catalysts were determined by ICP atomic emission spectroscopy (ICP-AES) using ICPS (registered trademark)-8100 manufactured by Shimadzu Corporation.

(9) Olefin Oligomerization Reaction

The yield of reaction products and the selectivity of 1-hexene (1-octene, decenes) were determined by gas chromatography analysis (Shimadzu GC-2010PLUS, J & W Scientific DB-5 column).

[Catalytic Activity]

The catalytic activity was determined by dividing the mass of a reaction product obtained per unit time by the amount (mmol) of a transition metal atom in a transition metal catalyst component used in the oligomerization.

[Selectivity of 1-Hexene (1-Octene, Decenes)]

The selectivity of 1-hexene (1-octene, decenes) was determined using the following equation.

$$S\ (\%) = Wp/Wr \times 100$$

S (%): selectivity of 1-hexene (weight fraction)

Wr (weight): total weight of reaction products having 4 or more carbon atoms

Wp (weight): weight of 1-hexene formed by the reaction

The selectivity of 1-octene and decenes was determined similarly to the above method.

[Fouling Rate]

The fouling rate F was determined using the following equation wherein X1 was the total amount (g) of polyethylene particles produced and X2 was the amount (g) of polyethylene particles deposited to a fouling evaluation test piece.

$$F\ (\%) = X2/X1 \times 100$$

(10) Olefin Polymerization Reaction

[Melt Flow Rate (MFR)]

The MFR was measured in accordance with ASTM D1238 at 190° C. and 2.16 kg load for ethylene polymers or at 230° C. and 2.16 kg load for propylene polymers.

[Density]

To determine the density, a strand obtained during the MFR measurement was heat treated at 100° C. for 1 hour, allowed to stand at room temperature for 1 hour and tested by a density gradient tube method in accordance with JIS K7112.

[Melting Point (Tm) of Propylene Homopolymers]

The melting point (Tm) of a propylene homopolymer was measured in the following manner using Diamond DSC manufactured by PerkinElmer Co., Ltd. A sample was melted at 230° C. and was formed into a sheet. An approximately 5 mg sample of the sheet was placed into a sample pan of B014-3021/B700-1014 manufactured by PerkinElmer Co., Ltd.

In a nitrogen atmosphere, the sample was heated to 230° C. and held at the temperature for 10 minutes, and was thereafter cooled to 30° C. at 10° C./min. Subsequently, in a nitrogen atmosphere, the sample was held at 30° C. for 1 minute and was heated to 230° C. at 10° C./min. The melting point (Tm) was calculated based on the peak top of a crystal fusion peak observed during the process.

[Melting point (Tm) of 4-methyl-1-pentene/1-decene copolymers]

With DCS8000 manufactured by PerkinElmer Co., Ltd., an approximately 5 mg of a sample was weighed in a nitrogen atmosphere (20 mL/min) and was heated from 30° C. to 280° C. at 10° C./min. After being held at 280° C. for 5 minutes, the sample was cooled to 30° C. at 10° C./min. After being held at 30° C. for 5 minutes, the sample was heated to 280° C. at 10° C./min. The melting point (Tm) was obtained based on the top of a crystal fusion peak observed during the second heating process.

[Amount of Soluble Portions (SP) of 4-methyl-1-pentene/1-decene copolymers]

A polymer slurry was filtered to give a solid polymer (a white solid) and a filtrate. The filtrate was evaporated to remove the solvent, and the polymer that had been dissolved in the filtrate was obtained. The amount of the polymer in the filtrate was calculated using the following equation.

$$\text{Amount of polymer in filtrate (wt \%)} = W2/(W1+W2) \times 100$$

W1: mass (g) of solid polymer (white solid) filtered off

W2: mass (g) of polymer dissolved in filtrate of slurry

[Intrinsic Viscosity ([η])]

Approximately 20 mg of a sample was dissolved in 15 mL of decalin, and the specific viscosity ηsp was measured in an oil bath at 135° C. The decalin solution was diluted by the addition of 5 mL of the decalin solvent, and the specific viscosity ηsp was measured in the similar manner. This dilution was repeated two more times, and the concentration (C) was extrapolated to 0. The ηsp/C value at the zero concentration was obtained as the intrinsic viscosity [η].

$$[\eta] = \lim(\eta sp/C)(C \to 0)$$

[Bulk density]

The bulk density was measured in accordance with ASTM D1895-96 Method A.

Preliminary Experiment 1

A 20 wt % toluene solution of a polymethylaluminoxane composition manufactured by Albemarle was subjected to $^1$H-NMR to determine the molar fraction of methyl groups derived from trimethylaluminum moieties relative to the total number of moles of methyl groups, the measurement resulting in 28.5 mol %. Further, the Al concentration was measured by ICP-AES to be 3.01 mmol/mL. (Hereinafter, the solution will be written as the "Preliminary Experiment 1A solution".)

The whole lot of 20 wt % toluene solutions of a polymethylaluminoxane composition manufactured by Albemarle that were used in Test Examples was analyzed similarly, and the Al concentrations were measured to be 3.00 mmol/mL (hereinafter, the "Preliminary Experiment 1B solution"), 3.04 mmol/mL (hereinafter, the "Preliminary Experiment 1C solution"), 3.07 mmol/mL (hereinafter, the "Preliminary Experiment 1D solution"), and 3.15 mmol/mL (hereinafter, the "Preliminary Experiment 1E solution").

Preliminary Experiment 2

A 20 wt % toluene solution of a polymethylaluminoxane composition (TMAO-211) manufactured by TOSOH FINE-CHEM CORPORATION was subjected to $^1$H-NMR to determine the molar fraction of methyl groups derived from trimethylaluminum moieties relative to the total number of moles of methyl groups, the measurement resulting in 47.0 mol %. Further, the Al concentration was measured by ICP-AES to be 3.01 mmol/mL. (Hereinafter, the solution will be written as the "Preliminary Experiment 2 solution".)

Preliminary Experiment 3

In a nitrogen atmosphere, the 20 wt % toluene solution (30 mL, 27.03 g) of a polymethylaluminoxane composition from Albemarle that was used in Preliminary Experiment 1 was added to a centrifuge tube, and the tube was capped with a tapered plug. Any gel deposit was not visually seen.

Preliminary Experiment 4

The sample prepared in Preliminary Experiment 3 was centrifuged with a centrifugal machine at 2,000 G for 60 minutes. After the centrifugation, a colorless and transparent gel deposit was seen at the bottom of the centrifuge tube. In a nitrogen atmosphere, the supernatant resulting from the centrifugation was carefully collected with a pipette, and a centrifuged toluene solution of a polymethylaluminoxane composition was obtained. $^1$H-NMR showed that the molar fraction of methyl groups derived from trimethylaluminum moieties was 30.7 mol % relative to the total number of moles of methyl groups.

The weight of the gel deposit in the bottom of the centrifuge tube was measured to be 0.463 g. The weight percentage of the gel deposit was 1.7 wt % relative to the 20 wt % toluene solution of a polymethylaluminoxane composition.

[Preliminary Experiment 5] Synthesis of (8-octamethylfluoren-12'-yl-(2-(adamantan-1-yl)-8-methyl-3, 3b,4,5,6,7,7a,8-octahydrocyclopenta[a]indene))zirconium dichloride (1) 1-Adamantylcyclopentadienyllithium In a nitrogen atmosphere, a 200 ml three-necked flask was loaded with a tert-butyl methyl ether solution of ethylmagnesium bromide (1.0 M, 40 ml). While cooling the solution in an ice bath, 2.64 g of cyclopentadiene was added dropwise over a period of 20 minutes. The mixture was brought to room temperature and was stirred for 17 hours to give a solution A.

In a nitrogen atmosphere, a 500 ml three-necked flask was loaded with 200 ml of diisopropyl ether and 0.36 g of copper (II) trifluoromethanesulfonate. In a water bath, the solution A prepared above was added to this solution dropwise over a period of 20 minutes. A solution of 4.30 g of 1-bromoadamantane in 40 mL of diisopropyl ether was added dropwise, and the mixture was stirred at 70° C. for 10 hours. The reaction liquid was cooled to room temperature. In a water bath, 200 ml of a saturated aqueous ammonium chloride solution was added. The organic phase was separated, and the aqueous phase was extracted with 200 ml of hexane. The organic phases were combined together and washed with water. The liquid was dried with magnesium sulfate, and the solvent was evaporated. The residue was purified by silica gel column chromatography to afford 4.2 g of a crude product.

In a nitrogen atmosphere, a 100 ml Schlenk flask was loaded with 4.2 g of the crude product and 20 mL of hexane. In an ice bath, 13.8 mL of a 1.6 M hexane solution of n-butyllithium was added dropwise to the solution over a period of 20 minutes. The mixture was brought to room temperature and was stirred for 17 hours. The precipitate was filtered from the reaction liquid and was washed with hexane, thereby obtaining the title compound. The compound weighed 2.70 g, and the yield was 66%.

The compound was identified to be the target compound based on the results of $^1$H-NMR.

$^1$H-NMR (THF-d$^8$): δ5.57-5.55 (2H, m), 5.52-5.50 (2H, m), 1.96 (3H, s), 1.87 (6H, s), 1.74 (6H, s).

(2) 2-(Adamantan-1-yl)-8-methyl-3,3b,4,5,6,7,7a,8-octahydrocyclopenta[a]indene

In a nitrogen atmosphere, a 100 ml three-necked flask was loaded with 40 ml of THF and 1.57 g of magnesium chloride. A solution of 3.09 g of 1-adamantylcyclopentadienyllithium in 10 ml of THF was added to this solution dropwise over a period of 5 minutes, and the mixture was stirred at room temperature for 2 hours and at 50° C. for 3 hours. In an ice/acetone bath, a solution of 1.96 g (15.75 mmol) of 1-acetylcyclohexene in 10 ml of THF was added dropwise over a period of 10 minutes, and the mixture was stirred at room temperature for 19 hours. In an ice/acetone bath, 1.0 ml of acetic acid and 3.1 ml of pyrrolidine were added, and the mixture was stirred at room temperature for 17 hours. In an ice/acetone bath, 30 ml of a saturated aqueous ammonium chloride solution was added. After the addition of 100 ml of hexane, the organic phase was separated. The aqueous phase was extracted with 200 ml of hexane. The organic phases were combined together and washed with water two times. The liquid was dried with magnesium sulfate, and the solvent was evaporated. The title compound was recrystallized from methanol. The compound weighed 2.134 g, and the yield was 47%.

The compound was identified to be the target compound based on the results of $^1$H-NMR and GC-MS.

$^1$H-NMR (Toluene-d$^8$): δ6.06 (1H, s), 5.98 (1H, s), 2.88-2.78 (2H, m), 1.98-1.13 (26H, m).

GC-MS: m/Z=306 (M$^+$).

(3) 8-Octamethylfluoren-12'-yl-(2-(adamantan-1-yl)-8-methyl-3, 3b,4,5,6,7,7a,8-octahydrocyclopenta[a] indene)

In a nitrogen atmosphere, a 30 ml Schlenk tube was loaded with 1.546 g of octamethylfluorene and 40 ml of tert-butyl methyl ether. In an ice/acetone bath, 2.62 ml of a 1.6 M hexane solution of n-butyllithium was added dropwise over a period of 15 minutes. While gradually returning the temperature to room temperature, the mixture was stirred for 22 hours. 1.349 g of 2-(adamantan-1-yl)-8-methyl-3,3b, 4,5,6,7,7a,8-octahydrocyclopenta[a]indene was added. The mixture was stirred at room temperature for 19 hours and at 50° C. for 8 hours. Thereafter, the reaction solution was added to 100 ml of a saturated aqueous ammonium chloride solution. The organic phase was separated. The aqueous phase was extracted with 100 ml of hexane. The organic phases were combined together and washed with water two times. The liquid was dried with magnesium sulfate, and the solvent was evaporated. The resultant solid was washed with acetone, thereby obtaining the title compound. The compound weighed 1.51 g, and the yield was 54%.

The compound was identified to be the target compound based on the results of FD-MS. FD-MS: m/Z=693 (M$^+$).

$^1$H-NMR showed that the compound was a mixture of isomers.

(4) (8-Octamethylfluoren-12'-yl-(2-(adamantan-1-yl)-8-methyl-3,3b,4,5,6,7,7a,8-octahydrocyclopenta[a]indene))zirconium dichloride In a nitrogen atmosphere, a 100 ml Schlenk tube was loaded with 1.039 g of 8-octamethylfluoren-12'-yl-(2-(adamantan-1-yl)-8-methyl-3, 3b,4,5,6,7,7a,8-octahydrocyclopenta[a]indene, 0.47 ml of α-methylstyrene, 30 ml of hexane and 2.62 ml of cyclopentyl methyl ether. In an oil bath at 25° C., 2.18 ml of a 1.6 M hexane solution of n-butyllithium was added dropwise over a period of 10 minutes. The mixture was stirred at 50° C. for 4 hours, and the precipitate was filtered and was washed with hexane to give a pink powder. A 100 ml Schlenk tube was loaded with the pink powder and 30 ml of diethyl ether. After the system was cooled in a dry ice/acetone bath, a suspension of 0.385 g (1.65 mmol) of zirconium tetrachloride in 30 ml of diethyl ether was added. Thereafter, the mixture was stirred for 16 hours while gradually increasing the temperature to room temperature.

The solvent was evaporated under reduced pressure, and the residue was combined with approximately 70 ml of dichloromethane to extract soluble components. The solution obtained was concentrated, combined with 50 ml of hexane and filtered to remove insoluble components. The resultant solution was concentrated to approximately 10 ml and was allowed to stand overnight at −30° C. The powder that had been precipitated was collected by filtration and was washed with hexane. An orange powder weighing 0.384 g was obtained. The orange powder was dissolved by the addition of 5 ml of diethyl ether, and the solution was allowed to stand overnight at −30° C. The powder that had been precipitated was collected by filtration and was washed with hexane. The target compound was thus obtained in an amount of 0.220 g. The yield was 17%.

The compound was identified to be the target compound based on the results of $^1$H-NMR.

$^1$H-NMR (270 MHz, CDCl3, with reference to TMS): δ7.9 8 (1H, s), 7.86 (1H, s), 7.60 (1H, s), 7.37 (1H, s), 6.19 (1H, J=1.6 Hz, d), 5.33 (1H, J=1.6 Hz, d), 3.58-3.44 (2H, m), 2.35-2.28 (1H, m), 2.18 (3H, s), 1.94-1.18 (54H, m).

[Synthesis of Solid Polyaluminoxane Compositions]

Solid polyaluminoxane compositions were synthesized by methods described in Test Examples. Some of the production methods and the results in Test Examples are described in Tables 1 to 13.

Test Example A1 (Test Example D1)

A 200 mL glass flask equipped with a stirrer (hereinafter, written as "flask A") was loaded with 14 mL of toluene. After the temperature was raised to 70° C., there was added a "20 wt % toluene solution of a polymethylaluminoxane composition manufactured by Albemarle (Al concentration=3.01 mmol/mL, 14 mL, 42 mmol)" (hereinafter, written as the "Test Example A1 solution"). Subsequently, a toluene solution (17 mL) of benzaldehyde (0.58 g, 5.5 mmol) was added over a period of 30 minutes. After the addition, the mixture was stirred at 70° C. for 30 minutes and was heated to 95° C. at a heating rate of 1.0° C./min. The reaction was performed at 95° C. for 4 hours. The temperature was decreased to 60° C., and the supernatant was removed by decantation. The solid polyaluminoxane that had been precipitated was washed with toluene (45 mL) two times at 60° C. and one time at normal temperature. Thereafter, the total volume was adjusted to 40 mL by the addition of toluene. A solid polyaluminoxane composition was thus obtained. The aluminum-based solidification rate was 94.0%.

The onset of the precipitation of the solid polyaluminoxane composition was observed during the stirring at 70° C. after the addition of benzaldehyde.

[Analysis of Solid Polyaluminoxane Composition]

The grain size distribution was measured. The median diameter D50 in the cumulative volume was 29.3 µm and the uniformity was 0.237.

The solid polyaluminoxane composition obtained was dried and was analyzed to measure the solubility with respect to solvents. The solubility at 25° C. was 0.05 mol % in n-hexane, 0.15 mol % in toluene, and 94.6 mol % in tetrahydrofuran.

The molar fraction of methyl groups derived from trimethylaluminum moieties (the molar fraction (3)) was 13.2 mol % relative to the total number of moles of the methyl groups. The aluminum content in the solid polyaluminoxane composition was 43.5 wt %. The specific surface area was 521 m$^2$/g.

The composition was observed by SEM, the results being illustrated in FIG. 1.

The results are described in Table 1.

Test Example A2 (Test Example D2)

A solid polyaluminoxane composition was obtained in the same manner as in Test Example A1, except that after the addition of the toluene solution of benzaldehyde in Test Example A1, the mixture was stirred at 70° C. for 30 minutes and was heated to 105° C. at a heating rate of 1.0° C./min, and the reaction was performed at 105° C. for 4 hours.

The onset of the precipitation of the solid polyaluminoxane composition was observed during the stirring at 70° C. after the addition of benzaldehyde.

The results are described in Table 1.

Test Example A3 (Test Example D3)

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of benzaldehyde (0.67 g, 6.3 mmol).

The onset of the precipitation of the solid polyaluminoxane composition was observed during the stirring at 70° C. after the addition of benzaldehyde.

The results are described in Table 1.

Test Example A4

A flask A was loaded with 48 mL of toluene. After the temperature was raised to 70° C., the Preliminary Experiment 1B solution (34 mL, 102 mmol) was added. Subsequently, a toluene solution (28 mL) of benzaldehyde (1.84 g, 17.3 mmol) was added over a period of 30 minutes. After the addition, the mixture was stirred at 70° C. for 30 minutes and was heated to 95° C. at a heating rate of 1.0° C./min. The reaction was performed at 95° C. for 4 hours. The temperature was decreased to 60° C., and the supernatant was removed by decantation. The solid polyaluminoxane that had been precipitated was washed with toluene (60 mL) two times at 60° C. and one time at normal temperature. Thereafter, the total volume was adjusted to 80 mL by the addition of toluene. A solid polyaluminoxane composition was thus obtained.

The onset of the precipitation of the solid polyaluminoxane composition was observed during the stirring at 70° C. after the addition of benzaldehyde.

The results are described in Table 1.

Test Example A5

A flask A was loaded with 46 mL of toluene. After the temperature was raised to 70° C., the Preliminary Experiment 1B solution (34 mL, 102 mmol) was added. Subsequently, a toluene solution (29 mL) of benzaldehyde (2.05 g, 19.4 mmol) was added over a period of 30 minutes. The rest of the procedure was the same as in Test Example A4. A solid polyaluminoxane composition was thus obtained.

The onset of the precipitation of the solid polyaluminoxane composition was observed during the stirring at 70° C. after the addition of benzaldehyde.

The results are described in Table 1.

Test Example A6 (Test Example D6)

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of acetophenone (0.66 g, 5.5 mmol).

The onset of the precipitation of the solid polyaluminoxane composition was observed during the stirring at 70° C. after the addition of acetophenone.

The results are described in Table 1.

Test Example A7 (Test Example D14)

A flask A was loaded with 27 mL of toluene. After the temperature was raised to 70° C., the Preliminary Experiment 1B solution (27 mL, 81 mmol) was added. Subsequently, a toluene solution (33 mL) of 2-phenyl-2-propanol (1.66 g, 12.2 mmol) was added over a period of 30 minutes. The rest of the procedure was the same as in Test Example A4. A solid polyaluminoxane composition was thus obtained.

The onset of the precipitation of the solid polyaluminoxane composition was observed when the temperature was raised to 73° C. after the addition of 2-phenyl-2-propanol.

The results are described in Table 1.

The composition was observed by SEM, the results being illustrated in FIG. 2.

Test Example A8

A flask A was loaded with 37 mL of toluene. After the temperature was raised to 70° C., the Preliminary Experiment 1B solution (34 mL, 102 mmol) was added. Subsequently, a toluene solution (38 mL) of benzaldehyde (1.46 g, 13.8 mmol) was added over a period of 30 minutes. After the addition, the mixture was stirred at 70° C. for 30 minutes and was heated to 95° C. at a heating rate of 1.0° C./min. The reaction was performed at 95° C. for 8 hours. The temperature was decreased to 80° C., and the supernatant was removed by decantation. The solid polyaluminoxane that had been precipitated was washed with toluene (60 mL) three times at 80° C. Thereafter, the total volume was adjusted to 102 mL by the addition of toluene. A solid polyaluminoxane composition was thus obtained.

The onset of the precipitation of the solid polyaluminoxane composition was observed during the stirring at 70° C. after the addition of benzaldehyde.

The results are described in Table 1.

Test Example A9 (Test Example D23)

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of 4-fluorobenzaldehyde (0.78 g, 6.3 mmol).

The onset of the precipitation of the solid polyaluminoxane composition was observed during the stirring at 70° C. after the addition of 4-fluorobenzaldehyde.

The results are described in Table 1.

Test Example A10

A flask A was loaded with 37 mL of toluene. After the temperature was raised to 70° C., the Preliminary Experiment 1B solution (34 mL, 102 mmol) was added. Subsequently, a toluene solution (38 mL) of acetophenone (1.65 g, 13.8 mmol) was added over a period of 120 minutes. After the addition, the mixture was stirred at 70° C. for 60 minutes and was heated to 105° C. at a heating rate of 1.0° C./min. The reaction was performed at 105° C. for 8 hours. The temperature was decreased to 80° C., and the supernatant was removed by decantation. The solid polyaluminoxane that had been precipitated was washed with toluene (60 mL) three times at 80° C. Thereafter, the total volume was adjusted to 87 mL by the addition of toluene. A solid polyaluminoxane composition was thus obtained.

The onset of the precipitation of the solid polyaluminoxane composition was observed during the stirring at 70° C. after the addition of acetophenone.

The results are described in Table 1.

Test Example A11

A flask A was loaded with 37 mL of toluene. After the temperature was raised to 70° C., the Preliminary Experiment 1B solution (34 mL, 102 mmol) was added. Subsequently, a toluene solution (38 mL) of propiophenone (1.85 g, 13.8 mmol) was added over a period of 180 minutes. After the addition, the mixture was stirred at 70° C. for 60 minutes and was heated to 95° C. at a heating rate of 1.0° C./min. The reaction was performed at 95° C. for 8 hours. The rest of the procedure was the same as in Test Example A10. A solid polyaluminoxane composition was thus obtained.

The onset of the precipitation of the solid polyaluminoxane composition was observed during the stirring at 70° C. after the addition of propiophenone.

The results are described in Table 1.

Test Example A12

A flask A was loaded with 8 mL of toluene. After the temperature was raised to 50° C., the Preliminary Experiment 1C solution (35 mL, 106 mmol) was added. Subsequently, a toluene solution (10 mL) of valerophenone (2.58 g, 15.9 mmol) was added over a period of 30 minutes. After the addition, the mixture was stirred at 50° C. for 30 minutes and was heated to 105° C. at a heating rate of 1.0° C./min.

The reaction was performed at 105° C. for 4 hours. The temperature was decreased to 60° C., and the supernatant was removed by decantation. The solid polyaluminoxane that had been precipitated was washed with toluene (45 mL) two times at 60° C. and one time at normal temperature. Thereafter, the total volume was adjusted to 100 mL by the addition of toluene. A solid polyaluminoxane composition was thus obtained.

The onset of the precipitation of the solid polyaluminoxane composition was observed when the temperature was raised to 76° C. after the addition of valerophenone.

The results are described in Table 1.

Test Example A13

A flask A was loaded with 10 mL of toluene. After the temperature was raised to 50° C., the Preliminary Experiment 1C solution (35 mL, 106 mmol) was added. Subsequently, a toluene solution (10 mL) of octanophenone (2.82 g, 13.8 mmol) was added over a period of 30 minutes. The rest of the procedure was the same as in Test Example A12. A solid polyaluminoxane composition was thus obtained.

The onset of the precipitation of the solid polyaluminoxane composition was observed when the temperature was raised to 85° C. after the addition of octanophenone.

The results are described in Table 1.

Test Example A14 (Test Example D11)

A flask A was loaded with 40 mL of toluene. After the temperature was raised to 50° C., the Preliminary Experiment 1A solution (40 mL, 120 mmol) was added. Subsequently, a toluene solution (48 mL) of laurophenone (4.69 g, 18.0 mmol) was added over a period of 30 minutes. After the addition, the mixture was stirred at 50° C. for 30 minutes and was heated to 95° C. at a heating rate of 1.0° C./min. The reaction was performed at 95° C. for 4 hours. The temperature was decreased to 60° C., and the supernatant was removed by decantation. The solid polyaluminoxane that had been precipitated was washed with toluene (100 mL) two times at 60° C. and one time at normal temperature. Thereafter, the total volume was adjusted to 114 mL by the addition of toluene.

The onset of the precipitation of the solid polyaluminoxane composition was observed when the temperature was raised to 93° C. after the addition of laurophenone.

The results are described in Table 1.

Test Example A15

A flask A was loaded with 50 mL of toluene. After the temperature was raised to 50° C., the Preliminary Experiment 1C solution (35 mL, 106 mmol) was added. Subsequently, a toluene solution (27 mL) of laurophenone (4.16 g, 16.0 mmol) was added over a period of 30 minutes. The rest of the procedure was the same as in Test Example A12. A solid polyaluminoxane composition was thus obtained.

The onset of the precipitation of the solid polyaluminoxane composition was observed when the temperature was raised to 93° C. after the addition of laurophenone.

The results are described in Table 1.

Test Example A16

A flask A was loaded with 3 mL of toluene. After the temperature was raised to 50° C., the Preliminary Experiment 1C solution (39.5 mL, 120 mmol) was added. Subsequently, a toluene solution (9 mL) of DL-1-phenylethyl alcohol (2.20 g, 18.0 mmol) was added over a period of 30 minutes. The rest of the procedure was the same as in Test Example A12. A solid polyaluminoxane composition was thus obtained.

The onset of the precipitation of the solid polyaluminoxane composition was observed when the temperature was raised to 90° C. after the addition of DL-1-phenylethyl alcohol.

The results are described in Table 1.

Test Example A17

A flask A was loaded with 16 mL of toluene. After the temperature was raised to 50° C., the Preliminary Experiment 1C solution (21 mL, 64 mmol) was added. Subsequently, a toluene solution (9 mL) of geraniol (1.62 g, 10.5 mmol) was added over a period of 30 minutes. After the addition, the mixture was stirred at 50° C. for 30 minutes. After the mixture resulting from the addition had been stirred at 50° C. for 30 minutes, the temperature was raised to 95° C. at a heating rate of 1.0° C./min. The reaction was performed at 95° C. for 4 hours. The rest of the procedure was the same as in Test Example A1. A solid polyaluminoxane composition was thus obtained.

The onset of the precipitation of the solid polyaluminoxane composition was observed when the temperature was raised to 52° C. after the addition of geraniol.

The results are described in Table 1.

Test Example A18

A flask A was loaded with 16 mL of toluene. After the temperature was raised to 70° C., the Preliminary Experiment 1C solution (18 mL, 55 mmol) was added. Subsequently, a toluene solution (24 mL) of farnesol (1.93 g, 8.7 mmol) was added over a period of 30 minutes. After the addition, the mixture was stirred at 70° C. for 90 minutes. The rest of the procedure was the same as in Test Example A1. A solid polyaluminoxane composition was thus obtained.

The onset of the precipitation of the solid polyaluminoxane composition was observed during the stirring at 70° C. after the addition of farnesol.

The results are described in Table 1.

Test Example A19

A flask A was loaded with 17 mL of toluene. After the temperature was raised to 50° C., the Preliminary Experiment 1C solution (17.5 mL, 53 mmol) was added. Subsequently, a toluene solution (11 mL) of phytol (3.36 g, 8.0 mmol) was added over a period of 30 minutes. The rest of the procedure was the same as in Test Example A12. A solid polyaluminoxane composition was thus obtained.

The onset of the precipitation of the solid polyaluminoxane composition was observed when the temperature was raised to 75° C. after the addition of phytol.

The results are described in Table 1.

Test Example A20

A flask A was loaded with 3 mL of toluene. After the temperature was raised to 50° C., the Preliminary Experiment 1C solution (35 mL, 106 mmol) was added. Subsequently, a toluene solution (11 mL) of 2-methyl-3-buten-2-ol (1.37 g, 16.0 mmol) was added over a period of 30 minutes.

After the addition, the mixture was stirred at 50° C. for 30 minutes and was heated to 105° C. at a heating rate of 1.0° C./min. The reaction was performed at 105° C. for 6 hours. The rest of the procedure was the same as in Test Example A12. A solid polyaluminoxane composition was thus obtained.

The onset of the precipitation of the solid polyaluminoxane composition was observed when the temperature was raised to 100° C. after the addition of 2-methyl-3-buten-2-ol.

The results are described in Table 1.

Test Example A21

A flask A was loaded with 10 mL of toluene. After the temperature was raised to 50° C., the Preliminary Experiment 1D solution (21 mL, 64 mmol) was added. Subsequently, a toluene solution (15 mL) of linalool (1.59 g, 10.3 mmol) was added over a period of 60 minutes. Thereafter, the mixture was heated to 95° C. at a heating rate of 1.0° C./min. The reaction was performed at 95° C. for 4 hours. The temperature was decreased to 60° C., and the supernatant was removed by decantation. The solid polyaluminoxane that had been precipitated was washed with toluene (45 mL) two times at 60° C. and one time at normal temperature. Thereafter, the total volume was adjusted to 60 mL by the addition of toluene. A solid polyaluminoxane composition was thus obtained.

The onset of the precipitation of the solid polyaluminoxane composition was observed when the temperature was raised to 95° C. after the addition of linalool.

The results are described in Table 1.

Test Example A22

A flask A was loaded with 10 mL of toluene. After the temperature was raised to 50° C., the Preliminary Experiment 1A solution (21 mL, 63 mmol) was added. Subsequently, a toluene solution (15 mL) of linalool (1.75 g, 11.3 mmol) was added over a period of 30 minutes. The rest of the procedure was the same as in Test Example A21. A solid polyaluminoxane composition was thus obtained.

The onset of the precipitation of the solid polyaluminoxane composition was observed when the temperature was raised to 95° C. after the addition of linalool.

The results are described in Table 1.

Test Example A23

A flask A was loaded with 13 mL of toluene. After the temperature was raised to 50° C., the Preliminary Experiment 1C solution (27 mL, 82 mmol) was added. Subsequently, a toluene solution (10 mL) of DL-1-phenylethyl alcohol (1.20 g, 9.8 mmol)/isophytol (0.73 g, 2.5 mmol) was added over a period of 30 minutes. The rest of the procedure was the same as in Test Example A12. A solid polyaluminoxane composition was thus obtained.

The onset of the precipitation of the solid polyaluminoxane composition was observed when the temperature was raised to 102° C. after the addition of DL-1-phenylethyl alcohol/isophytol.

The results are described in Table 1.

Test Example A24

A flask A was loaded with 12 mL of toluene. After the temperature was raised to 50° C., the Preliminary Experiment 1C solution (21 mL, 64 mmol) was added. Subsequently, a toluene solution (13 mL) of benzoic acid (0.23 g, 1.9 mmol)/octanophenone (1.96 g, 9.6 mmol) was added over a period of 30 minutes. The rest of the procedure was the same as in Test Example A21. A solid polyaluminoxane composition was thus obtained.

The onset of the precipitation of the solid polyaluminoxane composition was observed when the temperature was raised to 92° C. after the addition of benzoic acid/octanophenone.

The results are described in Table 1.

Test Example A25

A flask A was loaded with 14 mL of toluene. After the temperature was raised to 70° C., the Preliminary Experiment 1C solution (18 mL, 55 mmol) was added. A toluene solution (2 mL) of benzotrifluoride (0.13 g, 0.92 mmol) was added over a period of 10 minutes, and the mixture was stirred at 70° C. for 5 minutes. Subsequently, a toluene solution (23 mL) of farnesol (1.94 g, 8.7 mmol) was added over a period of 30 minutes. After the addition, the mixture was stirred at 70° C. for 90 minutes and was heated to 95° C. at a heating rate of 1.0° C./min. The reaction was performed at 95° C. for 4 hours. The rest of the procedure was the same as in Test Example A21. A solid polyaluminoxane composition was thus obtained.

The onset of the precipitation of the solid polyaluminoxane composition was observed during the stirring at 70° C. after the addition of farnesol.

The results are described in Table 1.

Test Example A26

A flask A was loaded with 23 mL of toluene. After the temperature was raised to 70° C., the Preliminary Experiment 1C solution (16 mL, 49 mmol) was added. Subsequently, a toluene solution (12 mL) of N,N-dimethylbenzylamine (0.065 g, 0.48 mmol)/2-phenyl-2-propanol (1.06 g, 7.8 mmol) was added over a period of 30 minutes. After the addition, the mixture was stirred at 70° C. for 30 minutes and was heated to 110° C. at a heating rate of 1.0° C./min. The reaction was performed at 110° C. for 6 hours. The rest of the procedure was the same as in Test Example A1. A solid polyaluminoxane composition was thus obtained.

The onset of the precipitation of the solid polyaluminoxane composition was observed when the temperature was raised to 91° C. after the addition of N,N-dimethylbenzylamine/2-phenyl-2-propanol.

The results are described in Table 1.

Test Example A27

A flask A was loaded with 12 mL of toluene. After the temperature was raised to 70° C., the Preliminary Experiment 1C solution (13 mL, 40 mmol) and a toluene solution of triisobutylaluminum (Al concentration=1.00 mmol/mL, 0.79 mL, 0.79 mmol) were added. Subsequently, a toluene solution (16 mL) of acetophenone (0.71 g, 5.9 mmol) was added over a period of 120 minutes. After the addition, the mixture was stirred at 70° C. for 60 minutes. The rest of the procedure was the same as in Test Example A26. A solid polyaluminoxane composition was thus obtained.

The onset of the precipitation of the solid polyaluminoxane composition was observed during the addition of acetophenone.

The results are described in Table 1.

Test Example A28

A solid polyaluminoxane composition was obtained in the same manner as in Test Example A27, except that the Preliminary Experiment 1C solution (13 mL, 40 mmol) and the toluene solution of triisobutylaluminum (Al concentration=1.00 mmol/mL, 0.79 mL, 0.79 mmol) in Test Example A27 were replaced by the Preliminary Experiment 1C solution (12 mL, 36 mmol) and a toluene solution of TION (TMAO-211, Al concentration=2.94 mmol/mL, 20 mL, 59 mmol). Subsequently, a toluene solution (7 mL) of DL-1-phenylethyl alcohol (2.00 g, 16.4 mmol) was added over a period of 30 minutes. The rest of the procedure was the same as in Test Example A12. A solid polyaluminoxane composition was thus obtained.

The onset of the precipitation of the solid polyaluminoxane composition was observed when the temperature was raised to 89° C. after the addition of 1-phenylethyl alcohol.

The results are described in Table 1.

TABLE 1

| Test Example | Al-based solidification rate (%) | Grain size distribution D50 (μm) | Uniformity | Solubility (mol %) N-hexane | Toluene | THF | Molar fraction Molar fraction*1 | mol % | Al content (wt %)*2 | Specific surface area (m²/g) |
|---|---|---|---|---|---|---|---|---|---|---|
| A1 (D1) | 94.0 | 29.3 | 0.237 | 0.05 | 0.15 | 94.6 | (3) | 13.2 | 43.5 | 521 |
| A2 (D2) | 96.7 | 30.6 | 0.214 | 0.06 | 0.08 | 57.4 | (3) | 18.9 | 43.3 | 548 |
| A3 (D3) | 99.1 | 21.6 | 0.214 | 0.07 | 0.15 | 19.8 | (3) | 32.5 | 43.5 | 613 |
| A4 | 99.7 | 29.7 | 0.231 | 0.05 | 0.07 | 11.8 | (3) | 38.6 | 43.3 | 605 |
| A5 | 99.6 | 28.7 | 0.255 | 0.04 | 0.06 | 6.8 | (3) | 45.9 | 42.6 | 610 |
| A6 (D6) | 97.0 | 29.5 | 0.222 | 0.03 | 0.06 | 79.7 | (3) | 15.7 | 42.0 | 537 |
| A7 (D14) | 98.5 | 15.8 | 0.243 | 0.04 | 0.06 | 25.3 | (3) | 25.4 | 41.3 | 572 |
| A8 | 97.5 | 31.7 | 0.204 | 0.05 | 0.08 | 42.7 | (3) | 20.0 | 44.1 | — |
| A9 (D23) | 97.7 | 27.9 | 0.208 | 0.04 | 0.04 | 74.3 | (3) | 14.6 | 43.8 | — |
| A10 | 99.0 | 34.9 | 0.229 | 0.05 | 0.06 | 31.0 | (3) | 23.3 | 44.0 | 643 |
| A11 | 98.5 | 40.5 | 0.204 | 0.04 | 0.04 | 48.0 | (3) | 18.4 | 45.5 | — |
| A12 | 99.9 | 26.1 | 0.246 | 0.04 | 0.04 | 8.3 | (3) | 45.1 | 44.5 | — |
| A13 | 99.0 | 13.7 | 0.226 | 0.04 | 0.04 | 80.2 | (3) | 14.8 | 44.1 | — |
| A14 (D11) | 99.2 | 6.7 | 0.239 | 0.04 | 0.06 | 8.1 | (3) | 42.9 | 42.4 | 607 |
| A15 | 99.9 | 7.8 | 0.242 | 0.04 | 0.04 | 11.5 | (3) | 44.3 | 44.7 | — |
| A16 | 99.9 | 12.4 | 0.242 | 0.04 | 0.04 | 53.5 | (3) | 17.9 | 44.0 | 587 |
| A17 | 99.7 | 15.6 | 0.246 | 0.04 | 0.04 | 18.1 | (3) | 31.2 | 41.3 | — |
| A18 | 99.3 | 4.3 | 0.193 | 0.04 | 0.04 | 30.3 | (3) | 23.4 | 41.7 | — |
| A19 | 99.8 | 2.3 | 0.239 | 0.04 | 0.04 | 42.5 | (3) | 17.1 | 41.6 | — |
| A20 | 99.1 | 19.3 | 0.225 | 0.04 | 0.04 | 69.1 | (3) | 14.2 | 44.1 | — |
| A21 | 99.7 | 8.7 | 0.271 | 0.04 | 0.04 | 22.1 | (3) | 28.8 | 41.3 | 537 |
| A22 | 99.9 | 3.9 | 0.187 | 0.04 | 0.04 | 9.2 | (3) | 40.8 | 40.7 | 528 |
| A23 | 99.6 | 9.3 | 0.225 | 0.04 | 0.04 | 69.5 | (3) | 15.5 | 43.8 | — |
| A24 | 99.6 | 12.8 | 0.226 | 0.04 | 0.04 | 14.9 | (3) | 31.9 | 41.3 | — |
| A25 | 99.9 | 4.5 | 0.214 | 0.04 | 0.04 | 30.1 | (3) | 16.3 | 39.8 | 465 |
| A26 | 99.2 | 29.4 | 0.207 | 0.04 | 0.04 | 10.8 | (3) | 39.4 | 44.4 | 569 |
| A27 | 99.0 | 33.1 | 0.275 | 0.04 | 0.04 | 41.4 | (2) | 20.0 | 45.1 | 654 |
| A28 | 99.1 | 39.3 | 0.361 | 0.04 | 0.04 | 5.9 | (2) | 51.0 | 44.2 | 800 |
| A29 | 99.6 | 26.8 | 0.228 | 0.04 | 0.04 | 12.3 | (3) | 30.4 | 42.4 | 775 |

*1Molar fraction (3) indicates the "molar fraction of methyl groups derived from trimethylaluminum moieties relative to the total number of moles of methyl groups".
*2Content of aluminum in solid polyaluminoxane composition
*1Molar fraction (2) indicates the "molar fraction of alkyl groups derived from trialkylaluminum moieties relative to the total number of moles of alkyl groups".
Molar fraction (3) indicates the "molar fraction of methyl groups derived from trimethylaluminum moieties relative to the total number of moles of methyl groups".
*2Content of aluminum in solid polyaluminoxane composition MMAO-3A manufactured by TOSOH FINECHEM CORPORATION (Al concentration=2.13 mmol/mL, 1.85 mL, 3.9 mmol).

The onset of the precipitation of the solid polyaluminoxane composition was observed during the addition of acetophenone.

The results are described in Table 1.

Test Example A29

A flask A was loaded with 17 mL of toluene. After the temperature was raised to 50° C., there was added a 20 wt % toluene solution of a polymethylaluminoxane composition manufactured by TOSOH FINECHEM CORPORA- Test Example D4

A flask A was loaded with 14 mL of toluene. After the temperature was raised to 80° C., the Test Example A1 solution was added. Subsequently, a toluene solution (17 mL) of benzaldehyde (0.67 g, 6.3 mmol) was added over a period of 30 minutes. After the addition, the mixture was stirred at 80° C. for 30 minutes and was heated to 95° C. at a heating rate of 1.0° C./min. The reaction was performed at 95° C. for 4 hours. The temperature was decreased to 60° C., and the supernatant was removed by decantation. The solid polyaluminoxane that had been precipitated was washed with toluene (45 mL) two times at 60° C. and one time at normal temperature. Thereafter, the total volume was adjusted to 40 mL by the addition of toluene. The aluminum-based solidification rate was 98.7%.

The onset of the precipitation of the solid polyaluminoxane composition was observed during the addition of benzaldehyde.

[Analysis of Solid Polyaluminoxane Composition]

The grain size distribution was measured. The median diameter D50 in the cumulative volume was 24.0 μm and the uniformity was 0.243.

The results are described in Table 2.

Test Example D5

A flask A was loaded with 14 mL of toluene. After the temperature was raised to 95° C., the Test Example A1 solution was added. Subsequently, a toluene solution (17 mL) of benzaldehyde (0.67 g, 6.3 mmol) was added over a period of 30 minutes. After the addition, the reaction was performed at 95° C. for 4 hours. The rest of the procedure was the same as in Test Example D4. A solid polyaluminoxane composition was thus obtained.

The onset of the precipitation of the solid polyaluminoxane composition was observed during the addition of benzaldehyde.

The results are described in Table 2.

Test Example D7

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of acetophenone (0.76 g, 6.3 mmol).

The onset of the precipitation of the solid polyaluminoxane composition was observed during the stirring at 70° C. after the addition of acetophenone.

The results are described in Table 2.

Test Example D8

A flask A was loaded with 14 mL of toluene. After the temperature was raised to 50° C., the Test Example A1 solution was added. Subsequently, a toluene solution (17 mL) of acetophenone (0.86 g, 7.1 mmol) was added over a period of 30 minutes. After the addition, the mixture was stirred at 50° C. for 30 minutes and was heated to 95° C. at a heating rate of 1.0° C./min. The reaction was performed at 95° C. for 4 hours. The rest of the procedure was the same as in Test Example A1. A solid polyaluminoxane composition was thus obtained.

The onset of the precipitation of the solid polyaluminoxane composition was observed when the temperature was raised to 75° C. after the addition of acetophenone.

The results are described in Table 2.

Test Example D9

A flask A was loaded with 14 mL of toluene. After the temperature was raised to 70° C., the Test Example A1 solution was added. Subsequently, a toluene solution (17 mL) of acetophenone (0.66 g, 5.5 mmol) was added over a period of 30 minutes. After the addition, the mixture was stirred at 70° C. for 30 minutes and was heated to 95° C. at a heating rate of 1.0° C./min. The reaction was performed at 95° C. for 8 hours. The temperature was decreased to 60° C., and the supernatant was removed by decantation. The solid polyaluminoxane that had been precipitated was washed with toluene (45 mL) three times at 80° C. Thereafter, the total volume was adjusted to 40 mL by the addition of toluene. A solid polyaluminoxane composition was thus obtained.

The onset of the precipitation of the solid polyaluminoxane composition was observed during the stirring at 70° C. after the addition of acetophenone.

[Analysis of Solid Polyaluminoxane Composition]

The composition was observed by SEM, the results being illustrated in FIG. 3. The grain size distribution was measured. The median diameter D50 in the cumulative volume was 28.8 μm and the uniformity was 0.230 (FIG. 4).

The results are described in Table 2.

Test Example D10

A flask A was loaded with 14 mL of toluene. After the temperature was raised to 50° C., the Test Example A1 solution was added. Subsequently, a toluene solution (17 mL) of acetophenone (0.76 g, 6.3 mmol) was added over a period of 30 minutes. The rest of the procedure was the same as in Test Example D8. A solid polyaluminoxane composition was thus obtained.

The onset of the precipitation of the solid polyaluminoxane composition was observed when the temperature was raised to 80° C. after the addition of acetophenone.

The results are described in Table 2.

Test Example D12

A flask A was loaded with 14 mL of toluene. After the temperature was raised to 50° C., the Test Example A1 solution was added. Subsequently, a toluene solution (17 mL) of 1-(p-tolyl)-ethanol (0.86 g, 6.3 mmol) was added over a period of 30 minutes. The rest of the procedure was the same as in Test Example D8. A solid polyaluminoxane composition was thus obtained.

The onset of the precipitation of the solid polyaluminoxane composition was observed when the temperature was raised to 69° C. after the addition of 1-(p-tolyl)-ethanol.

The results are described in Table 2.

Test Example D13

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (16.8 mL) of 2-phenyl-2-propanol (0.74 g, 5.5 mmol).

The onset of the precipitation of the solid polyaluminoxane composition was observed when the temperature was raised to 90° C. after the addition of 2-phenyl-2-propanol.

The results are described in Table 2.

Test Example D15

A flask A was loaded with 14 mL of toluene. After the temperature was raised to 50° C., the Test Example A1 solution was added. Subsequently, a toluene solution (17 mL) of 1-phenylethyl alcohol (0.77 g, 6.3 mmol) was added over a period of 30 minutes. The rest of the procedure was the same as in Test Example D8. A solid polyaluminoxane composition was thus obtained.

The onset of the precipitation of the solid polyaluminoxane composition was observed when the temperature was raised to 90° C. after the addition of 1-phenylethyl alcohol.

The results are described in Table 2.

Test Example D16

A flask A was loaded with 70 mL of toluene. After the temperature was raised to 50° C., the Preliminary Experiment 1A solution (70 mL, 210 mmol) was added. Subsequently, a toluene solution (84 mL) of DL-1-phenylethyl alcohol (3.85 g, 31.6 mmol) was added over a period of 30 minutes. After the addition, the mixture was stirred at 50° C. for 30 minutes and was heated to 95° C. at a heating rate of 1.0° C./min. The reaction was performed at 95° C. for 4 hours. The temperature was decreased to 60° C., and the supernatant was removed by decantation. The solid polyaluminoxane that had been precipitated was washed with toluene (90 mL) two times at 60° C. and one time at normal temperature. Thereafter, the total volume was adjusted to 200 mL by the addition of toluene. A solid polyaluminoxane composition was thus obtained.

The onset of the precipitation of the solid polyaluminoxane composition was observed when the temperature was raised to 93° C. after the addition of DL-1-phenylethyl alcohol.

The results are described in Table 2.

The stirring power was identical between Test Example D15 and Test Example D16, and therefore the average shear stress in the entirety of the reaction solution was smaller in Test Example D16. The difference in mean particle diameter between Test Example D15 and Test Example D16 probably results from the influence of the stirring state.

Test Example D17

A flask A was loaded with 14 mL of toluene. After the temperature was raised to 50° C., the Preliminary Experiment 2 solution (Al concentration=3.01 mmol/mL, 14 mL, 42 mmol) (hereinafter, written as the "Test Example D17 solution") was added. Subsequently, a toluene solution (17 mL) of 1-phenylethyl alcohol (1.39 g, 11.3 mmol) was added over a period of 30 minutes. The rest of the procedure was the same as in Test Example D8. A solid polyaluminoxane composition was thus obtained.

The onset of the precipitation of the solid polyaluminoxane composition was observed when the temperature was raised to 95° C. after the addition of 1-phenylethyl alcohol.

The results are described in Table 2.

Test Example D18

A flask A was loaded with 27 mL of toluene. After the temperature was raised to 50° C., the Preliminary Experiment 1A solution (6.5 mL, 20 mmol) was added. Subsequently, a toluene solution (7 mL) of benzophenone (0.47 g, 2.6 mmol) was added over a period of 30 minutes. After the addition, the mixture was stirred at 50° C. for 30 minutes and was heated to 95° C. at a heating rate of 1.0° C./min. The reaction was performed at 95° C. for 4 hours. The temperature was decreased to 60° C., and the supernatant was removed by decantation. The solid polyaluminoxane that had been precipitated was washed with toluene (45 mL) two times at 60° C. and one time at normal temperature. Thereafter, the total volume was adjusted to 19 mL by the addition of toluene. A solid polyaluminoxane composition was thus obtained.

The onset of the precipitation of the solid polyaluminoxane composition was observed when the temperature was raised to 80° C. after the addition of benzophenone.

The results are described in Table 2.

Test Example D19

A flask A was loaded with 14 mL of toluene. After the temperature was raised to 50° C., the Test Example A1 solution was added. Subsequently, a toluene solution (17 mL) of cyclohexyl phenyl ketone (1.19 g, 6.3 mmol) was added over a period of 30 minutes. The rest of the procedure was the same as in Test Example D8. A solid polyaluminoxane composition was thus obtained.

The onset of the precipitation of the solid polyaluminoxane composition was observed during the stirring at 50° C. after the addition of cyclohexyl phenyl ketone.

The results are described in Table 2.

Test Example D20

A flask A was loaded with the Preliminary Experiment 1A solution (20 mL, 60 mmol), and the temperature was raised to 50° C. Subsequently, a toluene solution (23 mL) of cyclohexyl methyl ketone (1.14 g, 9.0 mmol) was added over a period of 30 minutes. After the addition, the mixture was stirred at 50° C. for 30 minutes and was heated to 95° C. at a heating rate of 1.0° C./min. The reaction was performed at 95° C. for 4 hours. The temperature was decreased to 60° C., and the supernatant was removed by decantation. The solid polyaluminoxane that had been precipitated was washed with toluene (45 mL) two times at 60° C. and one time at normal temperature. Thereafter, the total volume was adjusted to 57 mL by the addition of toluene. A solid polyaluminoxane composition was thus obtained.

The onset of the precipitation of the solid polyaluminoxane composition was observed when the temperature was raised to 95° C. after the addition of cyclohexyl methyl ketone.

The results are described in Table 2.

Test Example D21

A flask A was loaded with 14 mL of toluene. After the temperature was raised to 50° C., the Test Example A1 solution was added. Subsequently, a toluene solution (17 mL) of p-nonylacetophenone (1.55 g, 6.3 mmol) was added over a period of 30 minutes. The rest of the procedure was the same as in Test Example D8. A solid polyaluminoxane composition was thus obtained.

The onset of the precipitation of the solid polyaluminoxane composition was observed when the temperature was raised to 60° C. after the addition of p-nonylacetophenone.

The results are described in Table 2.

Test Example D22

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of p-fluoroacetophenone (0.87 g, 6.3 mmol).

The onset of the precipitation of the solid polyaluminoxane composition was observed during the stirring at 70° C. after the addition of p-fluoroacetophenone.

The results are described in Table 2.

Test Example D24

A flask A was loaded with 14 mL of toluene. After the temperature was raised to 50° C., the Test Example A1 solution was added. Subsequently, a toluene solution (17 mL) of 4-fluorobenzyl alcohol (1.01 g, 6.3 mmol) was added over a period of 30 minutes. The rest of the procedure was the same as in Test Example D8. A solid polyaluminoxane composition was thus obtained.

The onset of the precipitation of the solid polyaluminoxane composition was observed when the temperature was raised to 95° C. after the addition of 4-fluorobenzyl alcohol.

The results are described in Table 2.

Test Example D25

A flask A was loaded with 14 mL of toluene. After the temperature was raised to 50° C., the Test Example A1 solution was added. Subsequently, a toluene solution (17 mL) of benzyl alcohol (0.68 g, 6.3 mmol) was added over a period of 30 minutes. The rest of the procedure was the same as in Test Example D8. A solid polyaluminoxane composition was thus obtained.

The onset of the precipitation of the solid polyaluminoxane composition was observed when the temperature was raised to 95° C. after the addition of benzyl alcohol.

The results are described in Table 2.

Test Example D26

A flask A was loaded with 14 mL of toluene. After the temperature was raised to 50° C., the Test Example A1 solution was added. Subsequently, a toluene solution (17 mL) of 4-methylbenzyl alcohol (0.77 g, 6.3 mmol) was added over a period of 30 minutes. The rest of the procedure was the same as in Test Example D8. A solid polyaluminoxane composition was thus obtained.

The onset of the precipitation of the solid polyaluminoxane composition was observed when the temperature was raised to 95° C. after the addition of 4-methylbenzyl alcohol.

The results are described in Table 2.

Test Example D27

A flask A was loaded with 14 mL of toluene. After the temperature was raised to 50° C., the Test Example A1 solution was added. Subsequently, a toluene solution (17 mL) of 3-methylbenzyl alcohol (0.77 g, 6.3 mmol) was added over a period of 30 minutes. The rest of the procedure was the same as in Test Example D8. A solid polyaluminoxane composition was thus obtained.

The onset of the precipitation of the solid polyaluminoxane composition was observed when the temperature was raised to 95° C. after the addition of 3-methylbenzyl alcohol.

The results are described in Table 2.

Test Example D28

A flask A was loaded with 14 mL of toluene. After the temperature was raised to 50° C., the Test Example A1 solution was added. Subsequently, a toluene solution (17 mL) of 2-methylbenzyl alcohol (0.77 g, 6.3 mmol) was added over a period of 30 minutes. The rest of the procedure was the same as in Test Example D8. A solid polyaluminoxane composition was thus obtained.

The onset of the precipitation of the solid polyaluminoxane composition was observed when the temperature was raised to 95° C. after the addition of 2-methylbenzyl alcohol.

The results are described in Table 2.

Test Example D29

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of 4-isopropylbenzyl alcohol (0.95 g, 6.3 mmol).

The onset of the precipitation of the solid polyaluminoxane composition was observed when the temperature was raised to 89° C. after the addition of 4-isopropylbenzyl alcohol.

The results are described in Table 2.

Test Example D30

A flask A was loaded with 14 mL of toluene. After the temperature was raised to 50° C., the Test Example A1 solution was added. Subsequently, a toluene solution (17 mL) of 1-phenyl-1-propanol (0.86 g, 6.3 mmol) was added over a period of 30 minutes. The rest of the procedure was the same as in Test Example D8. A solid polyaluminoxane composition was thus obtained.

The results are described in Table 2.

Test Example D31

A flask A was loaded with 14 mL of toluene. After the temperature was raised to 50° C., the Test Example A1 solution was added. Subsequently, a toluene solution (17 mL) of 1-phenyl-1-pentanol (1.03 g, 6.3 mmol) was added over a period of 30 minutes. The rest of the procedure was the same as in Test Example D8. A solid polyaluminoxane composition was thus obtained.

The onset of the precipitation of the solid polyaluminoxane composition was observed when the temperature was raised to 95° C. after the addition of 1-phenyl-1-pentanol.

[Analysis of Solid Polyaluminoxane Composition]

The composition was observed by SEM, the results being illustrated in FIG. 5. The grain size distribution was measured. The median diameter D50 in the cumulative volume was 19.1 μm and the uniformity was 0.223 (FIG. 6).

The results are described in Table 2.

Test Example D32

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of geraniol (0.97 g, 6.3 mmol).

The onset of the precipitation of the solid polyaluminoxane composition was observed during the stirring at 70° C. after the addition of geraniol.

The results are described in Table 2.

Test Example D33

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of farnesol (1.40 g, 6.3 mmol).

The onset of the precipitation of the solid polyaluminoxane composition was observed during the stirring at 70° C. after the addition of farnesol.

[Analysis of Solid Polyaluminoxane Composition]

The composition was observed by SEM, the results being illustrated in FIG. 7. The grain size distribution was measured. The median diameter D50 in the cumulative volume was 6.6 μm and the uniformity was 0.227 (FIG. 8).

The results are described in Table 2.

Test Example D34

A flask A was loaded with 14 mL of toluene. After the temperature was raised to 70° C., the Test Example A1 solution was added. Subsequently, a toluene solution (17 mL) of phytol (1.87 g, 6.3 mmol) was added over a period of 30 minutes. After the addition, the mixture was stirred at 70° C. for 30 minutes and was heated to 95° C. at a heating rate of 1.0° C./min. The reaction was performed at 95° C. for 4 hours. The temperature was decreased to 60° C., and heptane (90 mL) was added. The supernatant was removed by decantation. The solid polyaluminoxane that had been precipitated was washed with heptane (45 mL) two times at 60° C. and one time at normal temperature. Thereafter, the total volume was adjusted to 40 mL by the addition of heptane. A solid polyaluminoxane composition was thus obtained.

The onset of the precipitation of the solid polyaluminoxane composition was observed when the temperature was raised to 75° C. after the addition of phytol.

The results are described in Table 2.

Test Example D35

A flask A was loaded with 14 mL of toluene. After the temperature was raised to 50° C., the Test Example A1 solution was added. Subsequently, a toluene solution (17 mL) of 1-phenylethyl alcohol (0.77 g, 6.3 mmol) was added over a period of 30 minutes. After the addition, the mixture was stirred at 50° C. for 30 minutes. The temperature was raised to 95° C. at a heating rate of 1.0° C./min, and the mixture was heated at 95° C.

The solidification rate after 2 hours from the initiation of the addition of 1-phenylethyl alcohol was 52%, 77% after 3 hours, 86% after 4 hours, and 92% after 6 hours.

Test Example D36

The reaction in Test Example D35 was followed while changing the heating temperature from 95° C. to 60° C.

The solidification rate after 2 hours from the initiation of the addition of 1-phenylethyl alcohol was 16%, 26% after 4 hours, and 54% after 8 hours.

The decrease in heating temperature compared to Test Example D35 caused a decrease in reaction rate and resulted in a decrease in solidification rate after the same reaction time.

Test Example D37

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of 2-phenyl-2-propanol (0.43 g, 3.2 mmol)/1-phenyl-1-pentanol (0.52 g, 3.2 mmol).

The onset of the precipitation of the solid polyaluminoxane composition was observed when the temperature was raised to 94° C. after the addition of 2-phenyl-2-propanol/1-phenyl-1-pentanol.

The results are described in Table 2.

Test Example D38

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of 2-phenyl-2-propanol (0.64 g, 4.7 mmol)/1-phenyl-1-pentanol (0.26 g, 1.6 mmol).

The onset of the precipitation of the solid polyaluminoxane composition was observed when the temperature was raised to 86° C. after the addition of 2-phenyl-2-propanol/1-phenyl-1-pentanol.

The results are described in Table 2.

Test Example D39

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of 2-phenyl-2-propanol (0.74 g, 5.5 mmol)/1-phenyl-1-pentanol (0.16 g, 0.8 mmol).

The onset of the precipitation of the solid polyaluminoxane composition was observed when the temperature was raised to 79° C. after the addition of 2-phenyl-2-propanol/1-phenyl-1-pentanol.

The results are described in Table 2.

Test Example D40

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of 2-phenyl-2-propanol (0.64 g, 4.7 mmol)/benzyl alcohol (0.17 g, 1.6 mmol).

The onset of the precipitation of the solid polyaluminoxane composition was observed when the temperature was raised to 93° C. after the addition of 2-phenyl-2-propanol/benzyl alcohol.

The results are described in Table 2.

Test Example D41

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of 2-phenyl-2-propanol (0.64 g, 4.7 mmol)/1-phenyl-1-propanol (0.21 g, 1.6 mmol).

The onset of the precipitation of the solid polyaluminoxane composition was observed when the temperature was raised to 85° C. after the addition of 2-phenyl-2-propanol/1-phenyl-1-propanol.

The results are described in Table 2.

Test Example D42

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of 2-phenyl-2-propanol (0.64 g, 4.7 mmol)/DL-1-phenylethyl alcohol (0.19 g, 1.6 mmol).

The onset of the precipitation of the solid polyaluminoxane composition was observed when the temperature was raised to 80° C. after the addition of 2-phenyl-2-propanol/DL-1-phenylethyl alcohol.

The results are described in Table 2.

Test Example D43

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of 2-phenyl-2-propanol (0.64 g, 4.7 mmol)/benzaldehyde (0.17 g, 1.6 mmol).

The onset of the precipitation of the solid polyaluminoxane composition was observed during the stirring at 70° C. after the addition of 2-phenyl-2-propanol/benzaldehyde.

The results are described in Table 2.

Test Example D44

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of 2-phenyl-2-propanol (0.64 g, 4.7 mmol)/4-methylbenzyl alcohol (0.19 g, 1.6 mmol).

The onset of the precipitation of the solid polyaluminoxane composition was observed when the temperature was raised to 89° C. after the addition of 2-phenyl-2-propanol/4-methylbenzyl alcohol.

The results are described in Table 2.

Test Example D45

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of 2-phenyl-2-propanol (0.64 g, 4.7 mmol)/acetophenone (0.19 g, 1.6 mmol).

The onset of the precipitation of the solid polyaluminoxane composition was observed during the stirring at 70° C. after the addition of 2-phenyl-2-propanol/acetophenone.

The results are described in Table 2.

Test Example D46

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of 2-phenyl-2-propanol (0.64 g, 4.7 mmol)/4-methylbenzaldehyde (0.19 g, 1.6 mmol).

The onset of the precipitation of the solid polyaluminoxane composition was observed during the stirring at 70° C. after the addition of 2-phenyl-2-propanol/4-methylbenzaldehyde.

The results are described in Table 2.

Test Example D47

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of 2-phenyl-2-propanol (0.57 g, 4.2 mmol)/4-methylbenzaldehyde (0.25 g, 2.1 mmol).

The onset of the precipitation of the solid polyaluminoxane composition was observed immediately after the completion of the addition of 2-phenyl-2-propanol/4-methylbenzaldehyde.

The results are described in Table 2.

Test Example D48

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of benzyl alcohol (0.34 g, 3.2 mmol)/4-methylbenzaldehyde (0.38 g, 3.2 mmol).

The onset of the precipitation of the solid polyaluminoxane composition was observed during the stirring at 70° C. after the addition of benzyl alcohol/4-methylbenzaldehyde.

The results are described in Table 2.

Test Example D49

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of DL-1-phenylethyl alcohol (0.51 g, 4.2 mmol)/4-methylbenzaldehyde (0.25 g, 2.1 mmol).

The onset of the precipitation of the solid polyaluminoxane composition was observed during the stirring at 70° C. after the addition of DL-1-phenylethyl alcohol/4-methylbenzaldehyde.

The results are described in Table 2.

Test Example D50

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of 4-methylbenzyl alcohol (0.51 g, 4.2 mmol)/4-methylbenzaldehyde (0.25 g, 2.1 mmol).

The onset of the precipitation of the solid polyaluminoxane composition was observed immediately after the completion of the addition of 4-methylbenzyl alcohol/4-methylbenzaldehyde.

The results are described in Table 2.

Test Example D51

A flask A was loaded with 14 mL of toluene. After the temperature was raised to 70° C., the Test Example A1 solution was added. Subsequently, a toluene solution (17 mL) of acetophenone (0.52 g, 4.4 mmol)/4-methylbenzaldehyde (0.13 g, 1.1 mmol) was added over a period of 30 minutes. After the addition, the mixture was stirred at 70° C. for 60 minutes and was heated to 95° C. at a heating rate of 1.0° C./min. The reaction was performed at 95° C. for 4 hours. The rest of the procedure was the same as in Test Example A1. A solid polyaluminoxane composition was thus obtained.

The onset of the precipitation of the solid polyaluminoxane composition was observed during the stirring at 70° C. after the addition of acetophenone/4-methylbenzaldehyde.

The results are described in Table 2.

Test Example D52

A solid polyaluminoxane composition was obtained in the same manner as in Test Example A1, except that the toluene solution (17 mL) of benzaldehyde (0.58 g, 5.5 mmol) in Test Example A1 was replaced by a toluene solution (17 mL) of acetophenone (0.49 g, 4.1 mmol)/4-methylbenzaldehyde (0.16 g, 1.4 mmol).

The onset of the precipitation of the solid polyaluminoxane composition was observed during the stirring at 70° C. after the addition of acetophenone/4-methylbenzaldehyde.

The results are described in Table 2.

Test Example D53

A flask A was loaded with 22 mL of toluene. After the temperature was raised to 50° C., the Preliminary Experiment 1E solution (20 mL, 63 mmol) was added. Subsequently, a toluene solution (14 mL) of (p-methylphenyl) methanethiol (1.31 g, 9.5 mmol) was added over a period of 30 minutes. After the addition, the mixture was stirred at 50° C. for 30 minutes and was heated to 95° C. at a heating rate of 1.0° C./min. The reaction was performed at 95° C. for 4 hours, resulting in the precipitation of a solid polyaluminoxane. The temperature was decreased to 50° C., and heptane (100 mL) was added. The supernatant was removed by decantation. The solid polyaluminoxane was washed with heptane (100 mL) two times at normal temperature. Thereafter, the total volume was adjusted to 50 mL by the addition of heptane. A solid polyaluminoxane composition was thus obtained.

The onset of the precipitation of the solid polyaluminoxane composition was observed when the temperature was raised to 95° C. after the addition of (p-methylphenyl) methanethiol.

The results are described in Table 2.

Test Example D54

A solid polyaluminoxane composition was obtained in the same manner as in Test Example A22, except that the Preliminary Experiment 1A solution (21 mL, 63 mmol) in Test Example A22 was replaced by the toluene solution (21 mL, 63 mmol) of the polymethylaluminoxane composition prepared in Preliminary Experiment 4.

The onset of the precipitation of the solid polyaluminoxane composition was observed when the temperature was raised to 95° C. after the addition of linalool.

The median diameter D50 in the cumulative volume and the uniformity were very close to those in Test Example A22. Thus, it has been confirmed that the presence of gel substances removable by centrifugation in the polyaluminoxane composition solution does not affect the properties of the solid polyaluminoxane composition obtained by the inventive production method.

The results are described in Table 2.

Test Example D55

A flask A was loaded with 14 mL of toluene. After the temperature was raised to 50° C., there were added a 20 wt % toluene solution of a polymethylaluminoxane composition manufactured by Albemarle (Al concentration=3.04 mmol/mL, 7.8 mL, 23 mmol) and a toluene solution of MMAO-3A manufactured by TOSOH FINECHEM CORPORATION (Al concentration=2.18 mmol/mL, 4.6 mL, 10 mmol). Subsequently, a toluene solution (9 mL) of 2-phenyl-2-propanol (0.82 g, 6.0 mmol) was added over a period of 30 minutes. After the addition, the mixture was stirred at 50° C. for 30 minutes and was heated to 100° C. at a heating rate of 1.0° C./min. The reaction was performed at 100° C. for 4 hours. The temperature was decreased to 60° C., and the supernatant was removed by filtration. The solid polyaluminoxane that had been precipitated was washed with toluene (25 mL) two times at 60° C. and one time at normal temperature. Thereafter, the total volume was adjusted to 40 mL by the addition of toluene. A solid polyaluminoxane composition was thus obtained.

The onset of the precipitation of the solid polyaluminoxane composition was observed when the temperature was raised to 90° C. after the addition of 2-phenyl-2-propanol.

The results are described in Table 2.

Test Example a1

A solid polyaluminoxane was prepared based on a method described in WO 2010/055652 (Preliminary Experiment 3 and Example 2). In consideration of safety concerns such as ignition of trimethylaluminum, the concentration was reduced to approximately ⅓ of the concentration disclosed in the literature.

Specifically, a glass reactor equipped with a stirrer was loaded with 80 mL of a 1.5 mol/L toluene solution of trimethylaluminum. The solution was cooled to 15° C., and benzoic acid (5.86 g, 48 mmol) was added at such a low rate that the temperature of the solution stayed at 25° C. or below. Thereafter, thermal aging was performed at 50° C. for 1 hour. Here, the molar ratio of the trimethylaluminum to the oxygen atoms in the benzoic acid was 1.25. The reaction liquid was heated at 70° C. for 4 hours and at 60° C. for 6 hours, and was cooled to room temperature. Subsequently, the liquid was heated at 100° C. for 8 hours, and a solid aluminoxane was precipitated. The solution was cooled to a temperature not more than 30° C., and the supernatant was removed by decantation. The solid polyaluminoxane precipitated was washed with toluene (60 mL) four times at normal temperature. Thereafter, the total volume was adjusted to 75 mL by the addition of toluene. The aluminum-based solidification rate was 61.6%.

[Analysis of Solid Polyaluminoxane Composition]

The grain size distribution was measured. The median diameter D50 in the cumulative volume was 27.2 μm and the uniformity was 0.242.

The solid polyaluminoxane composition obtained was dried and was analyzed to measure the solubility with respect to solvents. The solubility at 25° C. was 0.04 mol % in n-hexane, 0.27 mol % in toluene, and >99.9 mol % in tetrahydrofuran.

The molar fraction of methyl groups derived from trimethylaluminum moieties was 9.5 mol % relative to the total number of moles of the methyl groups. The aluminum content in the solid polyaluminoxane composition was 41.3 wt %. The specific surface area was 230 m$^2$/g.

The composition was observed by SEM, the results being illustrated in FIG. 9.

The results are described in Table 3.

Test Example a2

A glass reactor equipped with a stirrer was loaded with 150 mL of a 1.5 mol/L toluene solution of trimethylaluminum.

The solution was cooled to 15° C., and benzoic acid (11.0 g, 90 mmol) was added at such a low rate that the temperature of the solution stayed at 25° C. or below. Thereafter, thermal aging was performed at 50° C. for 1 hour. Here, the molar ratio of the trimethylaluminum to the oxygen atoms in the benzoic acid was 1.25. The reaction liquid was heated at 70° C. for 4 hours and at 60° C. for 6 hours, and was cooled to room temperature. Subsequently, the liquid was heated at 100° C. for 4 hours, and a solid aluminoxane was precipitated. The solution was cooled to a temperature not more than 30° C., and the supernatant was removed by decantation. The solid polyaluminoxane precipitated was washed with toluene (60 mL) four times at normal temperature. Thereafter, the total volume was adjusted to 75 mL by the addition of toluene.

The product was observed by SEM, the results being illustrated in FIG. 10.

The results are described in Table 3.

Test Example a3

A flask A was loaded with 23 mL of toluene. After the temperature was raised to 70° C., the Preliminary Experiment 1B solution (20 mL, 60 mmol) was added. Subsequently, a toluene solution (21 mL) of benzaldehyde (0.70 g, 6.6 mmol) was added over a period of 30 minutes. After the addition, the mixture was stirred at 70° C. for 30 minutes and was heated to 95° C. at a heating rate of 1.0° C./min. The reaction was performed at 95° C. for 4 hours. The temperature was decreased to 60° C., and the supernatant was removed by decantation. The solid polyaluminoxane that had been precipitated was washed with toluene (45 mL) two times at 60° C. and two times at normal temperature. Thereafter, the total volume was adjusted to 45 mL by the addition of toluene. A solid polyaluminoxane composition was thus obtained.

The composition was observed by SEM, the results being illustrated in FIG. 11.

The results are described in Table 3.

Test Example a4

A flask A was loaded with 20 mL of toluene. After the temperature was raised to 70° C., the Preliminary Experiment 1B solution (20 mL, 60 mmol) was added. Subsequently, a toluene solution (24 mL) of benzaldehyde (0.83 g, 7.8 mmol) was added over a period of 30 minutes. After the addition, the mixture was stirred at 70° C. for 30 minutes and was heated to 80° C. at a heating rate of 1.0° C./min. The reaction was performed at 80° C. for 4 hours. The temperature was decreased to 60° C., and the supernatant was removed by decantation. The solid polyaluminoxane that had been precipitated was washed with toluene (45 mL) two times at 60° C. and one time at normal temperature. Thereafter, the total volume was adjusted to 50 mL by the addition of toluene. A solid polyaluminoxane composition was thus obtained.

The onset of the precipitation of the solid polyaluminoxane composition was observed during the stirring at 70° C. after the addition of benzaldehyde.

The results are described in Table 3.

In Test Examples a1 to a4, the molar fraction of methyl groups derived from trimethylaluminum moieties was less than 13.0 mol % relative to the total number of moles of the methyl groups. The solubility in tetrahydrofuran at 25° C. was greater than 95 mol %.

Test Example a5 (Test Example d4)

A solid polyaluminoxane was prepared using the Preliminary Experiment 1A solution based on a method described in Examples (Experiment 109) in JP-A-H07-300486. The solid was amorphous and contained a large amount of gel components.

[Analysis of Solid Polyaluminoxane Composition]

The composition was observed by SEM, the results being illustrated in FIG. 12. The grain size distribution was measured. The median diameter D50 in the cumulative volume was 149 μm and the uniformity was 0.513 (FIG. 13).

The solid polyaluminoxane composition obtained was dried and was analyzed to measure the solubility with respect to solvents. The solubility at 25° C. was 0.56 mol % in n-hexane, 33.6 mol % in toluene, and >99.9 mol % in tetrahydrofuran.

The results are described in Table 3.

Test Example d1

A flask A was loaded with 30 mL of toluene. After the temperature was raised to 70° C., the Test Example A1 solution was added. The mixture was stirred at 70° C. for 60 minutes and was heated to 95° C. at a heating rate of 1.0° C./min. The reaction was performed at 95° C. for 4 hours, but no solid polyaluminoxane composition was precipitated.

The results are described in Table 3.

Test Example d2

A flask A was loaded with 30 mL of toluene. After the temperature was raised to 70° C., the Test Example D17 solution was added. The mixture was stirred at 70° C. for 60 minutes and was heated to 95° C. at a heating rate of 1.0° C./min. The reaction was performed at 95° C. for 4 hours, but no solid polyaluminoxane composition was precipitated.

The results are described in Table 3.

Test Example d3

A polymethylaluminoxane was supported on a porous silica (H-121, AGC Si-Tech Co., Ltd.) by a method described in Examples of JP-A-2004-51801, thereby preparing a silica-supported polymethylaluminoxane. The product was deactivated by the same treatment for the solid polyaluminoxane compositions, and the grain size distribution was measured.

The results are described in Table 3.

TABLE 2

| Test Example | Al-based Soldification rate (%) | Grain size distribution | |
|---|---|---|---|
| | | D50 (μm) | Uniformity |
| D4 | 98.7 | 24.0 | 0.243 |
| D5 | 98.0 | 24.8 | 0.247 |
| D7 | 98.9 | 44.8 | 0.217 |
| D8 | 98.4 | 55.6 | 0.377 |
| D9 | 97.3 | 28.8 | 0.230 |
| D10 | 98.9 | 40.6 | 0.223 |
| D12 | 99.2 | 33.1 | 0.215 |
| D13 | 90.1 | 24.3 | 0.198 |
| D15 | 96.2 | 31.1 | 0.222 |
| D16 | 92.0 | 36.6 | 0.215 |
| D17 | 96.2 | 31.1 | 0.222 |
| D18 | 94.4 | 44.5 | 0.272 |
| D19 | 99.1 | 40.5 | 0.330 |
| D20 | 44.7 | 21.8 | 0.252 |
| D21 | 99.1 | 41.4 | 0.235 |
| D22 | 98.0 | 40.2 | 0.221 |
| D24 | 55.1 | 24.9 | 0.223 |
| D25 | 66.3 | 30.7 | 0.215 |
| D26 | 97.4 | 36.8 | 0.268 |
| D27 | 79.5 | 32.7 | 0.213 |
| D28 | 82.5 | 28.4 | 0.211 |
| D29 | 97.9 | 31.1 | 0.217 |
| D30 | 86.9 | 31.0 | 0.208 |
| D31 | 89.6 | 19.1 | 0.223 |
| D32 | 97.3 | 26.1 | 0.217 |
| D33 | 96.0 | 6.6 | 0.227 |
| D34 | 95.0 | 2.4 | 0.222 |
| D37 | 94.9 | 21.0 | 0.218 |
| D38 | 97.4 | 20.0 | 0.216 |
| D39 | 97.5 | 24.1 | 0.218 |
| D40 | 94.4 | 26.9 | 0.213 |
| D41 | 97.5 | 24.4 | 0.220 |
| D42 | 97.3 | 25.9 | 0.210 |
| D43 | 98.3 | 26.7 | 0.213 |
| D44 | 93.7 | 28.7 | 0.199 |
| D45 | 98.4 | 27.0 | 0.217 |
| D46 | 99.3 | 23.7 | 0.211 |
| D47 | 99.4 | 24.5 | 0.217 |
| D48 | 93.8 | 38.7 | 0.216 |
| D49 | 98.5 | 29.6 | 0.217 |
| D50 | 98.9 | 38.4 | 0.226 |
| D51 | 97.6 | 38.7 | 0.231 |
| D52 | 98.1 | 33.0 | 0.215 |
| D53 | 99.5 | 6.5 | 0.224 |
| D54 | 99.9 | 3.7 | 0.183 |
| D55 | 98.8 | 11.7 | 0.284 |

[Preparation of Olefin Polymerization (Oligomerization) Catalysts]

Olefin polymerization (oligomerization) catalysts were prepared by methods described in Test Examples.

Test Example B1

In a glove box, the toluene slurry of the solid polyaluminoxane composition obtained in Test Example A1 (Al concentration=0.99 mmol/mL, 1.6 mL, 1.6 mmol) was placed into a reaction vessel. Toluene (6.9 mL) was added to the slurry. Subsequently, there was added a toluene solution of Ti compound (Compound 9 illustrated below) described in WO 2009/5003 (concentration 2.5 mmol/L, 12.7 mL, 0.032 mmol). While blocking light, the mixture was stirred at normal temperature for 3 hours. The liquid was allowed to stand to cause the solid component to settle. The supernatant was passed through a 0.2 μm filter to remove any suspended solid component. An olefin polymerization (oligomerization) catalyst was thus obtained.

[Chem. 14]

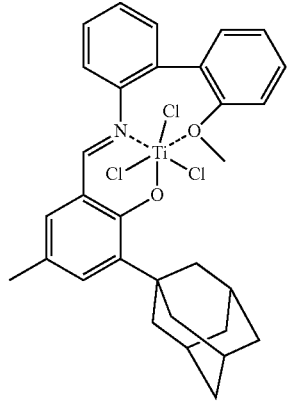

COMPOUND 9

The filtrate obtained (10 mL) was analyzed by ICP-AES, and the Ti concentration in the filtrate was measured to be not more than the detection limit (below 0.021 mmol/L). Based on this, the amount of Ti that was not supported on the solid polyaluminoxane composition was less than 0.44 μmol, namely, less than 1.4 mol % relative to the amount of Ti used in the reaction. The Al concentration in the filtrate

TABLE 3

| Test Example | Al-based solidification rate (%) | Grain size distribution | | Solubility (mol %) | | | Molar fraction | | Al content | Specific surface area |
|---|---|---|---|---|---|---|---|---|---|---|
| | | D50 (μm) | Uniformity | N-hexane | Toluene | THF | Molar fraction*[1] | mol % | (wt %)*[2] | (m²/g) |
| a1 | 61.6 | 27.2 | 0.242 | 0.04 | 0.27 | >99.9 | (3) | 9.5 | 41.3 | 230 |
| a2 | — | 28.0 | 0.235 | 0.04 | 0.06 | >99.9 | (3) | 10.1 | 38.4 | — |
| a3 | 72.5 | 36.3 | 0.213 | 0.05 | 0.08 | >99.9 | (3) | 11.5 | 43.2 | 482 |
| a4 | 87.2 | 32.5 | 0.215 | 0.06 | 0.07 | 98.6 | (3) | 10.8 | 42.4 | 477 |
| a5 (d4) | — | 149 | 0.513 | 0.56 | 33.6 | >99.9 | — | — | — | — |
| d1 | 0 | — | — | — | — | — | — | — | — | — |
| d2 | 0 | — | — | — | — | — | — | — | — | — |
| d3 | — | 13.0 | 0.271 | — | — | — | — | — | — | — |

*[1]Molar fraction (3) indicates the "molar fraction of methyl groups derived from trimethylaluminum moieties relative to the total number of moles of methyl groups".
*[2]Content of aluminum in solid polyaluminoxane composition was not more than the detection limit (below 0.19 mmol/L). Based on this, the amount of A1 dissolved out from the solid polyaluminoxane composition was less than 4.0 μmol, namely, less than 0.3 mol % relative to the amount of A1 used in the reaction.

The olefin polymerization (oligomerization) catalyst (the solid component) prepared was analyzed to measure the grain size distribution. The median diameter D50 in the cumulative volume was 29.0 μm and the uniformity was 0.214.

The results are described in Table 4.

The catalyst was observed by SEM, the results being illustrated in FIG. 14.

Test Example B2

A filtrate was obtained by the same method as in Test Example B1, except that use was made of the toluene slurry of the solid polyaluminoxane composition obtained in Test Example A2 (Al concentration=0.97 mmol/mL, 1.6 mL, 1.6 mmol) and toluene (6.8 mL).

The filtrate was analyzed in the same manner as in Test Example B1. Table 4 describes the results and the grain size distribution of the catalyst (the solid component).

Test Example B3

A filtrate was obtained by the same method as in Test Example B1, except that use was made of the toluene slurry of the solid polyaluminoxane composition obtained in Test Example A3 (Al concentration=0.89 mmol/mL, 1.8 mL, 1.6 mmol) and toluene (6.7 mL).

The filtrate was analyzed in the same manner as in Test Example B1. Table 4 describes the results and the grain size distribution of the catalyst (the solid component).

Test Example B4

A filtrate was obtained by the same method as in Test Example B1, except that use was made of the toluene slurry of the solid polyaluminoxane composition obtained in Test Example A6 (Al concentration=1.03 mmol/mL, 1.5 mL, 1.5 mmol), toluene (6.7 mL) and a toluene solution of the Ti compound 9 (concentration 2.5 mmol/L, 12.4 mL, 0.031 mmol).

The filtrate was analyzed in the same manner as in Test Example B1. Table 4 describes the results and the grain size distribution of the catalyst (the solid component).

Test Example B5

A filtrate was obtained by the same method as in Test Example B1, except that use was made of the toluene slurry of the solid polyaluminoxane composition obtained in Test Example A7 (Al concentration=0.86 mmol/mL, 1.9 mL, 1.6 mmol) and toluene (6.7 mL).

The filtrate was analyzed in the same manner as in Test Example B1. Table 4 describes the results and the grain size distribution of the catalyst (the solid component).

The catalyst was observed by SEM, the results being illustrated in FIG. 15.

Test Example b1

A filtrate was obtained by the same method as in Test Example B1, except that use was made of the toluene slurry of the solid polyaluminoxane composition obtained in Test Example a1 (Al concentration=0.94 mmol/mL, 1.7 mL, 1.6 mmol) and toluene (6.8 mL).

The filtrate was analyzed in the same manner as in Test Example B1. The Ti concentration in the filtrate was 0.044 mmol/L. Based on this, the amount of Ti that was not supported on the solid polyaluminoxane composition was 0.93 μmol, namely, 2.9 mol % relative to the amount of Ti used in the reaction. The Al concentration in the filtrate was 1.7 mmol/L. Based on this, the amount of Al dissolved out from the solid polyaluminoxane composition was 36 μmol, namely, 2.3 mol % relative to the amount of Al used in the reaction.

The particles (the solid component) prepared were analyzed to measure the grain size distribution. The median diameter D50 in the cumulative volume was 57.3 μm and the uniformity was 0.378.

The results are described in Table 4.

The particles were observed by SEM, the results being illustrated in FIG. 16. The particles had been fused and joined together to form large masses.

Test Example b2

A filtrate was obtained by the same method as in Test Example B1, except that use was made of the toluene slurry of the solid polyaluminoxane composition obtained in Test Example a2 (Al concentration=1.06 mmol/mL, 1.5 mL, 1.6 mmol) and toluene (7.0 mL).

The filtrate was analyzed in the same manner as in Test Example B1. Table 4 describes the results and the grain size distribution of the catalyst (the solid component).

The particles were observed by SEM, the results being illustrated in FIG. 17. The particles had been fused and joined together to form large masses.

Test Example b3

A filtrate was obtained by the same method as in Test Example B1, except that use was made of the toluene slurry of the solid polyaluminoxane composition obtained in Test Example a3 (Al concentration=0.89 mmol/mL, 1.8 mL, 1.6 mmol) and toluene (6.7 mL).

The filtrate was analyzed in the same manner as in Test Example B1. Table 4 describes the results and the grain size distribution of the catalyst (the solid component).

The particles were observed by SEM, the results being illustrated in FIG. 18. The particles had been fused and joined together to form large masses.

Test Example b4

A filtrate was obtained by the same method as in Test Example B1, except that use was made of the toluene slurry of the solid polyaluminoxane composition obtained in Test Example a4 (Al concentration=1.18 mmol/mL, 1.4 mL, 1.7 mmol) and toluene (7.2 mL).

The filtrate was analyzed in the same manner as in Test Example B1. Table 4 describes the results and the grain size distribution of the catalyst (the solid component).

The particles were observed by SEM. The particles had been fused and joined together to form large masses.

In Test Examples b1 to b4, free transition metal compounds and aluminum were observed. Namely, main catalyst components and cocatalyst components had been leached from the solid polyaluminoxane compositions. Further, a marked increase in mean particle diameter D50 was observed. This phenomenon was probably ascribed to the formation of large masses as a result of the fusion bonding of particles by the contact with the transition metal compounds.

Test Example B6

A filtrate was obtained by the same method as in Test Example B1, except that use was made of the toluene slurry of the solid polyaluminoxane composition obtained in Test Example A1 (Al concentration=0.99 mmol/mL, 3.2 mL, 3.2 mmol) and toluene (5.3 mL).

The filtrate was analyzed in the same manner as in Test Example B1. The results are described in Table 5.

Test Example B7

A filtrate was obtained by the same method as in Test Example B1, except that use was made of the toluene slurry of the solid polyaluminoxane composition obtained in Test Example A1 (Al concentration=0.99 mmol/mL, 6.4 mL, 6.4 mmol) and toluene (2.1 mL).

The filtrate (15 mL) was analyzed in the same manner as in Test Example B1. The results are described in Table 5.

Test Example B8

In a glove box, the toluene slurry of the solid polyaluminoxane composition obtained in Test Example A1 (Al concentration=0.99 mmol/mL, 9.6 mL, 9.5 mmol) was placed into a reaction vessel. To adjust the concentration, the supernatant (1.1 mL) was removed from the slurry by decantation. Subsequently, there was added a toluene solution of the Ti compound 9 (concentration 2.5 mmol/L, 12.7 mL, 0.032 mmol). While blocking light, the mixture was stirred at normal temperature for 3 hours. The rest of the procedure was the same as in Test Example B1. An olefin polymerization (oligomerization) catalyst was thus obtained.

The filtrate (15 mL) was analyzed in the same manner as in Test Example B1. The results are described in Table 5.

Test Example B9

A filtrate was obtained by the same method as in Test Example B1, except that use was made of the toluene slurry of the solid polyaluminoxane composition obtained in Test Example A3 (Al concentration=0.89 mmol/mL, 3.6 mL, 3.2 mmol) and toluene (4.9 mL).

The filtrate was analyzed in the same manner as in Test Example B1. The results are described in Table 5.

Test Example B10

A filtrate was obtained by the same method as in Test Example B1, except that use was made of the toluene slurry of the solid polyaluminoxane composition obtained in Test Example A3 (Al concentration=0.89 mmol/mL, 7.1 mL, 6.3 mmol) and toluene (1.4 mL).

The filtrate (15 mL) was analyzed in the same manner as in Test Example B1. The results are described in Table 5.

Test Example B11

A filtrate was obtained by the same method as in Test Example B1, except that use was made of the toluene slurry of the solid polyaluminoxane composition obtained in Test Example A6 (Al concentration=1.03 mmol/mL, 3.0 mL, 3.1 mmol), toluene (5.2 mL) and a toluene solution of the Ti compound 9 (concentration 2.5 mmol/L, 12.4 mL, 0.031 mmol).

The filtrate was analyzed in the same manner as in Test Example B1. The results are described in Table 5.

Test Example B12

A filtrate was obtained by the same method as in Test Example B1, except that use was made of the toluene slurry of the solid polyaluminoxane composition obtained in Test Example A6 (Al concentration=1.03 mmol/mL, 6.0 mL, 6.2 mmol), toluene (2.2 mL) and a toluene solution of the Ti compound 9 (concentration 2.5 mmol/L, 12.4 mL, 0.031 mmol).

The filtrate was analyzed in the same manner as in Test Example B1. The results are described in Table 5.

Test Example b5

A filtrate was obtained by the same method as in Test Example B1, except that use was made of the toluene slurry of the solid polyaluminoxane composition obtained in Test Example a2 (Al concentration=1.06 mmol/mL, 3.0 mL, 3.2 mmol) and toluene (5.5 mL).

The filtrate was analyzed in the same manner as in Test Example B1. The Ti concentration in the filtrate was 0.055 mmol/L. Based on this, the amount of Ti that was not supported on the solid polyaluminoxane composition was 1.2 µmol, namely, 3.6 mol % relative to the amount of Ti used in the reaction. The Al concentration in the filtrate was 5.5 mmol/L. Based on this, the amount of Al dissolved out from the solid polyaluminoxane composition was 117 µmol, namely, 3.7 mol % relative to the amount of Al used in the reaction.

The results are described in Table 5.

Test Example b6

A filtrate was obtained by the same method as in Test Example B1, except that use was made of the toluene slurry of the solid polyaluminoxane composition obtained in Test Example a2 (Al concentration=1.06 mmol/mL, 6.0 mL, 6.4 mmol) and toluene (2.5 mL).

The filtrate was analyzed in the same manner as in Test Example B1. The results are described in Table 5.

Test Example b7

A filtrate was obtained by the same method as in Test Example B1, except that use was made of the toluene slurry of the solid polyaluminoxane composition obtained in Test Example a3 (Al concentration=0.89 mmol/mL, 3.6 mL, 3.2 mmol) and toluene (4.9 mL).

The filtrate was analyzed in the same manner as in Test Example B1. The results are described in Table 5.

Test Example b8

A filtrate was obtained by the same method as in Test Example B1, except that use was made of a toluene slurry of a solid polyaluminoxane composition prepared in the similar manner to Test Example a3 (Al concentration=1.06 mmol/mL, 12.0 mL, 12.7 mmol), toluene (5.0 mL) and a toluene solution of the Ti compound 9 (concentration 2.5 mmol/L, 25.4 mL, 0.064 mmol).

The filtrate (30 mL) was analyzed in the same manner as in Test Example B1. The results are described in Table 5.

In Test Examples b5 to b8, free transition metal compounds and aluminum were observed. Namely, main catalyst components and cocatalyst components had been leached from the solid polyaluminoxane compositions.

Test Example B13

In a glove box, the toluene slurry of the solid polyaluminoxane composition obtained in Test Example A3 (Al concentration=0.89 mmol/mL, 3.6 mL, 3.2 mmol) was placed into a reaction vessel. Toluene (4.9 mL) was added to the slurry. Subsequently, there was added a toluene solution of bis(n-butylcyclopentadienyl)zirconium (IV) dichloride (concentration 2.5 mmol/L, 12.7 mL, 0.032 mmol). While blocking light, the mixture was stirred at normal temperature for 3 hours. The rest of the procedure was the same as in Test Example B1. An olefin polymerization (oligomerization) catalyst was thus obtained.

The filtrate obtained (15 mL) was analyzed by ICP-AES, and the Zr concentration in the filtrate was measured to be not more than the detection limit (below 0.0074 mmol/L). Based on this, the amount of Zr that was not supported on the solid polyaluminoxane composition was less than 0.16 μmol, namely, less than 0.5 mol % relative to the amount of Zr used in the reaction. The Al concentration in the filtrate was not more than the detection limit (below 0.13 mmol/L). Based on this, the amount of Al dissolved out from the solid polyaluminoxane composition was less than 2.8 μmol, namely, less than 0.1 mol % relative to the amount of Al used in the reaction.

The results are described in Table 6.

Test Example B14

A filtrate was obtained by the same method as in Test Example B13, except that use was made of the toluene slurry of the solid polyaluminoxane composition obtained in Test Example A3 (Al concentration=0.89 mmol/mL, 7.1 mL, 6.3 mmol) and toluene (1.4 mL).

The filtrate was analyzed in the same manner as in Test Example B13. The results are described in Table 6.

Test Example B15

A filtrate was obtained by the same method as in Test Example B13, except that use was made of a toluene slurry of a solid polyaluminoxane composition prepared in the similar manner to Test Example A3 (Al concentration=1.35 mmol/mL, 7.2 mL, 9.7 mmol), toluene (1.4 mL) and a toluene solution of bis(n-butylcyclopentadienyl)zirconium (IV) dichloride (concentration 2.5 mmol/L, 13.0 mL, 0.032 mmol).

The filtrate was analyzed in the same manner as in Test Example B13. The results are described in Table 6.

Test Example B16

A toluene slurry of a solid polyaluminoxane composition prepared in the similar manner to Test Example A3 (Al concentration=1.35 mmol/mL, 72 mL, 97 mmol) was placed into a reaction vessel. To adjust the concentration, the supernatant (42 mL) was removed from the slurry by decantation. Subsequently, there was added a toluene solution of bis(n-butylcyclopentadienyl)zirconium (IV) dichloride (concentration 2.5 mmol/L, 13.0 mL, 0.032 mmol). While blocking light, the mixture was stirred at normal temperature for 3 hours. The rest of the procedure was the same as in Test Example B1. An olefin polymerization (oligomerization) catalyst was thus obtained.

The filtrate (30 mL) was analyzed in the same manner as in Test Example B13, and the Zr concentration in the filtrate was measured to be not more than the detection limit (below 0.0037 mmol/L). Based on this, the amount of Zr that was not supported on the solid polyaluminoxane composition was less than 0.16 μmol, namely, less than 0.5 mol % relative to the amount of Zr used in the reaction.

The results are described in Table 6.

Test Example B17

A filtrate was obtained by the same method as in Test Example B13, except that use was made of the toluene slurry of the solid polyaluminoxane composition obtained in Test Example A4 (Al concentration=1.31 mmol/mL, 5.0 mL, 6.6 mmol), toluene (3.7 mL) and a toluene solution of bis(n-butylcyclopentadienyl)zirconium (IV) dichloride (concentration 2.5 mmol/L, 13.1 mL, 0.033 mmol).

The filtrate was analyzed in the same manner as in Test Example B13. The results are described in Table 6.

Test Example B18

A filtrate was obtained by the same method as in Test Example B13, except that use was made of the toluene slurry of the solid polyaluminoxane composition obtained in Test Example A5 (Al concentration=1.28 mmol/mL, 5.0 mL, 6.4 mmol) and toluene (3.5 mL).

The filtrate (15 mL) was analyzed in the same manner as in Test Example B13. The results are described in Table 6.

Test Example b9

A filtrate was obtained by the same method as in Test Example B13, except that use was made of a toluene slurry of a solid polyaluminoxane composition prepared in the similar manner to Test Example a3 (Al concentration=0.91 mmol/mL, 1.8 mL, 1.6 mmol) and toluene (3.5 mL).

The filtrate (15 mL) was analyzed in the same manner as in Test Example B13. The results are described in Table 6.

Test Example b10

A filtrate was obtained by the same method as in Test Example B13, except that use was made of a toluene slurry of a solid polyaluminoxane composition prepared in the similar manner to Test Example b3 (Al concentration=0.91 mmol/mL, 3.5 mL, 3.2 mmol) and toluene (5.0 mL).

The filtrate (15 mL) was analyzed in the same manner as in Test Example B13. The results are described in Table 6.

Test Example b11

A filtrate was obtained by the same method as in Test Example B13, except that use was made of a toluene slurry of a solid polyaluminoxane composition prepared in the similar manner to Test Example a3 (Al concentration=1.06 mmol/mL, 12.0 mL, 12.7 mmol), toluene (5.0 mL) and a toluene solution of bis(n-butylcyclopentadienyl)zirconium (IV) dichloride (concentration 2.5 mmol/L, 25.4 mL, 0.064 mmol).

The filtrate (30 mL) was analyzed in the same manner as in Test Example B13. The results are described in Table 6.

Test Example b12

In a glove box, the toluene slurry of the solid polyaluminoxane composition obtained in Test Example a3 (Al concentration=0.97 mmol/mL, 19.5 mL, 19.0 mmol) was placed into a reaction vessel. To adjust the concentration, the supernatant (2.6 mL) was removed from the slurry by decantation, and toluene (5.0 mL) was added. Subsequently, there was added a toluene solution of bis(n-butylcyclopentadienyl)zirconium (IV) dichloride (concentration 2.5 mmol/L, 25.3 mL, 0.063 mmol). While blocking light, the mixture was stirred at normal temperature for 3 hours. The rest of the procedure was the same as in Test Example B1. An olefin polymerization (oligomerization) catalyst was thus obtained.

The filtrate (30 mL) was analyzed in the same manner as in Test Example B13. The results are described in Table 6.

In Test Examples b9 to b12, free transition metal compounds and aluminum were observed. Namely, main catalyst components and cocatalyst components had been leached from the solid polyaluminoxane compositions.

Test Example B19

In a glove box, the toluene slurry of the solid polyaluminoxane composition obtained in Test Example A3 (Al concentration=0.89 mmol/mL, 7.1 mL, 6.3 mmol) was placed into a reaction vessel. Toluene (1.4 mL) was added to the slurry. Subsequently, there was added a toluene solution of diphenylmethylidene(cyclopentadienyl)(9-fluorenyl)zirconium (IV) dichloride (concentration 2.5 mmol/L, 12.7 mL, 0.032 mmol). While blocking light, the mixture was stirred at normal temperature for 3 hours. The rest of the procedure was the same as in Test Example B1. An olefin polymerization (oligomerization) catalyst was thus obtained.

The filtrate obtained (15 mL) was analyzed by ICP-AES. The results are described in Table 7.

Test Example B20

In a glove box, the toluene slurry of the solid polyaluminoxane composition obtained in Test Example A3 (Al concentration=0.89 mmol/mL, 7.1 mL, 6.3 mmol) was placed into a reaction vessel. Toluene (1.4 mL) was added to the slurry. Subsequently, there was added a toluene solution of dimethylsilylenebis(cyclopentadienyl)zirconium (IV) dichloride (concentration 2.5 mmol/L, 12.7 mL, 0.032 mmol). While blocking light, the mixture was stirred at normal temperature for 3 hours. The rest of the procedure was the same as in Test Example B1. An olefin polymerization (oligomerization) catalyst was thus obtained.

The filtrate obtained (15 mL) was analyzed by ICP-AES. The results are described in Table 7.

Test Example B21

In a glove box, a toluene slurry of a solid polyaluminoxane composition prepared in the similar manner to Test Example A3 (Al concentration=1.35 mmol/mL, 4.8 mL, 6.5 mmol) was placed into a reaction vessel. Toluene (3.9 mL) was added to the slurry. Subsequently, there was added a toluene solution of bis(t-butylcyclopentadienyl)hafnium (IV) dichloride (concentration 2.5 mmol/L, 13.0 mL, 0.032 mmol). While blocking light, the mixture was stirred at normal temperature for 3 hours. The rest of the procedure was the same as in Test Example B1. An olefin polymerization (oligomerization) catalyst was thus obtained.

The filtrate obtained (15 mL) was analyzed by ICP-AES, and the Hf concentration in the filtrate was measured to be not more than the detection limit (below 0.019 mmol/L). Based on this, the amount of Hf that was not supported on the solid polyaluminoxane composition was less than 0.41 µmol, namely, less than 1.3 mol % relative to the amount of Hf used in the reaction. The Al concentration in the filtrate was not more than the detection limit (below 0.13 mmol/L). Based on this, the amount of Al dissolved out from the solid polyaluminoxane composition was less than 2.8 µmol, namely, less than 0.04 mol % relative to the amount of Al used in the reaction.

The results are described in Table 8.

Test Example B22

In a glove box, a toluene slurry of a solid polyaluminoxane composition prepared in the similar manner to Test Example A3 (Al concentration=1.35 mmol/mL, 5.0 mL, 6.8 mmol) was placed into a reaction vessel. Toluene (4.0 mL) was added to the slurry. Subsequently, there was added a toluene solution of Ti compound 1 described in WO 2001/55231 (bis{N-(3-tert-butylsalicylidene)-2,3,4,5,6-pentafluoroanilinato}titanium (IV) dichloride) (concentration 2.5 mmol/L, 13.5 mL, 0.034 mmol). While blocking light, the mixture was stirred at normal temperature for 3 hours. The rest of the procedure was the same as in Test Example B1. An olefin polymerization (oligomerization) catalyst was thus obtained.

The filtrate obtained (10 mL) was analyzed by ICP-AES. The results are described in Table 9.

Test Example b13

In a glove box, a toluene slurry of a solid polyaluminoxane composition prepared in the similar manner to Test Example a3 (Al concentration=1.06 mmol/mL, 12.0 mL, 12.7 mmol) was placed into a reaction vessel. Toluene (5.0 mL) was added to the slurry. Subsequently, there was added a toluene solution of diphenylmethylidene(cyclopentadienyl)(9-fluorenyl)zirconium (IV) dichloride (concentration 2.5 mmol/L, 25.4 mL, 0.064 mmol). While blocking light, the mixture was stirred at normal temperature for 3 hours. The rest of the procedure was the same as in Test Example B1. An olefin polymerization (oligomerization) catalyst was thus obtained.

The filtrate obtained (30 mL) was analyzed by ICP-AES, and the Zr concentration in the filtrate was measured to be 0.030 mmol/L. Based on this, the amount of Zr that was not supported on the solid polyaluminoxane composition was 1.3 µmol, namely, 2.0 mol % relative to the amount of Zr used in the reaction. The Al concentration in the filtrate was 1.8 mmol/L. Based on this, the amount of Al dissolved out from the solid polyaluminoxane composition was 78 µmol, namely, 0.6 mol % relative to the amount of Al used in the reaction.

The results are described in Table 7.

Test Example b14

In a glove box, a toluene slurry of a solid polyaluminoxane composition prepared in the similar manner to Test Example a3 (Al concentration=1.06 mmol/mL, 12.0 mL, 12.7 mmol) was placed into a reaction vessel. Toluene (5.0 mL) was added to the slurry. Subsequently, there was added a toluene solution of dimethylsilylenebis(cyclopentadienyl) zirconium (IV) dichloride (concentration 2.5 mmol/L, 25.4 mL, 0.064 mmol). While blocking light, the mixture was stirred at normal temperature for 3 hours. The rest of the procedure was the same as in Test Example B1. An olefin polymerization (oligomerization) catalyst was thus obtained.

The filtrate obtained (30 mL) was analyzed by ICP-AES. The results are described in Table 7.

Test Example b15

In a glove box, a toluene slurry of a solid polyaluminoxane composition prepared in the similar manner to Test Example a3 (Al concentration=0.97 mmol/mL, 13.0 mL, 12.6 mmol) was placed into a reaction vessel. Toluene (3.9 mL) was added to the slurry. Subsequently, there was added a toluene solution of bis(t-butylcyclopentadienyl)hafnium (IV) dichloride (concentration 2.5 mmol/L, 25.3 mL, 0.063 mmol). While blocking light, the mixture was stirred at normal temperature for 3 hours. The rest of the procedure was the same as in Test Example B1. An olefin polymerization (oligomerization) catalyst was thus obtained.

The filtrate obtained (30 mL) was analyzed by ICP-AES. The results are described in Table 8.

Test Example b16

In a glove box, a toluene slurry of a solid polyaluminoxane composition prepared in the similar manner to Test Example a3 (Al concentration=0.97 mmol/mL, 13.0 mL, 12.6 mmol) was placed into a reaction vessel. Toluene (3.9 mL) was added to the slurry. Subsequently, there was added a toluene solution of Ti compound 1 described in WO 2001/55231 (bis{N-(3-tert-butylsalicylidene)-2,3,4,5,6-pentafluoroanilinato}titanium (IV) dichloride) (concentration 2.5 mmol/L, 25.3 mL, 0.063 mmol). While blocking light, the mixture was stirred at normal temperature for 3 hours. The rest of the procedure was the same as in Test Example B1. An olefin polymerization (oligomerization) catalyst was thus obtained.

The filtrate obtained (30 mL) was analyzed by ICP-AES. The results are described in Table 9.

In Test Examples b13 to b16, free transition metal compounds were observed. Namely, the transition metal compounds had been leached from the solid polyaluminoxane compositions.

[Test Example B23-1] Preparation of Solid Catalyst Component

A 200 mL-volume reactor that had been thoroughly purged with nitrogen was loaded with the toluene slurry of the solid polyaluminoxane composition obtained in Test Example A8 (Al concentration=0.98 mmol/mL, 14.7 mL, 14.4 mmol) and toluene (31.3 mL). To the slurry was added a toluene solution of bis(1,3-n-butylmethylcyclopentadienyl)zirconium (IV) dichloride (concentration 12.0 mmol/L, 4.0 mL, 0.048 mmol). The mixture was stirred at normal temperature for 1 hour. The liquid was allowed to stand to cause the solid component to settle. The supernatant was removed, and the residue was washed with hexane two times. Thus, a solid catalyst component slurry was prepared in a total volume of 50 mL.

The supernatant (20 mL) obtained during the above process was analyzed by ICP-AES. The results are described in Table 7.

[Test Example B23-2] Preparation of Prepolymerized Catalyst Component

The solid catalyst component slurry obtained in Test Example B23-1 was cooled to 10° C. Thereafter, diisobutylaluminum hydride (DiBAl-H) (2.0 mmol) was added, and the supply of ethylene (flow rate 0.9 L/hr) was started. The temperature in the system was raised to 35° C. While controlling the temperature at 33 to 37° C., ethylene was supplied for 3 hours. The system was then purged with nitrogen, and the liquid was allowed to stand to cause the solid component to settle. The supernatant was removed, and the residue was washed with hexane three times. The total volume was adjusted to 50 mL.

The supernatant (10 mL) obtained during the above process was analyzed by ICP-AES, and the Zr concentration in the supernatant was 0.012 mmol/L. Based on this, the amount of Zr dissolved out from the solid catalyst component was 0.62 µmol, namely, 1.3 mol % relative to the amount of Zr used in the reaction.

Next, the temperature in the system was raised to 35° C., and a hexane solution of Chemistat 2500 (manufactured by Sanyo Chemical Industries, Ltd.) (concentration 10 g/L, 4.0 mL, 40 mg) was added. While controlling the temperature at 33 to 37° C., the materials were contacted together for 2 hours. The liquid was allowed to stand to cause the solid component to settle. The product was washed with hexane three times. A prepolymerized catalyst component was thus prepared.

The results are described in Table 7.

[Test Example b17-1] Preparation of Solid Catalyst Component

A solid catalyst component slurry (total volume 50 mL) was prepared under the same conditions as in Test Example B23-1, except that use was made of the toluene slurry of the solid polyaluminoxane composition obtained in Test Example a3 (Al concentration=1.13 mmol/mL, 15.6 mL, 17.7 mmol), toluene (29.5 mL) and a toluene solution of bis(1,3-n-butylmethylcyclopentadienyl)zirconium (IV) dichloride (concentration 12.0 mmol/L, 4.9 mL, 0.059 mmol).

The supernatant (20 mL) obtained during the above process was analyzed by ICP-AES. The results are described in Table 7.

[Test Example b17-2] Preparation of Prepolymerized Catalyst Component

A prepolymerized catalyst component was prepared under the same conditions as in Test Example B23-2, except that the solid catalyst component slurry obtained in Test Example b17-1 was used.

The supernatant (10 mL) obtained during the above process was analyzed by ICP-AES, and the Zr concentration in the supernatant was 0.24 mmol/L. Based on this, the amount of Zr dissolved out from the solid catalyst component was 12 µmol, namely, 21.4 mol % relative to the amount of Zr used in the reaction.

In Test Examples b17-1 and b17-2, free transition metal compound was observed. Namely, the transition metal compound had been leached from the solid polyaluminoxane composition.

The results are described in Table 7.

Test Example B24

A 100 mL three-necked flask that had been thoroughly purged with nitrogen was fitted with a stirring rod. To the flask, the toluene slurry (11.2 mL) of the solid polyaluminoxane composition obtained in Test Example A10 was added. At room temperature, 18.8 mL of dehydrated toluene was added. While performing stirring, the temperature was raised to 35° C. Separately, 40.2 mg of diphenylmethylene (3-tert-butyl-5-methyl-cyclopentadienyl) (2,7-di-tert-butyl-fluorenyl)zirconium dichloride was weighed and added to a Schlenk tube thoroughly purged with nitrogen. Next, 8.7 g of toluene was added, and the mixture was stirred to give a metallocene complex solution. The metallocene complex solution was dropped to the previously prepared toluene slurry of the solid polyaluminoxane composition. After the dropwise addition, stirring was performed for 1 hour. The stirring was then discontinued, and the liquid was allowed to stand to cause the solid to settle. Thereafter, 20.34 g of the colorless and transparent supernatant was collected. Any metals present in the supernatant were analyzed by ICP-AES. Consequently, 0.0467 mg of zirconium was detected. The zirconium concentration in the liquid was 2.3 ppm. The remaining of the slurry was filtered in a nitrogen atmosphere. The powder on the filter was washed with 10 mL of dehydrated toluene two times and with 10 mL of dehydrated hexane one time. The washed powder was dried under reduced pressure for 2 hours. Thus, 0.913 g of a supported catalyst was obtained. ICP showed that the zirconium concentration in the supported catalyst was 0.50 wt %. Mineral oil was added to the powder to give a 10.0 wt % slurry.

Test Example b18

A supported catalyst was prepared by the same method as in Test Example B24, except that use was made of the toluene slurry (15.6 mL) of the solid polyaluminoxane composition prepared in Test Example a3 and 46.5 mg of the metallocene complex. In 19.88 g of the light purple supernatant, 0.242 mg of zirconium was detected. The zirconium concentration in the liquid was 12.2 ppm. The amount of the supported catalyst obtained was 1.125 g. The zirconium concentration in the supported catalyst was 0.45 wt %. Mineral oil was added to the powder to give a 10.0 wt % slurry.

While the supernatant obtained during the preparation of the supported catalyst in Test Example B24 contained 2.3 ppm of zirconium, 12.2 ppm of zirconium was detected in the supernatant in Test Example b18. Thus, the solid polyaluminoxane compositions of the invention can efficiently support expensive organometallic complexes.

[Test Example B25-1] Preparation of Solid Catalyst Component

At 30° C. and in a stream of nitrogen, a 100 mL three-necked flask thoroughly purged with nitrogen and equipped with a stirrer was loaded with 32 mL of purified decane and 8.2 mmol in terms of aluminum of the solid polyaluminoxane composition obtained in Test Example A15, thereby preparing a suspension. While performing stirring, a 3.2 mmol/L toluene solution containing 27.9 mg (0.033 mmol) of the transition metal compound described in Preliminary Experiment 5 (8-octamethylfluoren-12'-yl-(2-(adamantan-1-yl)-8-methyl-3,3b,4,5,6,7,7a,8-octahydrocyclopenta[a]indene))zirconium dichloride) was added to the suspension. The stirring was discontinued after 1 hour, and the product was washed by a decantation method with 50 mL of decane three times. A slurry was thus obtained (Zr support rate 100%).

[Test Example B25-2] Preparation of Prepolymerized Catalyst Component

A gas mixture containing hydrogen (1.5 L/h) and nitrogen (15 L/h) was passed through the slurry prepared in Test Example B25-1 to purge the liquid. Subsequently, there were charged 2.3 mL of a decane solution of diisobutylaluminum hydride (1.0 mmol/mL in terms of aluminum atoms) and 2.2 mL of 3-methyl-1-pentene. Stirring was discontinued after 1 hour, and the product was washed by a decantation method with 50 mL of decane three times. Thus, a decane slurry of a prepolymerized catalyst component (5 g/L, 0.31 mmol-Zr/L) was obtained.

[Test Example b19-1] Preparation of Solid Catalyst Component

At 30° C. and in a stream of nitrogen, a 100 mL three-necked flask thoroughly purged with nitrogen and equipped with a stirrer was loaded with 32 mL of purified decane and 7.5 mmol in terms of aluminum of the solid polyaluminoxane composition obtained in Test Example a3, thereby preparing a suspension. While performing stirring, a 4.3 mmol/L toluene solution containing 25.5 mg (0.030 mmol) of the transition metal compound described in Preliminary Experiment 5 was added to the suspension. The stirring was discontinued after 1 hour, and the product was washed by a decantation method with 50 mL of decane three times. A slurry was thus obtained (Zr support rate 97%).

[Test Example b19-2] Preparation of Prepolymerized Catalyst Component

A decane slurry of a prepolymerized catalyst component (5 g/L, 0.33 mmol-Zr/L) was prepared in the same manner as in Test Example B25-2, except that use was made of the slurry prepared in Test Example b19-1 and 2.1 mL of a decane solution of diisobutylaluminum hydride (1.0 mmol/mL in terms of aluminum atoms).

Test Example B26

A 30 mL-volume reactor that had been thoroughly purged with nitrogen was loaded with the slurry prepared in Test Example A21 (slurry concentration=105 mg/mL, 4.6 mL, 482 mg) and heptane (17.6 mL). To the slurry was added a heptane solution of di-p-tolylmethylene(cyclopentadienyl)(octamethyloctahydrodibenzofluorenyl)zirconium (IV) dimethyl (concentration 6.9 mg/mL, 2.6 mL, 18 mg). The mixture was stirred at normal temperature for 1 hour. Next, there was added a decane solution of triisobutylaluminum (TIBAL) (concentration 1.0 mmol/mL, 0.25 mL, 0.25 mmol), and the mixture was stirred at normal temperature for 2 hours. A solid catalyst component slurry was thus prepared.

The supernatant (10 mL) obtained during the above process was analyzed by ICP-AES. As a result, the Zr concentration in the supernatant was not more than the detection limit (below 0.001 mg/mL).

The results are described in Table 10.

Test Example B27

A 100 mL-volume reactor that had been thoroughly purged with nitrogen was loaded with the slurry prepared in Test Example A14 (slurry concentration=139 mg/mL, 1.74 mL, 243 mg) and toluene (19.9 mL). To the slurry was added a toluene solution of dimethylsilylene-bis{1-(2-methyl-4-phenylindenyl)}zirconium (IV) dichloride described in Organometallics, 1994, Vol. 13, pp. 954-963 (concentration 2.2 mg/mL, 3.4 mL, 7.5 mg). The mixture was stirred at normal temperature for 1 hour to give a solid catalyst component slurry. The supernatant obtained was analyzed in the same manner as in Test Example B26.

The results are described in Table 10.

Test Example B28

A 100 mL-volume reactor that had been thoroughly purged with nitrogen was loaded with the slurry prepared in Test Example A14 (slurry concentration=139 mg/mL, 1.72 mL, 240 mg) and toluene (19.7 mL). To the slurry was added a toluene solution of Compound 17 described in JP-A-2000-239312 (bis{N-(5-adamantyl-3-methylsalicylidene)-2-methylcyclohexylaminato}zirconium (IV) dichloride) (concentration 2.9 mg/mL, 3.6 mL, 10.5 mg). The mixture was stirred at normal temperature for 1 hour to give a solid catalyst component slurry. The supernatant obtained was analyzed in the same manner as in Test Example B26, the results being described in Table 10.

Test Example B29

A 30 mL-volume reactor that had been thoroughly purged with nitrogen was loaded with the slurry prepared in Test Example A14 (slurry concentration=139 mg/mL, 1.73 mL, 241 mg) and toluene (19.7 mL). To the slurry was added a toluene solution of bis{N-(3-tert-butylsalicylidene)-2,3,4,5,6-pentafluoroanilinato}titanium (IV) dichloride (concentration 2.7 mg/mL, 3.6 mL, 9.5 mg). The mixture was stirred at normal temperature for 1 hour to give a solid catalyst component slurry.

The supernatant (10 mL) obtained during the above process was analyzed by ICP-AES. As a result, the Ti concentration in the supernatant was not more than the detection limit (below 0.001 mg/mL).

The results are described in Table 10.

Test Example B30

A 30 mL-volume reactor that had been thoroughly purged with nitrogen was loaded with the slurry prepared in Test Example A14 (slurry concentration=139 mg/mL, 1.70 mL, 237 mg) and toluene (18.6 mL). To the slurry was added a toluene solution of a Zr compound described in WO 2007/136496 (bis((2-oxoyl-3-(3,5-bis(1,1-dimethylethyl)phenyl)-(5-(1,1-dimethylethyl)phenyl)-(4-(1,1-dimethylethyl)-2-phenoxy)-propane-1,3-diylzirconium (IV) dichloride) (concentration 2.9 mg/mL, 4.7 mL, 13.7 mg). The mixture was stirred at normal temperature for 1 hour to give a solid catalyst component slurry. The supernatant obtained was analyzed in the same manner as in Test Example B26, the results being described in Table 10.

Test Example b20

A 30 mL-volume reactor that had been thoroughly purged with nitrogen was loaded with the slurry prepared in Test Example a3 (slurry concentration=64 mg/mL, 7.5 mL, 482 mg) and heptane (14.6 mL). To the slurry was added a heptane solution of di-p-tolylmethylene(cyclopentadienyl)(octamethyloctahydrodibenzofluorenyl)zirconium (IV) dimethyl (concentration 6.9 mg/mL, 2.6 mL, 18 mg). The mixture was stirred at normal temperature for 1 hour. Next, a decane solution of triisobutylaluminum (TIBAL) (concentration 1.0 mmol/mL, 0.25 mL, 0.25 mmol) was added. The mixture was stirred at normal temperature for 2 hours to give a solid catalyst component slurry. The supernatant obtained was analyzed in the same manner as in Test Example B26, the results being described in Table 10.

TABLE 4

| Test Example | Amount of filtrate sample (mL) | Concentrations in filtrate (mmol/L) | | Amount of free Ti*3 | | Amount of dissolved Al*4 | | Grain size distribution | |
|---|---|---|---|---|---|---|---|---|---|
| | | Ti concentration | Al concentration | (μmol) | (mol %) | (μmol) | (mol %) | D50 (μm) | Uniformity |
| B1 | 10 | DL*1 | DL*2 | <0.44 | <1.4 | <4.0 | <0.3 | 29.0 | 0.214 |
| B2 | 10 | DL*1 | DL*2 | <0.44 | <1.4 | <4.0 | <0.3 | 29.8 | 0.207 |
| B3 | 10 | DL*1 | DL*2 | <0.44 | <1.4 | <4.0 | <0.3 | 21.7 | 0.217 |
| B4 | 10 | DL*1 | DL*2 | <0.43 | <1.4 | <4.0 | <0.3 | 29.0 | 0.210 |
| B5 | 10 | DL*1 | — | <0.43 | <1.4 | — | — | 15.8 | 0.208 |
| b1 | 10 | 0.044 | 1.7 | 0.93 | 2.9 | 36 | 2.3 | 57.3 | 0.378 |
| b2 | 10 | 0.057 | 3.0 | 1.2 | 3.8 | 63 | 3.8 | 56.7 | 0.391 |
| b3 | 10 | 0.051 | 1.7 | 1.1 | 3.4 | 35 | 2.2 | 62.0 | 0.411 |
| b4 | 10 | 0.022 | 0.46 | 0.48 | 1.5 | 9.7 | 0.6 | 38.6 | 0.292 |

*1DL: not more than the detection limit (below 0.021 mmol/L)

*2DL: not more than the detection limit (below 0.19 mmol/L)

*3Amount of Ti that was not supported on the solid polyaluminoxane composition

*4Amount of Al dissolved out from the solid polyaluminoxane composition

TABLE 5

| Test Example | Amount of filtrate sample (mL) | Concentrations in filtrate (mmol/L) Ti concentration | Concentrations in filtrate (mmol/L) Al concentration | Amount of free Ti*6 (μmol) | Amount of free Ti*6 (mol %) | Amount of dissolved Al*7 (μmol) | Amount of dissolved Al*7 (mol %) |
|---|---|---|---|---|---|---|---|
| B6  | 10 | DL*1   | —     | <0.44 | <1.4 | —    | —     |
| B7  | 15 | DL*2   | —     | <0.30 | <0.9 | —    | —     |
| B8  | 15 | DL*2   | DL*3  | <0.30 | <0.9 | <2.5 | <0.03 |
| B9  | 10 | DL*1   | DL*4  | <0.44 | <1.4 | <4.0 | <0.1  |
| B10 | 15 | DL*2   | DL*5  | <0.30 | <0.9 | <2.8 | <0.04 |
| B11 | 10 | DL*1   | —     | <0.43 | <1.4 | —    | —     |
| B12 | 10 | DL*1   | —     | <0.43 | <1.4 | —    | —     |
| b5  | 10 | 0.055  | 5.5   | 1.2   | 3.6  | 117  | 3.7   |
| b6  | 10 | 0.039  | 7.4   | 0.83  | 2.6  | 156  | 2.5   |
| b7  | 10 | 0.038  | 2.2   | 0.8   | 2.5  | 46   | 1.5   |
| b8  | 30 | 0.027  | 3.0   | 1.1   | 1.8  | 126  | 1.0   |

*1DL: not more than the detection limit (below 0.021 mmol/L)
*2DL: not more than the detection limit (below 0.014 mmol/L)
*3DL: not more than the detection limit (below 0.12 mmol/L)
*4DL: not more than the detection limit (below 0.19 mmol/L)
*5DL: not more than the detection limit (below 0.13 mmol/L)
*6Amount of Ti that was not supported on the solid polyaluminoxane composition
*7Amount of Al dissolved out from the solid polyaluminoxane composition

TABLE 6

| Test Example | Amount of filtrate sample (mL) | Concentrations in filtrate (mmol/L) Zr concentration | Concentrations in filtrate (mmol/L) Al concentration | Amount of free Zr*4 (μmol) | Amount of free Zr*4 (mol %) | Amount of dissolved Al*5 (μmol) | Amount of dissolved Al*5 (mol %) |
|---|---|---|---|---|---|---|---|
| B13 | 15 | DL*1  | DL*2  | <0.16 | <0.5 | <2.8 | <0.1  |
| B14 | 15 | DL*1  | DL*2  | <0.16 | <0.5 | <2.8 | <0.04 |
| B15 | 15 | DL*1  | DL*2  | <0.16 | <0.5 | <2.8 | <0.03 |
| B16 | 30 | DL*3  | —     | <0.16 | <0.5 | —    | —     |
| B17 | 15 | DL*1  | DL*2  | <0.16 | <0.5 | <2.8 | <0.04 |
| B18 | 15 | DL*1  | DL*2  | <0.16 | <0.5 | <2.8 | <0.04 |
| b9  | 15 | 0.14  | 1.4   | 3.0   | 9.3  | 29   | 1.8   |
| b10 | 15 | 0.035 | 1.2   | 0.74  | 2.3  | 25   | 0.8   |
| b11 | 30 | 0.044 | 4.2   | 1.9   | 3.0  | 176  | 1.4   |
| b12 | 30 | 0.025 | 3.2   | 1.1   | 1.7  | 134  | 0.7   |

*1DL: not more than the detection limit (below 0.0074 mmol/L)
*2DL: not more than the detection limit (below 0.13 mmol/L)
*3DL: not more than the detection limit (below 0.0037 mmol/L)
*4Amount of Zr that was not supported on the solid polyaluminoxane composition
*5Amount of Al dissolved out from the solid polyaluminoxane composition

TABLE 7

| Test Example | Amount of filtrate sample (mL) | Concentrations in filtrate (mmol/L) Zr concentration | Concentrations in filtrate (mmol/L) Al concentration | Amount of free Zr*4 (μmol) | Amount of free Zr*4 (mol %) | Amount of dissolved Al*5 (μmol) | Amount of dissolved Al*5 (mol %) |
|---|---|---|---|---|---|---|---|
| B19   | 15 | DL*1  | DL*2  | <0.16  | <0.5   | <2.8 | <0.04 |
| B20   | 15 | DL*1  | DL*2  | <0.16  | <0.5   | <2.8 | <0.04 |
| B23-1 | 20 | DL*3  | —     | <0.28  | <0.6   | —    | —     |
| B23-2 | 10 | 0.012 | —     | 0.62*6 | 1.3*6  | —    | —     |
| b13   | 30 | 0.030 | 1.8   | 1.3    | 2      | 78   | 0.6   |
| b14   | 30 | 0.024 | 2.2   | 1.0    | 1.6    | 92   | 0.7   |
| b17-1 | 20 | 0.026 | —     | 1.3    | 2.2    | —    | —     |
| b17-2 | 10 | 0.24  | —     | 12*6   | 21.4*6 | —    | —     |

*1DL: not more than the detection limit (below 0.0074 mmol/L)
*2DL: not more than the detection limit (below 0.13 mmol/L)
*3DL: not more than the detection limit (below 0.0055 mmol/L)
*4Amount of Zr that was not supported on the solid polyaluminoxane composition
*5Amount of Al dissolved out from the solid polyaluminoxane composition
*6Amount of Zr dissolved out during the preparation of the prepolymerized catalyst component

TABLE 8

| Test Example | Amount of filtrate sample (mL) | Concentrations in filtrate (mmol/L) | | Amount of free Hf[*3] | | Amount of dissolved Al[*4] | |
|---|---|---|---|---|---|---|---|
| | | Hf concentration | Al concentration | (μmol) | (mol %) | (μmol) | (mol %) |
| B21 | 15 | DL[*1] | DL[*2] | <0.41 | <0.13 | <2.8 | <0.04 |
| b15 | 15 | 0.046 | 2.3 | 1.9 | 3.1 | 95 | 0.8 |

[*1]DL: not more than the detection limit (below 0.019 mmol/L)
[*2]DL: not more than the detection limit (below 0.13 mmol/L)
[*3]Amount of Hf that was not supported on the solid polyaluminoxane composition
[*4]Amount of Al dissolved out from the solid polyaluminoxane composition

TABLE 9

| Test Example | Amount of filtrate sample (mL) | Concentrations in filtrate (mmol/L) | | Amount of free Ti[*3] | | Amount of dissolved Al[*4] | |
|---|---|---|---|---|---|---|---|
| | | Ti concentration | Al concentration | (μmol) | (mol %) | (μmol) | (mol %) |
| B22 | 10 | DL[*1] | DL[*2] | <0.48 | <1.4 | <2.8 | <0.04 |
| b16 | 30 | 0.045 | 1.5 | 1.9 | 3.0 | 65 | 0.5 |

[*1]DL: not more than the detection limit (below 0.021 mmol/L)
[*2]DL: not more than the detection limit (below 0.13 mmol/L)
[*3]Amount of Ti that was not supported on the solid polyaluminoxane composition
[*4]Amount of Al dissolved out from the solid polyaluminoxane composition

TABLE 10

| Test Example | Amount of supernatant (mL) | Zr concentration in supernatant (mg/mL) | Ti concentration in supernatant (mg/mL) |
|---|---|---|---|
| B26 | 10 | DL[*1] | — |
| B27 | 10 | DL[*1] | — |
| B28 | 10 | DL[*1] | — |
| B29 | 10 | — | DL[*2] |
| B30 | 10 | DL[*1] | — |
| b20 | 10 | 0.0015 | — |

[*1]DL: not more than the detection limit (below 0.001 mg/mL)
[*2]DL: not more than the detection limit (below 0.001 mg/mL)

Production of Olefin Oligomers

Test Example C1

A 500 mL-volume autoclave fitted with a fouling evaluation test piece was thoroughly purged with nitrogen and was loaded with 150 mL of n-heptane containing 0.075 mmol in terms of aluminum atoms of triisobutylaluminum (a 1.0 M toluene solution). The liquid was stirred. Next, 1 mL of a toluene solution of Adeka Pluronic L-71 (manufactured by ADEKA CORPORATION) (concentration 6 g/L) was added. The olefin oligomerization catalyst (3.0 μmol) prepared in Test Example B1 was diluted with 3 mL of toluene, and the resultant toluene slurry was added to the reactor. Subsequently, the pressure was increased by supplying ethylene (partial pressure 4.5 MPa-G) and the reaction was initiated. While supplying ethylene at the constant pressure, the reaction was performed at 45-52° C. for 60 minutes and was terminated by the addition of a small amount of methanol. After the completion of the reaction, the reaction liquid was washed with 0.1 N hydrochloric acid and with pure water. The supernatant component of the reaction liquid was analyzed by gas chromatography. Thereafter, the whole of the reaction liquid was filtered under reduced pressure, thereby recovering polyethylene particles. Those polyethylene particles that had become deposited to the test piece were separately recovered. The polyethylene particles recovered in each state were dried under reduced pressure at 80° C. for 1 hour, and the weight of the particles was measured to determine the yield. As a result, the selectivity relative to the products was 82% for 1-hexene, 12% for decenes and 6% for polyethylene. The catalytic activity calculated based on the total amount of the products was 22 kg-products/(mmol-Ti·h). The fouling rate was less than 1%.

The results are described in Table 11.

Test Example C2

The oligomerization reaction was performed in the same manner as in Test Example C1, except that the olefin oligomerization catalyst prepared in Test Example B3 was used. The results are described in Table 11.

The grain size distribution of the byproduced polyethylene was measured. The median diameter D50 in the cumulative volume was 231 μm and the uniformity was 0.178.

Test Example C3

The oligomerization reaction was performed in the same manner as in Test Example C1, except that the olefin oligomerization catalyst prepared in Test Example B4 was used.

The results are described in Table 11.

Test Example C4

The oligomerization reaction was performed in the same manner as in Test Example C1, except that the olefin oligomerization catalyst (2.0 μmol) prepared in Test Example B6 was used. The results are described in Table 11.

Test Example C5

The oligomerization reaction was performed in the same manner as in Test Example C1, except that the olefin oligomerization catalyst (2.0 μmol) prepared in Test Example B9 was used. The results are described in Table 11.

Test Example c1

The oligomerization reaction was performed in the same manner as in Test Example C1, except that a toluene slurry of the olefin oligomerization catalyst prepared in Test Example b1 was used. As a result, the selectivity relative to the products was 81% for 1-hexene, 11% for decenes and 8% for polyethylene. The catalytic activity calculated based on the total amount of the products was 10 kg-products/(mmol-Ti·h). The fouling rate was 7%. The grain size distribution of the byproduced polyethylene was measured. The determination of uniformity was infeasible due to the presence of polyethylene particles larger than the detection limit (1408 μm).
The results are described in Table 11.

Test Example c5

The oligomerization reaction was performed in the same manner as in Test Example C1, except that the olefin oligomerization catalyst (2.0 μmol) prepared in Test Example b7 was used. The results are described in Table 11. The grain size distribution of the byproduced polyethylene was measured. The determination of uniformity was infeasible due to the presence of polyethylene particles larger than the detection limit (1408 μm).

Test Examples c1 to c5 resulted in fouling by the polyethylenes produced. Further, the control of particle diameters failed and coarse polyethylene particles were formed.

TABLE 11

| Test Example | Selectivity relative to products (%) | | | Catalytic activity (kg-products/(mmol-Ti · h)) | Fouling rate (%) | Grain size distribution of byproduced polyethylene | |
|---|---|---|---|---|---|---|---|
| | 1-Hexene | Decenes | Polyethylene | | | D50 (μm) | Uniformity |
| C1 | 82 | 12 | 6 | 22 | Below 1% | — | — |
| C2 | 82 | 13 | 5 | 22 | Below 1% | 231 | 0.178 |
| C3 | 83 | 13 | 4 | 24 | Below 1% | 154 | 0.193 |
| C4 | 82 | 14 | 4 | 36 | Below 1% | 234 | 0.186 |
| C5 | 83 | 15 | 2 | 40 | Below 1% | 172 | 0.199 |
| c1 | 81 | 11 | 8 | 10 | 7 | Measurement infeasible*[1] | Measurement infeasible*[1] |
| c2 | 82 | 12 | 6 | 14 | 6 | Measurement infeasible*[1] | Measurement infeasible*[1] |
| c3 | 82 | 12 | 6 | 20 | 5 | Measurement infeasible*[1] | Measurement infeasible*[1] |
| c4 | 83 | 13 | 4 | 45 | 9 | — | — |
| c5 | 83 | 14 | 3 | 35 | 7 | Measurement infeasible*[1] | Measurement infeasible*[1] |

*[1]Solid components larger than the detection limit (1408 μm) were present.

Test Example c2

The oligomerization reaction was performed in the same manner as in Test Example C1, except that a toluene slurry of the olefin oligomerization catalyst prepared in Test Example b2 was used. The results are described in Table 11. The grain size distribution of the byproduced polyethylene was measured. The determination of uniformity was infeasible due to the presence of polyethylene particles larger than the detection limit (1408 μm).

Test Example c3

The oligomerization reaction was performed in the same manner as in Test Example C1, except that a toluene slurry of the olefin oligomerization catalyst prepared in Test Example b3 was used. The results are described in Table 11. The grain size distribution of the byproduced polyethylene was measured. The determination of uniformity was infeasible due to the presence of polyethylene particles larger than the detection limit (1408 μm).

Test Example c4

The oligomerization reaction was performed in the same manner as in Test Example C1, except that the olefin oligomerization catalyst (2.0 μmol) prepared in Test Example b5 was used. The results are described in Table 11.

Production of Olefin Polymers

Test Example C6

Heptane (500 mL) was charged into a 1 L-volume stainless steel autoclave that had been thoroughly purged with nitrogen. After the system was purged with ethylene, there were added 1-hexene (20 mL), triisobutylaluminum (0.375 mmol) and the prepolymerized catalyst component (Zr=0.42 μmol) obtained in Test Example B23-2. The temperature in the system was raised to 80° C. While continuously supplying ethylene, the polymerization reaction was carried out at a total pressure of 0.8 MPaG and 80° C. for 90 minutes. The polymer was recovered by filtration and was dried under reduced pressure at 80° C. for 10 hours. Consequently, 111.7 g of an ethylene.1-hexene copolymer was obtained. The polymer obtained had a melt flow rate (MFR) of 0.14 g/10 min, a density of 927 kg/m³ and a bulk density of 410 kg/m³.

Test Example c6

An ethylene.1-hexene copolymer weighing 115.7 g was obtained by carrying out the polymerization reaction under the same conditions as in Test Example C6, except that the prepolymerized catalyst solid component (Zr=0.55 μmol) obtained in Test Example b17-2 was used. The polymer obtained had a melt flow rate (MFR) of 0.14 g/10 min, a density of 927 kg/m³ and a bulk density of 340 kg/m³.

Test Example c6 resulted in a decrease in bulk density compared to Test Example C6.

Test Example C7

A magnetic stirrer was placed into a 50 mL branched flask that had been thoroughly purged with nitrogen, and the 10.0 wt % supported catalyst slurry (0.163 g) prepared in Test Example B24 was added. Subsequently, there were added a hexane solution of triisobutylaluminum (aluminum concentration 1.0 mol/L, 1.5 mL) and 5.0 mL of dehydrated hexane. The whole amount of the resultant mixture was introduced into a 3,400 mL-volume SUS autoclave thoroughly purged with nitrogen. Thereafter, 750 g of liquid propylene and 0.10 NL of hydrogen were added, and the polymerization was performed at 70° C. for 40 minutes. The polymerization was terminated by cooling the autoclave and purging propylene. The inside of the polymerizer was inspected, but no deposits were found on the stirring shaft of the polymerizer or the inside of the polymerizer. The powdery polymer obtained was dried under reduced pressure at 80° C. for 10 hours. The polymer weighed 141.8 g and the bulk density of the powder was 0.44 g/mL. The powder was passed through a sieve having openings of 2 mm, and the weight of the residue on the sieve was measured to be 5.32 g. The MFR was 3.0 g/10 min, the DSC melting point was 146° C., and the polymerization activity per 1 hour was 13,050 g/g-cat.

The results are described in Table 12.

Test Example C8

A polymer was obtained by polymerization and dried in the same manner as in Test Example C7, except that the amounts of the 10.0 wt % supported catalyst slurry prepared in Test Example B24 and the hydrogen were changed to 0.143 g and 0.20 NL, respectively. No deposits were found on the stirring shaft of the polymerizer or the inside of the polymerizer. The powdery polymer obtained weighed 243.5 g. The bulk density of the powder was 0.45 g/mL. The weight of the residue on the 2 mm opening sieve was 2.48 g.

The results are described in Table 12.

Test Example c7

A polymer was obtained by polymerization and dried in the same manner as in Test Example C7, except that 0.201 g of the 10.0 wt % supported catalyst slurry prepared in Test Example b18 was used. The powder had been aggregated on the periphery of the stirring shaft of the polymerizer, and the polymer obtained was a large mass weighing 186.7 g. The measurements of the bulk density of the polymer and the weight of a residue on the 2 mm opening sieve were infeasible because of the polymer being a mass.

The results are described in Table 12.

Test Example c8

A polymer was obtained by polymerization and dried in the same manner as in Test Example C7, except that use was made of 0.146 g of the 10.0 wt % supported catalyst slurry prepared in Test Example b18 and the amount of hydrogen was changed to 0.20 NL. The powder had been aggregated on the periphery of the stirring shaft of the polymerizer, and the polymer obtained was a large mass weighing 177.3 g. The measurements of the bulk density of the polymer and the weight of a residue on the 2 mm opening sieve were infeasible because of the polymer being a mass.

The results are described in Table 12.

In Test Examples C7 and C8, the polymers were obtained in the form of a satisfactory powder without any conspicuous deposits in the polymerizer. In contrast, Test Examples c7 and c8 resulted in the aggregation of a powder on the periphery of the stirring shaft and the polymers obtained were in the form of a large mass. Thus, the use of the solid polyaluminoxane compositions of the invention makes it possible to ensure that polymers maintain satisfactory powdery properties even under high polymerization activity conditions and also to ensure that the obtainable polyolefins have a high bulk density, thereby achieving high productivity. These results show that the solid polyaluminoxane compositions of the invention are highly advantageous in order to realize efficient industrial production of olefin polymers.

TABLE 12

| Test Example | MFR (g/10 min) | Melting point (° C.) | Bulk density (g/mL) | Activity (g/g-cat) |
|---|---|---|---|---|
| C7 | 3.0 | 146 | 0.44 | 13050 |
| C8 | 56 | 146 | 0.45 | 25620 |
| c7 | 3.0 | 144 | Measurement infeasible*[1] | 13930 |
| c8 | 39 | 145 | Measurement infeasible*[1] | 18160 |

*[1]The measurement was infeasible because of the polymer being a large mass.

Test Example C9

At room temperature and in a stream of nitrogen, a 1 L-volume SUS polymerizer equipped with a stirrer was loaded with 425 mL of purified decane and 0.3 mL of a decane solution of diisobutylaluminum hydride (1.0 mmol/mL in terms of aluminum atoms). Next, there was added 0.0005 mmol in terms of zirconium atoms of the decane slurry of the prepolymerized catalyst component prepared in Test Example B25-2. Further, 50 mL of hydrogen was added. Next, a mixture liquid of 250 mL of 4-methyl-1-pentene and 3.3 mL of 1-decene was continuously fed to the polymerizer at a constant rate over a period of 2 hours. The start of the feed was taken as the start of polymerization. The temperature was raised to 45° C. in 30 minutes from the start of polymerization, and the temperature was held at 45° C. for 4 hours. Hydrogen was added in volumes of 50 mL and 40 mL after the passage of 1 hour and the passage of 2 hours, respectively, from the start of polymerization. After the passage of 4.5 hours from the start of polymerization, the temperature was decreased to room temperature and the pressure was released. Immediately thereafter, the polymerization liquid containing a white solid was filtered to afford a solid polymer, which was then dried under reduced pressure at 80° C. for 8 hours. Thus, the polymer was obtained in an amount of 127 g. There were no deposits on the inside walls of the polymerizer. The filtrate was dried under reduced pressure at 120° C. to give soluble portions.

The polymer had an intrinsic viscosity [η] of 1.76 dL/g, a Tm of 232.8° C. and a bulk density of 0.437 g/mL. The amount of the soluble portions (SP) was 0.13 wt %.

The results are described in Table 13.

Test Example C10

At room temperature and in a stream of nitrogen, a 1 L-volume SUS polymerizer equipped with a stirrer was loaded with 425 mL of decane, 42 mL of 4-methyl-1-pentene and 0.3 mL of a decane solution of diisobutylaluminum hydride (1.0 mmol/mL in terms of aluminum atoms). Next, there was added 0.00025 mmol in terms of zirconium atoms of the decane slurry of the prepolymerized catalyst component prepared in Test Example B25-2. Further, 80 mL of hydrogen was added. Next, a mixture liquid of 208 mL of 4-methyl-1-pentene and 8.5 mL of 1-decene was continuously fed to the polymerizer at a constant rate over a period of 2 hours from the start of polymerization. The start of the feed was taken as the start of polymerization. The temperature was raised to 45° C. in 30 minutes from the start of polymerization, and the temperature was held at 45° C. for 4 hours. Hydrogen was added in a volume of 30 mL after the passage of 1 hour and in a volume of 30 mL after the passage of 2 hours from the start of polymerization. After the passage of 4.5 hours from the start of polymerization, the temperature was decreased to room temperature and the pressure was released. Immediately thereafter, the suspension containing a white solid was filtered to afford a solid polymer, which was then dried under reduced pressure at 80° C. for 8 hours. Thus, the polymer was obtained in an amount of 97.5 g. There were no deposits on the inside walls of the polymerizer. The filtrate was dried under reduced pressure at 120° C. to give soluble portions.

The results are described in Table 13.

Test Example c9

A polymer was obtained in an amount of 150.2 g by carrying out the polymerization reaction under the same conditions as in Test Example C9, except that the prepolymerized catalyst component prepared in Test Example b19-2 was used.

The results are described in Table 13.

Test Example c10

A polymer was obtained in an amount of 137.4 g by carrying out the polymerization reaction under the same conditions as in Test Example C10, except that the prepolymerized catalyst component prepared in Test Example b19-2 was used.

The results are described in Table 13.

Test Examples c9 and c10 resulted in olefin polymers having a lower bulk density than those of Test Examples C9 and C10.

TABLE 13

| | Polymer properties | | | |
| --- | --- | --- | --- | --- |
| Test Example | Intrinsic viscosity (dL/g) | Melting point (° C.) | Bulk density (g/mL) | Amount of soluble portions (wt %) |
| C9 | 1.76 | 232.8 | 0.437 | 0.13 |
| C10 | 1.52 | 219.7 | 0.453 | 0.34 |
| c9 | 1.30 | 232.0 | 0.391 | 0.06 |
| c10 | 1.33 | 220.2 | 0.357 | 0.79 |

Test Example C11

Heptane (500 mL) was charged into a 1 L-volume stainless steel autoclave that had been thoroughly purged with nitrogen. After the system was purged with ethylene, there were added a decane solution of triisobutylaluminum (TIBAL) (concentration 1.0 mmol/mL, 0.25 mL, 0.25 mmol), a heptane solution of L-71 (concentration 4.0 mg/mL, 0.63 mL, 2.5 mg) and the solid catalyst component obtained in B26 (16 mg in terms of solid). The temperature in the system was raised to 75° C. While continuously supplying an ethylene hydrogen mixture gas containing 1.25% hydrogen, the polymerization reaction was carried out at a total pressure of 0.65 MPaG and 75° C. for 60 minutes. The polymer was recovered by filtration and was dried under reduced pressure at 80° C. for 10 hours. Consequently, the ethylene polymer was obtained in an amount of 51.3 g. The bulk density of the polymer obtained was 0.36 g/mL.

Test Example C12

The reaction system was prepared in the same manner as in Test Example C11, except that the solid catalyst component obtained in B26 was replaced by the solid catalyst component obtained in B27 (15 mg in terms of solid). The temperature in the system was raised to 80° C. While continuously supplying an ethylene hydrogen mixture gas containing 0.2% hydrogen, the polymerization reaction was carried out at a total pressure of 0.80 MPaG and 80° C. for 90 minutes. The polymer was recovered by filtration and was dried under reduced pressure at 80° C. for 10 hours. Consequently, the ethylene polymer was obtained in an amount of 58.1 g. The bulk density of the polymer obtained was 0.40 g/mL.

Test Example C13

The reaction system was prepared in the same manner as in Test Example C11, except that the solid catalyst component obtained in B26 was replaced by the solid catalyst component obtained in B28 (5 mg in terms of solid). The temperature in the system was raised to 80° C. While continuously supplying an ethylene hydrogen mixture gas containing 0.2% hydrogen, the polymerization reaction was carried out at a total pressure of 0.80 MPaG and 80° C. for 120 minutes. The polymer was recovered by filtration and was dried under reduced pressure at 80° C. for 10 hours. Consequently, the ethylene polymer was obtained in an amount of 26.1 g. The bulk density of the polymer obtained was 0.33 g/mL.

Test Example c11

The reaction system was prepared in the same manner as in Test Example C11, except that the solid catalyst component obtained in B26 was replaced by the solid catalyst component obtained in b20 (16 mg in terms of solid). The temperature in the system was raised to 75° C. While continuously supplying an ethylene hydrogen mixture gas containing 1.25% hydrogen, the polymerization reaction was carried out at a total pressure of 0.65 MPaG and 75° C. for 60 minutes. The polymer was recovered by filtration and was dried under reduced pressure at 80° C. for 10 hours. Consequently, the ethylene polymer was obtained in an amount of 59.0 g. The bulk density of the polymer obtained was 0.17 g/mL.

Test Example c11 resulted in a decrease in the bulk density of the olefin polymer as compared to Test Examples C11 to C13.

[Olefin Polymerization (Oligomerization)]

The oligomerization of ethylene was evaluated using the olefin oligomerization catalyst obtained in Test Example B8.

A 500 mL-volume autoclave that had been thoroughly purged with nitrogen was loaded with 150 mL of n-heptane containing 0.05 mmol in terms of aluminum atoms of triisobutylaluminum (a 1.0 M toluene solution). The liquid was stirred. Next, 1 mL of a toluene solution of Adeka Pluronic L-71 (manufactured by ADEKA CORPORATION) (concentration 6 g/L) was added. The oligomerization catalyst (Ti=0.5 μmol) obtained in Test Example B8 was diluted with 4 mL of toluene, and the resultant toluene slurry was added to the reactor. Subsequently, the pressure was increased by supplying ethylene (partial pressure 4.5 MPa-G) and the reaction was initiated. While supplying ethylene at the constant pressure, the reaction was performed at 45-52° C. for 60 minutes and was terminated by the addition of a small amount of methanol.

Polyethylene that was byproduced was in the form of fine particles and the autoclave was free from deposits.

INDUSTRIAL APPLICABILITY

The present invention is particularly useful in the production of olefin oligomers and olefin polymers and is highly valuable in industry.

The invention claimed is:

1. A method of producing a solid polyaluminoxane composition, the method comprising:
(1) reacting a polyaluminoxane composition solution (A), which comprises a polyalkylaluminoxane, a trialkylaluminum and a hydrocarbon solvent, with at least one organic compound (B) containing at least one of X, which is a Group 15 element of the Periodic Table, and Y, which is a Group 16 element of the Periodic Table, to form at least one component represented by General Formulae (5') to (6') below;

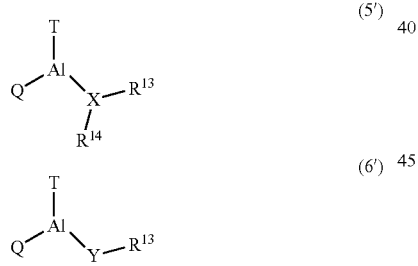

wherein alkyl groups of the trialkylaluminum are selected from alkyl groups having 1 to 20 carbon atoms;
wherein each -T and -Q is independently selected from the alkyl groups of the trialkylaluminum, or a polyaluminoxane group of the polyalkylaluminoxane, and $R^{13}$ and $R^{14}$ is each independently selected from a hydrocarbon groups having 1 to 50 carbon atoms, and precipitating a solid polyaluminoxane composition by reacting the polyaluminoxane composition solution (A) with the at least one component represented by General Formulae (5') to (6').

2. The method according to claim 1, wherein the molar fraction of alkyl groups of the trialkylaluminum moieties being 13 mol % or more relative to the total number of moles of alkyl groups of the polyalkylaluminoxane moieties and the alkyl groups of the trialkylaluminum moieties as measured with respect to tetrahydrofuran-$d_8$ soluble components by a method (iii) described below:

[Method (iii)]
0.5 mL of tetrahydrofuran (THF)-$d_8$ (a heavy solvent) is added to 10 mg of the solid polyaluminoxane composition; the mixture is stirred at 25° C. for 2 hours; and the molar fraction is determined by analyzing the THF-$d_8$ soluble components by $^1$H-NMR at a measurement temperature of 24° C.

3. The method according to claim 1, wherein the solid polyaluminoxane composition having a solubility in n-hexane at 25° C. of less than 0.50 mol % as measured by a method (i) described below,

[Method (i)]
2 g of the solid polyaluminoxane composition is added to 50 mL of n-hexane held at 25° C.; the mixture is stirred for 2 hours and is filtered to give a filtrate and a residue; and the aluminum concentration in the filtrate is measured by ICP atomic emission spectroscopy (ICP-AES) to determine the solubility as the ratio of aluminum atoms present in the filtrate relative to the amount of aluminum atoms corresponding to 2 g of the solid polyaluminoxane composition.

4. The method according to claim 1, wherein the solid polyaluminoxane composition having a solubility in toluene at 25° C. of less than 1.0 mol % as measured by a method (ii) described below,

[Method (ii)]
2 g of the solid polyaluminoxane composition is added to 50 mL of toluene held at 25° C.; the mixture is stirred for 2 hours and is filtered to give a filtrate and a residue; and the aluminum concentration in the filtrate is measured by ICP atomic emission spectroscopy (ICP-AES) to determine the solubility as the ratio of aluminum atoms present in the filtrate relative to the amount of aluminum atoms corresponding to 2 g of the solid polyaluminoxane composition.

5. The method according to claim 1, wherein the solid polyaluminoxane composition has a solubility in tetrahydrofuran at 25° C. of 95 mol % or less as measured by a method (iv) described below:

[Method (iv)]
2 g of the solid polyaluminoxane composition is added to 50 mL of tetrahydrofuran held at 25° C.; the mixture is stirred for 2 hours and is filtered to give a filtrate and a residue; and the aluminum concentration in the filtrate is measured by ICP atomic emission spectroscopy (ICP-AES) to determine the solubility as the ratio of aluminum atoms present in the filtrate relative to the amount of aluminum atoms corresponding to 2 g of the solid polyaluminoxane composition.

6. The method according to claim 1, wherein the uniformity of the solid polyaluminoxane composition represented by the following equation is not more than 0.40, Uniformity=$\Sigma Xi |D50-Di|/D50\Sigma Xi$ wherein Xi is the histogram value of a particle i, D50 is the volume-based median diameter, and Di is the volume-based diameter of the particle i.

7. The method according to claim 1, wherein the precipitation step is performed at 40° C. or above.

8. The method according to 1, wherein the method comprising a step of thermally aging the precipitate after the precipitation step.

9. The method according to claim 8, wherein the thermal aging temperature is 65 to 200° C.

10. The method according to claim 1, wherein the polyaluminoxane composition solution (A) is a partial hydrolysis reaction product of trialkylaluminum.

11. The method according to claim 1, wherein the molar fraction of alkyl groups of the trialkylaluminum moieties being 16 mol % or more relative to the total number of moles of all the alkyl groups in the polyaluminoxane composition solution (A).

12. The method according to claim 1, wherein the polyalkylaluminoxane in the polyaluminoxane composition solution (A) includes a polyaluminoxane containing a structural unit represented by General Formula (1) below:

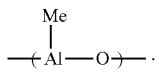
(1)

13. The method according to claim 1, wherein the trialkylaluminums in the polyaluminoxane composition solution (A) include trimethylaluminum.

14. The method according to claim 1, wherein the polyalkylaluminoxane in the polyaluminoxane composition solution (A) is polymethylaluminoxane and the trialkylaluminum in the polyaluminoxane composition solution (A) is trimethylaluminum.

15. An olefin polymerization catalyst production method, wherein the method comprising bringing the solid polyaluminoxane composition produced by the method described in claim 1, into contact with a transition metal compound (H) having a transition metal atom selected from Groups 3 to 10 in the periodic table, the transition metal compound being represented by General Formula (8) below:

$$R^{31}R^{32}R^{33}R^{34}M \ldots \quad (8)$$

in the formula, M is a transition metal atom selected from Groups 3 to 10 in the periodic table, and $R^{31}$, $R^{32}$, $R^{33}$ and $R^{34}$ are the same as or different from one another and each is a cyclopentadienyl skeleton-containing group, an alkyl, a cycloalkyl, an aryl, an aralkyl, an alkoxy, an aryloxy, a halogen atom, an alkylsilyl, an alkylamide, an alkylimide, —SO₃R or a hydrogen atom, R is a monovalent functional group.

16. An olefin polymer production method comprising a step of polymerizing one or more olefins selected from α-olefins having 2 to 20 carbon atoms, cycloolefins having 3 to 20 carbon atoms and diene compounds having 4 to 20 carbon atoms in the presence of the olefin polymerization catalyst produced by the method described in claim 15.

17. The method according to claim 1, wherein the components represented by general Formulae (5) to (7) are the components represented by General Formula (6) below;

—(R12)Al—YR13 . . .   (6)

in General Formula (6), R12 is a hydrocarbon group having 1 to 20 carbon atoms or is an oxygen atom, Y is oxygen element, and R13 is hydrocarbon groups having 1 to 50 carbon atoms.

18. The method according to claim 17, wherein the component represented by General Formula (6) is a reaction product of the polyaluminoxane composition solution (A) and at least one oxygen-containing organic compound (C).

* * * * *